US012411893B2

(12) United States Patent
Parasnis et al.

(10) Patent No.: US 12,411,893 B2
(45) Date of Patent: Sep. 9, 2025

(54) PROACTIVELY GENERATED CONTENT AND PERSONALIZED FEEDS AVAILABLE FOR AUDIENCES

(71) Applicant: Typeface Inc., Palo Alto, CA (US)

(72) Inventors: Abhay Parasnis, Palo Alto, CA (US); Saachi Shah, Palo Alto, CA (US); Jonathan Moreira, Palo Alto, CA (US); Perraju Bendapudi, Palo Alto, CA (US); Hema Vishnu Pola, Palo Alto, CA (US); Vishal Sood, Palo Alto, CA (US); Nipun Dave, Palo Alto, CA (US); Anish Pimpley, Palo Alto, CA (US)

(73) Assignee: Typeface Inc., Palo Alto, CA (US)

( * ) Notice: Subject to any disclaimer, the term of this patent is extended or adjusted under 35 U.S.C. 154(b) by 0 days.

(21) Appl. No.: 18/783,424

(22) Filed: Jul. 25, 2024

(65) Prior Publication Data

US 2025/0200114 A1 Jun. 19, 2025

Related U.S. Application Data

(63) Continuation-in-part of application No. PCT/US2024/012269, filed on Jan. 19, 2024, which (Continued)

(51) Int. Cl.

*G06F 16/00* (2019.01)
*G06F 3/04842* (2022.01)

(Continued)

(52) U.S. Cl.

CPC ...... *G06F 16/9035* (2019.01); *G06F 3/04842* (2013.01); *G06Q 30/0244* (2013.01); *G06Q 30/0269* (2013.01)

(58) Field of Classification Search

None
See application file for complete search history.

(56) References Cited

U.S. PATENT DOCUMENTS 8,316,381 B2 * 11/2012 Fearn ................. G06F 11/3495 714/47.1
8,655,889 B2 2/2014 Hua et al.

(Continued)

FOREIGN PATENT DOCUMENTS

JP 2004334337 11/2004
WO 2013075316 5/2013

(Continued)

OTHER PUBLICATIONS

"U.S. Appl. No. 18/203,537, Non Final Office Action mailed Aug. 3, 2023".

(Continued)

*Primary Examiner* — Jean M Corrielus
(74) *Attorney, Agent, or Firm* — Schwegman Lundberg & Woessner, P.A.

(57) ABSTRACT

Methods, systems, and computer programs are presented for generating personalized content. One method includes an operation for identifying audience parameter values that indicate which users are members of an audience. The method further includes operations for determining attribute values for attributes used to generate items based on the audience parameter values, and generating items for the audience based on the attribute values. Generating each item comprises creating a prompt based on a type of the item, the attribute values, and the audience parameter values; selecting a generative artificial intelligence (GAI) tool to generate the item based on the type of item; and providing the created prompt to the selected GAI tool. The method further includes causing presentation of the generated items in a (Continued)

user interface (UI), receiving on the UI a selection of one of the items; and transmitting the selected item to one or more members of the audience.

20 Claims, 39 Drawing Sheets

Related U.S. Application Data is a continuation of application No. 18/203,537, filed on May 30, 2023, now Pat. No. 12,045,735, and a continuation of application No. 18/203,524, filed on May 30, 2023, now Pat. No. 11,809,688, and a continuation of application No. 18/203,534, filed on May 30, 2023, now Pat. No. 11,922,541, and a continuation of application No. 18/203,530, filed on May 30, 2023, now Pat. No. 11,928,319.

(60) Provisional application No. 63/644,385, filed on May 8, 2024, provisional application No. 63/637,258, filed on Apr. 22, 2024, provisional application No. 63/637,277, filed on Apr. 22, 2024, provisional application No. 63/637,254, filed on Apr. 22, 2024, provisional application No. 63/637,275, filed on Apr. 22, 2024, provisional application No. 63/637,266, filed on Apr. 22, 2024, provisional application No. 63/611,006, filed on Dec. 15, 2023, provisional application No. 63/444,162, filed on Feb. 8, 2023.

(51) Int. Cl.

*G06F 16/9035* (2019.01)
*G06Q 30/0242* (2023.01)
*G06Q 30/0251* (2023.01)

(56) References Cited

U.S. PATENT DOCUMENTS 8,717,367 B2 5/2014 Clifton et al.
9,411,830 B2 8/2016 Mei et al.
9,501,499 B2* 11/2016 Sanio .................... G06F 16/951
10,032,188 B1* 7/2018 Jakobi ................ G06Q 30/0253
10,268,669 B1 4/2019 Allen
10,719,566 B1* 7/2020 Zhang ................... G06F 16/907
10,839,418 B1* 11/2020 Aragonda .......... G06Q 30/0249
10,991,012 B2 4/2021 Balakrishnan et al.
11,392,659 B2 7/2022 Jain et al.
11,417,085 B2* 8/2022 Saraee ................. G06V 10/761
11,516,158 B1 11/2022 Luzhnica et al.
11,550,884 B2 1/2023 Kumar et al.
11,596,867 B2* 3/2023 Snodgrass ............... A63F 13/56
11,809,688 B1* 11/2023 Parasnis ............. G06F 3/04845
11,922,541 B1 3/2024 Parasnis et al.
11,928,319 B1* 3/2024 Parasnis .................... G06T 5/77
11,995,803 B1 5/2024 Karpman et al.
12,045,735 B1 7/2024 Parasnis et al.
2007/0162845 A1* 7/2007 Cave ..................... G06F 40/117 715/764
2008/0215979 A1* 9/2008 Clifton .................... G06F 16/40 707/E17.009
2012/0054004 A1* 3/2012 Priyadarshan ..... G06Q 30/0241 705/14.4
2012/0110432 A1 5/2012 Mei et al.
2014/0096026 A1 4/2014 Grosz
2015/0112980 A1* 4/2015 Sanio .................... G06F 16/532 707/728
2015/0248429 A1* 9/2015 Pregueiro ............... G06T 11/60 715/202
2015/0271540 A1* 9/2015 Melby ............. H04N 21/25891 725/34
2016/0140622 A1* 5/2016 Wang ..................... G06Q 50/01 705/14.66
2016/0140623 A1* 5/2016 Gupta ................ G06Q 30/0204 705/14.66
2016/0225014 A1* 8/2016 Mitra ................. G06Q 30/0243
2016/0314502 A1 10/2016 Lindsay et al.
2017/0180443 A1 6/2017 Raichelgauz et al.
2017/0206190 A1 7/2017 Satterfield et al.
2017/0287013 A1* 10/2017 Iannaccone ........ G06Q 30/0277
2018/0018707 A1* 1/2018 Berry, Jr. ........... G06Q 30/0257
2018/0040019 A1* 2/2018 Gavlovski ......... G06F 16/24578
2018/0082329 A1* 3/2018 Johnson ............. G06Q 30/0275
2018/0268490 A1* 9/2018 Sodomka ............... G06Q 40/12
2018/0374253 A1 12/2018 Yu et al.
2019/0034973 A1* 1/2019 Yao ........................ G06Q 50/01
2019/0114664 A1* 4/2019 Goldman ........... G06Q 30/0277
2019/0325088 A1 10/2019 Dubey et al.
2019/0377460 A1 12/2019 Butcher et al.
2020/0125609 A1* 4/2020 Cetintas .............. G06F 16/3331
2020/0273062 A1 8/2020 Probell
2020/0279008 A1 9/2020 Jain et al.
2020/0285703 A1 9/2020 Ramachandra
2020/0410026 A1* 12/2020 Reuter ................ G06F 16/9536
2020/0410552 A1* 12/2020 Stohlman ............... G06N 5/025
2021/0026522 A1* 1/2021 Bowen .................... G06F 30/00
2021/0042796 A1 2/2021 Khoury et al.
2021/0118012 A1 4/2021 Chung
2021/0146254 A1* 5/2021 Snodgrass ................ G06N 3/08
2021/0201360 A1* 7/2021 Randazzo ............. G06F 16/906
2021/0224858 A1 7/2021 Khoury et al.
2021/0382956 A1* 12/2021 Reuter ................ G06F 16/9536
2022/0005070 A1* 1/2022 Raviv ................ G06Q 30/0206
2022/0005235 A1 1/2022 Gou et al.
2022/0108417 A1 4/2022 Liu et al.
2022/0148059 A1 5/2022 Faricy et al.
2022/0179899 A1 6/2022 Dong
2022/0198779 A1 6/2022 Saraee et al.
2022/0244818 A1 8/2022 Strecher et al.
2022/0301118 A1 9/2022 Frey et al.
2022/0357914 A1 11/2022 Krishnamurthy et al.
2022/0366435 A1 11/2022 Boatner et al.
2022/0398379 A1 12/2022 Hou et al.
2022/0414320 A1 12/2022 Dolan et al.
2023/0005108 A1 1/2023 Gopalkrishna et al.
2023/0013199 A1* 1/2023 Goldman ........... G06Q 30/0246
2023/0021797 A1 1/2023 Gupta et al.
2023/0104661 A1 4/2023 Wu et al.
2023/0119466 A1 4/2023 Sjölander et al.
2023/0143430 A1 5/2023 Vanreusel et al.
2023/0152598 A1 5/2023 Brebner et al.
2023/0186535 A1 6/2023 Malur Srinivasan et al.
2023/0214583 A1 7/2023 Sawyer et al.
2023/0230198 A1 7/2023 Zhang et al.
2023/0237980 A1 7/2023 Pajjuri et al.
2024/0020863 A1 1/2024 Zhu et al.
2024/0086648 A1* 3/2024 Han ......................... G06N 3/08
2024/0127292 A1* 4/2024 Estes ................... G06F 16/9535
2024/0129601 A1* 4/2024 Brdiczka .............. H04N 21/854
2024/0249318 A1* 7/2024 Spiegel .................. H04L 51/02
2024/0256337 A1 8/2024 Verma et al.
2024/0265274 A1 8/2024 Parasnis et al.
2024/0273308 A1 8/2024 Cai et al.
2024/0289396 A1 8/2024 Chrysanthou

FOREIGN PATENT DOCUMENTS

WO 2023069561 4/2023
WO 2024167650 8/2024
WO 2024167651 8/2024

OTHER PUBLICATIONS

"U.S. Appl. No. 18/203,524, Notice of Allowance mailed Aug. 9, 2023".
"U.S. Appl. No. 18/203,534, Non Final Office Action mailed Aug. 23, 2023".
"U.S. Appl. No. 18/203,530, Non Final Office Action mailed Aug. 31, 2023".
"U.S. Appl. No. 18/203,524, Corrected Notice of Allowability mailed Sep. 7, 2023", 5 pgs.

(56) References Cited

OTHER PUBLICATIONS

"U.S. Appl. No. 18/203,524, Corrected Notice of Allowability mailed Sep. 20, 2023".
"U.S. Appl. No. 18/203,524, Corrected Notice of Allowability mailed Oct. 5, 2023".
"U.S. Appl. No. 18/203,537, Response filed Nov. 2, 2023 to Non Final Office Action mailed Aug. 3, 2023", 17 pgs.
"U.S. Appl. No. 18/203,537, Final Office Action mailed Nov. 20, 2023", 20 pgs.
"U.S. Appl. No. 18/203,530, Response filed Nov. 21, 2023 to Non Final Office Action mailed Aug. 31, 2023", 13 pgs.
"U.S. Appl. No. 18/203,534, Response filed Nov. 21, 2023 to Non Final Office Action mailed Aug. 23, 2023", 13 pgs.
"U.S. Appl. No. 18/203,534, Notice of Allowance mailed Nov. 30, 2023", 9 pgs.
"U.S. Appl. No. 18/203,537, Examiner Interview Summary mailed Jan. 3, 2024", 2 pgs.
"U.S. Appl. No. 18/203,530, Notice of Allowance mailed Jan. 12, 2024", 9 pgs.
"U.S. Appl. No. 18/203,537, Response filed Feb. 20, 2024 to Final Office Action mailed Nov. 20, 2023", 20 pgs.
"International Application Serial No. PCT US2024 012270, International Search Report mailed Mar. 15, 2024", 5 pgs.
"International Application Serial No. PCT US2024 012270, Written Opinion mailed Mar. 15, 2024", 6 pgs.
"International Application Serial No. PCT US2024 012269, International Search Report mailed Mar. 15, 2024", 4 pgs.
"International Application Serial No. PCT US2024 012269, Written Opinion mailed Mar. 15, 2024", 7 pgs.
"U.S. Appl. No. 18/203,537, Notice of Allowance mailed Mar. 14, 2024", 9 pgs.
"U.S. Appl. No. 18/203,537, Corrected Notice of Allowability mailed Jun. 25, 2024", 3 pgs.
"U.S. Appl. No. 18/783,413, Notice of Allowance mailed Oct. 1, 2024", 10 pgs.
"U.S. Appl. No. 18/783,416, Non Final Office Action mailed Oct. 1, 2024", 13 pgs.
"U.S. Appl. No. 18/783,413, Corrected Notice of Allowability mailed Oct. 9, 2024", 2 pgs.
"U.S. Appl. No. 18/783,419, Non Final Office Action mailed Oct. 18, 2024", 27 pgs.
"U.S. Appl. No. 18/783,421, Non Final Office Action mailed Nov. 4, 2024", 20 pgs.
"U.S. Appl. No. 18/783,413, Corrected Notice of Allowability mailed Nov. 6, 2024", 2 pgs.
Anyword, "Facebook Post Generator", from Nov. 26, 2022, available at: https: web.archive.org web 20221126225805 https: anyword.com facebook-post-generator . Accessed Jul. 28, 2023. 6 pages. (Year: 2022), 6 pgs.
Anyword, "Instagram Caption Generator", archived screenshot from Dec. 4, 2022, available at: https: web.archive.org web 20221204212425 https: anyword.com instagram-caption-generator . Accessed Jul. 28, 2023., 8 pgs.
Dutta, Debashri, "How to Write a Blog Post Outline in 8 Steps", https: web.archive.Org web 20221206180953 https: dmdutta.com how-to-write-a-blog-post-outline , posted Oct. 3, 2022, accessed Jul 28, 2023. 13 pages. (Year: 2022), 13 pgs.
Fang, Fei, "A Comprehensive Pipeline for Complex Text-to-Image Synthesis", Journal Of Computer Science And Technology, Springer Singapore, Singapore, vol. 35, No. 3, (May 1, 2020), 522-537.
Gatt, Albert, "Survey of the State of the Art in Natural Language Generation: Core tasks, applications and evaluation", Journal ofArtificial Intelligence Research. Jan. 27, 2018;61:65-170. (Year: 2018), 106 pgs.
Kumar, Madhav, "Generative AI and Personalized Video Advertisements", Available at SSRN 4614118, (2023), 17 pgs.
Lee, Young-Soul, "Automatic Weblog Generation using Mobile Context", In Proceedings of the 7th International Conference onAdvances in Mobile Computing and Multimedia Dec. 14, 2009 (pp. 622-626). (Year: 2009), 5 pgs.
Liu, Vivian, "Design guidelines for prompt engineering text-to-image generative models", In Proceedings of the CHI Conference on Human Factors in Computing Systems, (2022), 1-23.
Liu, Vivian, "3DALL-E: Integrating Text-to-Image Al in 3D Design", Proceedings of the 2023 ACM Designing Interactive Systems Conference New York, NY, USA, (Oct. 20, 2022), 1955-1977.
Oppenlaender, Jonas, "Prompt engineering for text-based generative art", arXiv preprint, (Apr. 20, 2022), 7 pgs.
Oppenlaender, Jonas, "A taxonomy of prompt modifiers for text-to-image generation", arXiv preprint arXiv:2204.13988v2., (Jul. 31, 2022), 18 pgs.
Smolinski, Pawel, "Towards completely automated advertisement personalization: an integration of generative AI and information systems", 31st International Conference on Information Systems Development (ISD2023), Lisbon, Portugal, (2023), 10 pgs.
Vasquez, Sean, "MelNet: A Generative Model for Audio in the Frequency Domain", arXiv preprint arXiv: 1906.01083. Jun. 4, 2019. (Year: 2019), 14 pgs.
Vincent, James, "All these images were generated by Google's latest text-to-image AI", The Verge. Vox Media. Retrieved Jul. 28, 2023. 7 pages. (Year: 2022), 8 pgs.
Vivian, Liu, "Opal: Multimodal Image Generation for News Illustration", Arxiv.Org, Cornell University Library, 201 Olin Library Cornell University Ithaca, NY, (Aug. 16, 2022).
Wang, Yuntao, "A Survey on ChatGPT: AI-Generated Contents, Challenges, and Solutions", IEEE Open Journal of the Computer Society, vol. 4 (2023), (2023), pp. 280-302.
Wang et al., "Microblog hashtag generation via encoding conversation contexts.", arXiv preprint arXiv: 1905.07584. May 18, 2019. (Year: 2019), 10 pgs.
U.S. Appl. No. 18/783,416, Response filed Dec. 23, 2024 to Non Final Office Action mailed Oct. 1, 2024, 29 pgs.
U.S. Appl. No. 18/783,419, Final Office Action mailed Jan. 27, 2025, 33 pgs.
U.S. Appl. No. 18/783,419, Response filed Dec. 23, 2024 to Non Final Office Action mailed Oct. 18, 2024, 18 pgs.
U.S. Appl. No. 18/783,421, Response filed Jan. 23, 2025 to Non Final Office Action mailed Nov. 4, 2024, 17 pgs.

* cited by examiner

FIG. 9
902
OVERVIEW
CONTENT
PLAN
AUDIENCES
MONITORING
SEARCH
904
RANK BY
BEST PERFORMING
ALL CHANNELS
ALL AUDIENCES
ALL COLORS
88%
CECILIÉ JUICE
WE ARE THRILLED TO ANNOUNCE OUR LATEST...
99%
NEW
MISS OUT ON OUR NEW APPLE JUICE
INBOX
CECILIÉ JUICE
MAY 6
DEAR VALUED CUSTOMER,
WE ARE THRILLED TO ANNOUNCE OUR LATEST...
99%
NEW CECILIÉ APPLE JUICE
PLACE ORDER
99%
NEW
98%
97%
CECILIÉ JUICE
INTRODUCING OUR NEWEST ADDITION TO THE CECILIÉ FAMILY - IT'S CRISP AND REFRESHING...
1
99%
CECILIÉ JUICE
456,756 FOLLOWERS
NEW APPLE JUICE

CONTENT GENERATION WITH GENERATIVE ARTIFICIAL INTELLIGENCE

PERSONALIZED CONTENT GENERATION

PROACTIVELY GENERATED CONTENT AND PERSONALIZED FEEDS AVAILABLE FOR AUDIENCES

CROSS-REFERENCE TO RELATED APPLICATIONS

This application is a Continuation-In-Part of International Application No. PCT/US2024/012269, entitled "Prompting System For Multimodal Personalized Content Generation," filed on Jan. 19, 2024, which claims the benefit of priority to U.S. patent application Ser. No. 18/203,524, filed May 30, 2023, now U.S. Pat. No. 11,809,688, issued on Nov. 7, 2023, and to U.S. patent application Ser. No. 18/203,530, filed May 30, 2023, now U.S. U.S. Pat. No. 11,928,319, issued on Mar. 12, 2024, and to U.S. patent application Ser. No. 18/203,534, filed May 30, 2023, now U.S. Pat. No. 11,922, 541, issued on Mar. 5, 2024, and to U.S. patent application Ser. No. 18/203,537, filed May 30, 2023, now U.S. Pat. No. 12,045,735, issued on Jul. 23, 2024, and to U.S. Provisional Patent Application No. 63/444,162, filed Feb. 8, 2023, each of which is herein incorporated by reference in its entirety. This application claims the benefit of U.S. Provisional Patent No. 63/637,254, filed Apr. 22, 2024, and entitled "Multi-Layer Pre-Generated Content;" U.S. Provisional Patent No. 63/611,006, filed Dec. 15, 2023, and entitled "Proactively-Generated Personalized Content Creation;" U.S. Provisional Patent No. 63/637,258, filed Apr. 22, 2024, and entitled "Proactively-Generated Personalized Content Creation;" U.S. Provisional Patent No. 63/637,266, filed Apr. 22, 2024, and entitled "Proactively-Generated Content Creation Based on Tracked Performance:" U.S. Provisional Patent No. 63/644,385, filed May 8, 2024, and entitled "Proactively-Generated Personalized Content Creation;" U.S. Provisional Patent No. 63/637,275, filed Apr. 22, 2024, and entitled "Website Personalization and Interactive Assistant;" and U.S. Provisional Patent No. 63/637,277, filed Apr. 22, 2024, and entitled "Personalized Content Generation." These provisional applications are herein incorporated by reference in their entirety.

TECHNICAL FIELD

The subject matter disclosed herein generally relates to methods, systems, and machine-readable storage media for generating personalized content for communication messages.

BACKGROUND

Marketers strive to reach the right person at the right time, via the right channel, with the right message to increase product sales. There are automation tools for marketing campaigns that enable marketers to segment audiences for marketing communications. However, the process of creating content for marketing campaigns is slow and expensive. As a result, marketers cannot effectively personalize the messages for all of their audience members at scale.

BRIEF DESCRIPTION OF THE DRAWINGS

Various appended drawings illustrate examples of the present disclosure and cannot be considered limiting its scope.

DETAILED DESCRIPTION

Figure 1:
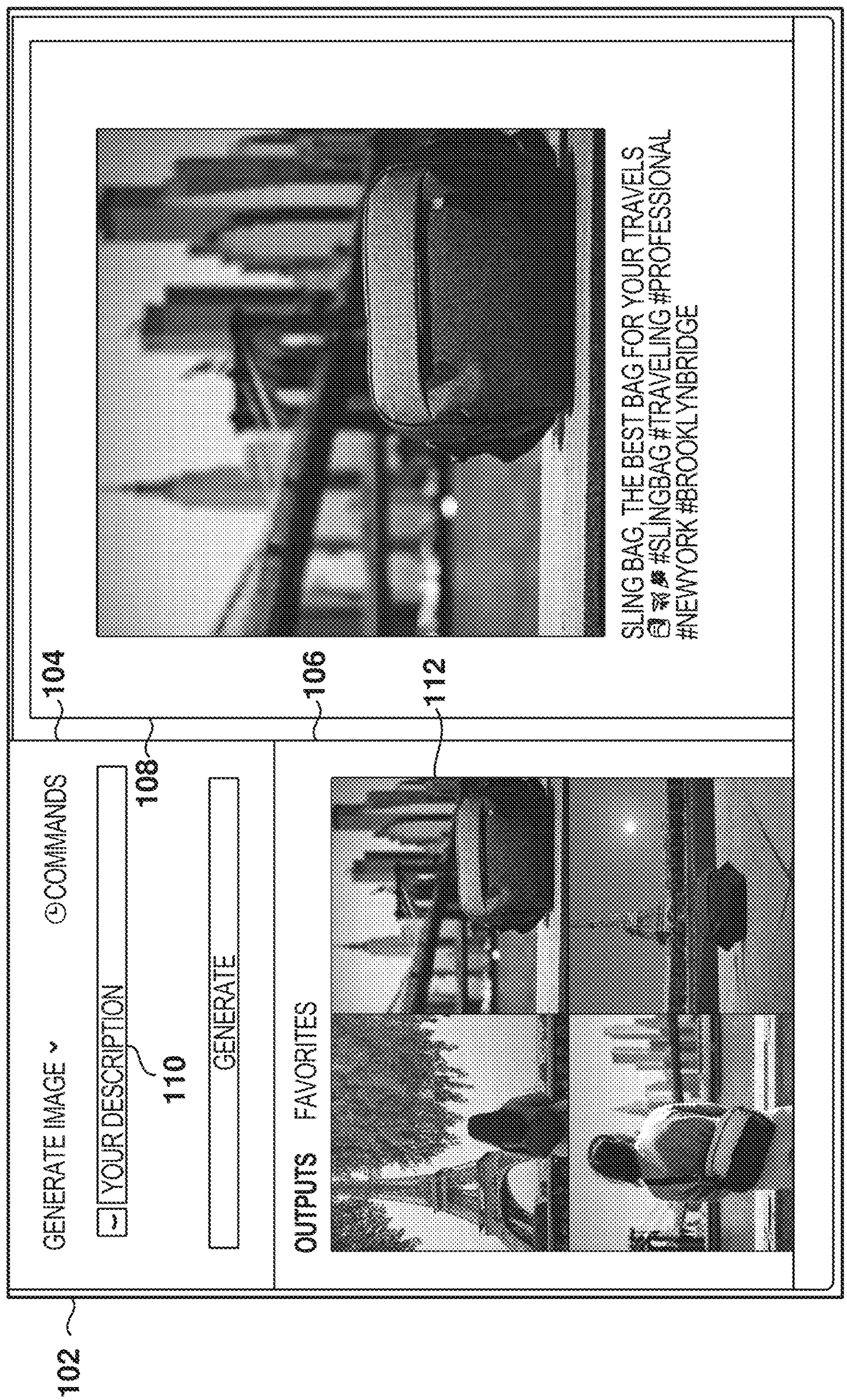
FIG. 1 is a user interface (UI) for a canvas tool to generate multimodal content, according to some examples.

Example methods, systems, and computer programs are directed to the proactive generation of personalized content for use in communication messages. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

The present invention relates to a system and method for creating and optimizing highly personalized cross-channel content for marketing campaigns. The system, referred to as Feed Generator (FG) or Content Alchemist, utilizes Generative Artificial Intelligence (GAI) to proactively generate multi-modal content (text copy, images, social media posts, blog posts, emails, audio, videos, etc.) that can be used in marketing campaigns. Additionally, powerful tracking tools are provided to monitor content performance in real-time and proactively suggest optimizations to enhance revenue generation and key performance indicators such as engagement, clicks, and conversions.

The Feed Generator tool enables marketers to create highly personalized content across multiple channels efficiently. The system continuously monitors the performance of the content and provides real-time insights to marketers. These insights include proactive suggestions for optimizations that can drive revenue and improve key performance indicators. Additionally, the Feed Generator integrates with existing Customer data platforms (CDPs) (e.g., Salesforce, Microsoft Dynamics, and ActionIQ), which are software tools that help businesses collect, unify, and activate customer data from a variety of sources, including online and offline channels.

Glossary of Terms

Some of the concepts used for the description of the solution are presented below.

An asset is a product or service offered for sale. Each asset is associated with a group of asset files and additional metadata that provide information about the asset. The files can be of different types, such as text, image, video, etc. Examples of assets include a pair of shoes, a can of soda, a computer, coffee offered by a coffee shop, and income-tax form preparation services. Assets can be associated with a particular project and with a particular catalog.

A catalog is a collection of related assets. Each catalog includes one or more assets.

A prompt is text input used to generate new content. The text input includes instructions in a human language that describe the desired output, which may be multi-modal, such as a piece of text, an image, a video, an audio, a piece of programming code, etc., or a combination thereof. Types of prompts include a user prompt and a GAI prompt.

A user prompt is a description entered by a user in plain English (or some other language) of the desired content to be generated. The description may be provided as text or in some other form, such as audio, which is then converted to text. In some examples, the content is generated using Generative Artificial Intelligence (GAI) by inputting the user prompt, or an enhanced prompt based on the user prompt, to a GAI tool, also referred to as the GAI model. An example user prompt is "create an image of product X with a beach background in vibrant colors, where product X takes 30% of the image."

A GAI prompt is a description in plain English (or some other language) of the desired content to be generated by a GAI tool. The GAI prompt is used as input for the GAI tool, which then generates the desired content. The output of the GAI tool may be multi-modal, such as a piece of text, an image, a video, an audio, a piece of programming code, etc., or a combination thereof.

A canvas is a user interface (UI) that includes one or more fields, including at least a field for entering prompts for the generation of content, a field for showing the generated content, and a field for editing the generated content. The canvas can be associated with a type associated with the desired result, such as an Instagram post, a Facebook post, a Twitter post, a blog post, a Google ad, etc.

A project is an organizational construct to group related work together. It is created by a user with a particular goal (e.g., a marketing goal), such as a Spring Campaign for a new phone release. The project may also be referred to as a campaign. Each project may be associated with one or more canvases and one or more assets.

A publication is a message created for a user, and the message may include one or more blocks of multi-modal content. Examples of publications include a webpage, a text message, an email message, a voice message, an Instagram® message, a blog, an X® message, a Facebook® message, etc.

A canvas template defines the structure of prompts, prompt rules, and other additional context used to generate a canvas.

A publication template defines the structure of prompts, prompt rules, and other additional context used to generate a publication.

A prompt template defines the structure of a GAI prompt used as input to the GAI tool. The prompt template may include fields that can be filled in based on available information to generate the GAI prompt. The prompt template may also include rules for creating the GAI prompt (e.g., include specific text when the recipient is an adult, but do not include the text if the recipient is a minor).

Content refers to elements, also referred to herein as blocks, that can be used in messages targeted to users. The elements are multi-modal because they can be of different types, such as a text block, an image, an audio, a video, an Instagram post, a blog post, an email, a social media post, etc. The content can be generated using Generative Artificial Intelligence (GAI) and edited by users. The generated content is new content generated using the GAI tool. It does not refer to content that is the result of editing or changing existing material (e.g., editing an image to add text to the image is not considered generated new content).

A feed, also referred to herein as a dynamic feed, is a stream of content to help achieve a goal (e.g., driving engagement, increasing revenue, and improving retention across one or more audiences). The content (e.g., text, image, audio, video) of the feed may be multi-modal.

The Feed Generator (FG), also referred to herein as Alchemist, is an application for creating and managing content and feeds.

A journey defines the execution of a plan associated with a project (e.g., send an email to the user about a specific product, wait for three days, and show an advertisement of the product in the user's Instagram feed). The journey includes one or more actions, and each action defines a channel, content to be presented, and one or more rules defining when to present the content. Customer Journeys is one use case for feeds, but the content from a feed can also be used with other communication automation tools.

FIG. 1 is a UI 102 for a canvas tool, also referred to herein simply as canvas, to generate multimodal content, according to some example embodiments. The UI 102 includes a prompt panel 104, a canvas panel 108, and a variations panel 106.

The prompt panel 104 includes a prompt tool 110 for entering a user prompt, which is descriptive text for the desired results. The prompt tool 110 is more than a simple input field because the prompt tool 110 includes interactive tools for easy entering input.

After input is entered in the prompt tool 110, the CGS generates results in the variations panel 106 with one or more options that the user can select. The results are referred to herein as variations 112 or outputs. In the illustrated example, the input is for generating an image with specific characteristics, and the variations panel 106 shows several variations 112. If the user selects one of the variations 112, the selection is then added to the canvas panel 108. Additional inputs may be entered in the prompt tool 110, and variations may be added to the canvas panel 108.

The Content-Generation System (CGS), also referred to herein as a content-generation tool, is a platform that can generate multiple types of generative content customized for the user and the user's particular environment (e.g., assets, products, services, voice, style, and company of the user). Further, a template-creation tool allows the user to create custom CGS templates to extend and customize the content-generation tool using no-code options that are easy to use. The prompt tool 110 allows the user to express creative ideas naturally and seamlessly integrate with brand assets.

It is noted that examples are presented with reference to marketing-purpose outputs, but the same principles may be used in other environments, such as the generation of documents, contracts, employee newsletters, manuals, instructions, etc. Therefore, the presented examples should not be interpreted as exclusive or limiting but rather illustrative.

GAI can create new content using existing text, audio files, or images. One of the challenges of GAI is that GAI algorithms need a large amount of training data to perform tasks successfully. Another challenge of GAI is unexpected outcomes, so the CGS has to make sure that the generated results are high-quality and safe to present.

Figure 2:
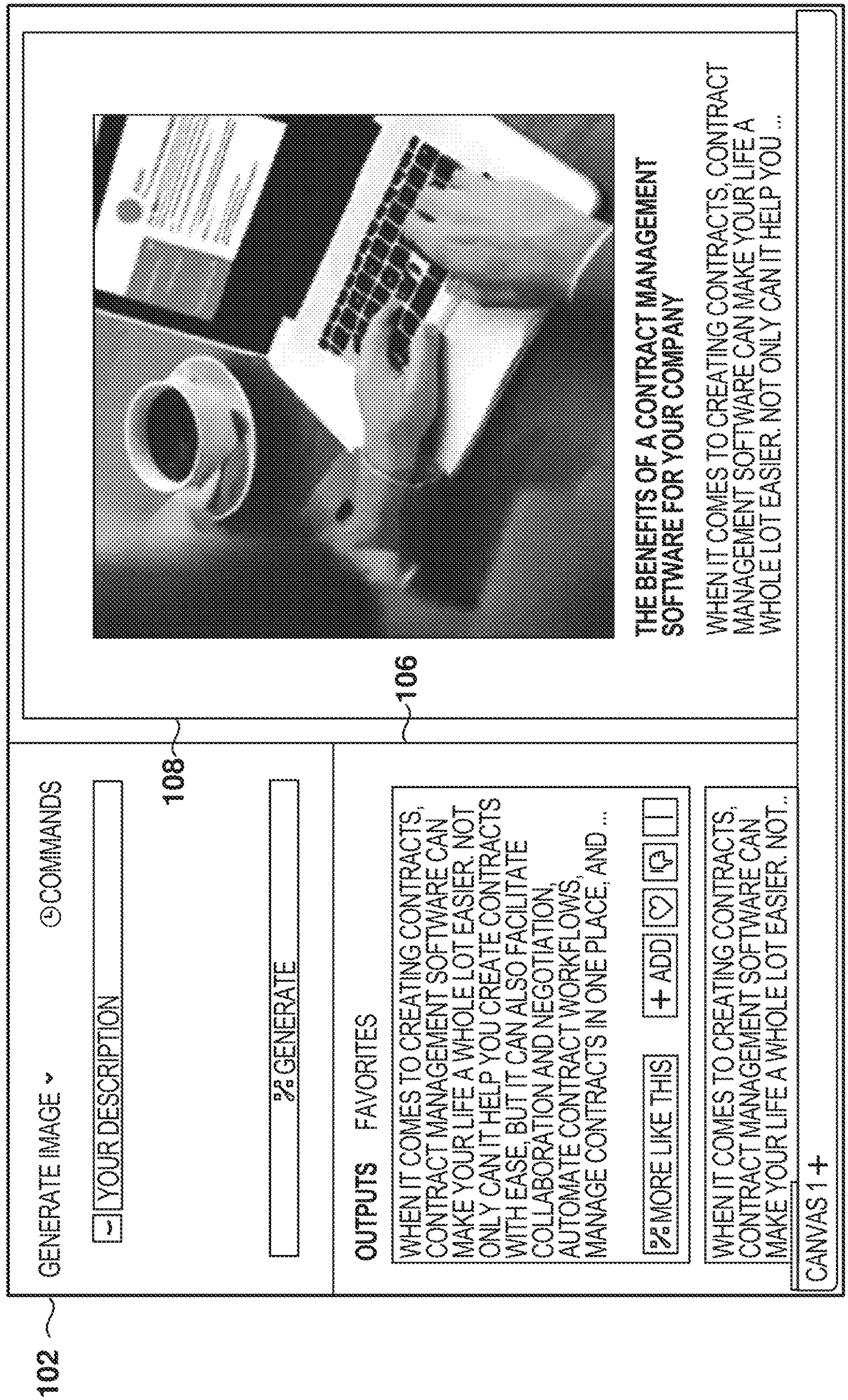
FIG. 2 is a screenshot of multimodal content generated by the content-generation tool, according to some examples.

FIG. 2 is a screenshot of multimodal content generated by the content-generation tool, according to some example embodiments. In the illustrated example, a created image has been selected and is presented in the canvas panel 108.

Further, the user has entered the following user prompt in the prompt tool, "Please write a two-page blog post about the benefits of using contract management software. In your post, discuss how it can help create contracts with ease, facilitate collaboration and negotiation, automate contract workflows, manage contracts in one place, and cover opportunities and risk in trends."

The variations panel 106 shows multiple variations 112 for the blog, and the user has selected one of the generated variations to be added to the canvas panel 108. The different parts of the canvas are editable, including the results and the selected content added to the canvas panel 108. The process may be repeated, adding new variations (text, image, video) to the canvas. That is, the canvas may be generated through a sequence of content-generation requests until the desired outcome is achieved. This sequence of operations may be saved to create a CGS template, and the user may then use the CGS template in the future to generate similar types of material (e.g., a magazine advertisement, a poster for a conference, multimedia presentation).

The content-generation tool also provides a safety feature to ensure that the content generated is safe, meaning that the user's brand is protected from erroneous content (e.g., incorrect product images) and incorrect grammar or plagiarism. The content-generation tool provides a grammar checker and a plagiarism checker to ensure that the generated content is high-quality and safe. Further, the user can specify what type of content is acceptable and what type is not acceptable.

Furthermore, the CGS includes an authenticity checker for the generated image to ensure the asset is always presented correctly. The CGS provides complete brand control to the user and guarantees that the brand is protected.

Figure 3:
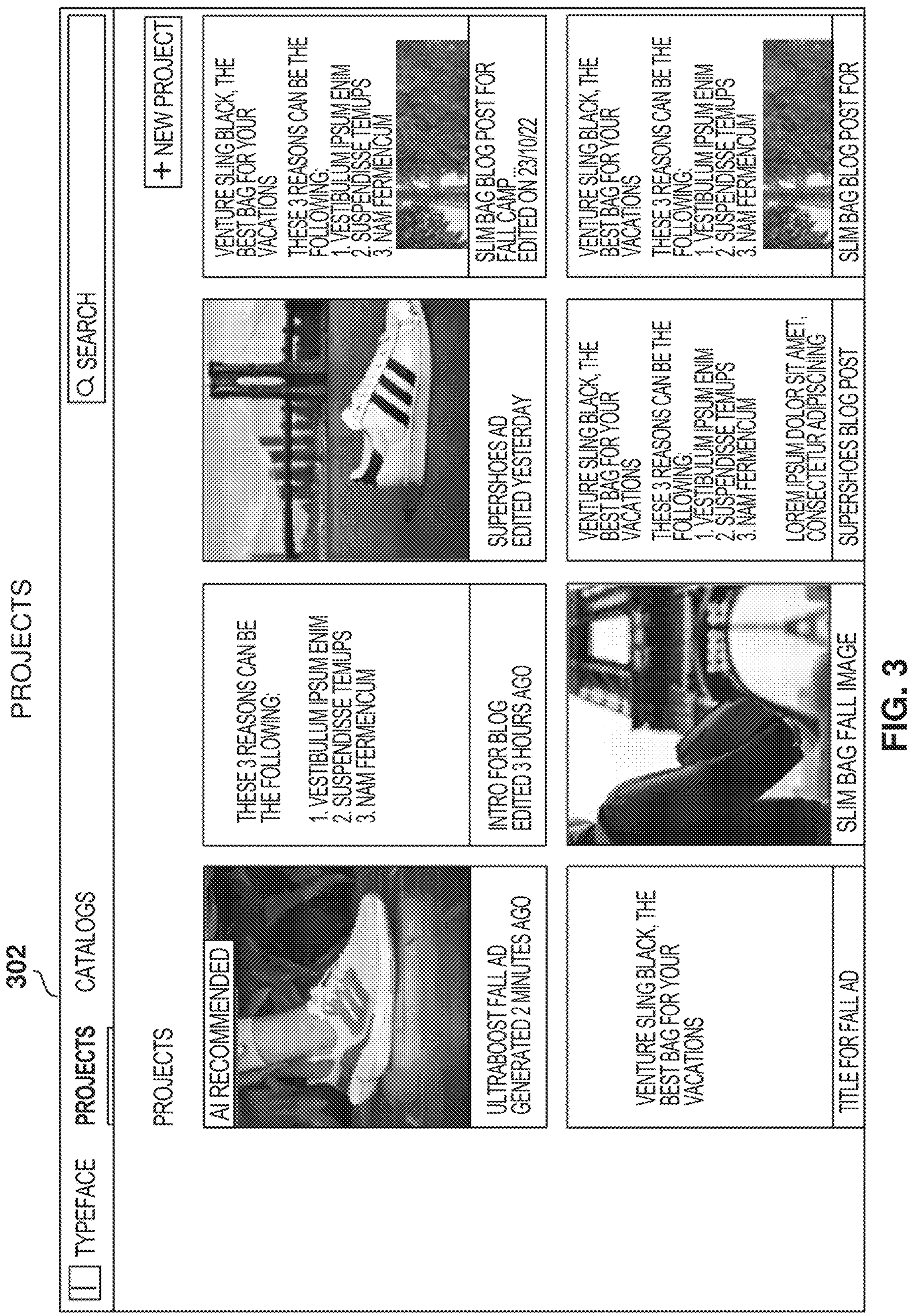
FIG. 3 is a UI for the management of projects, according to some examples.

FIG. 3 is a UI 302 for project management, according to some example embodiments. The UI 302 lists the projects created by the user. As the example shows, projects may include one or more prompts, which can be of different types (text, image, video, etc.).

In general, people do not want to work with one tool at a time but instead have a tool that represents the flow of their work. For example, a user may want to create an Instagram ad and would like to create the ad with just one tool instead of having to go to separate tools to create the text and the image. Further, having the text and image correlated provides for a better Instagram ad (e.g., by creating the image based on the selected text). Thus, the projects of the content-generation tool represent the tasks of interest to the user.

Further, the content-generation tool provides a project history (not shown) for each project where the different steps taken to generate items for the project are presented. The user may refer to some of these steps and generate new content, such as by regenerating an image based on a different asset.

Figure 4:
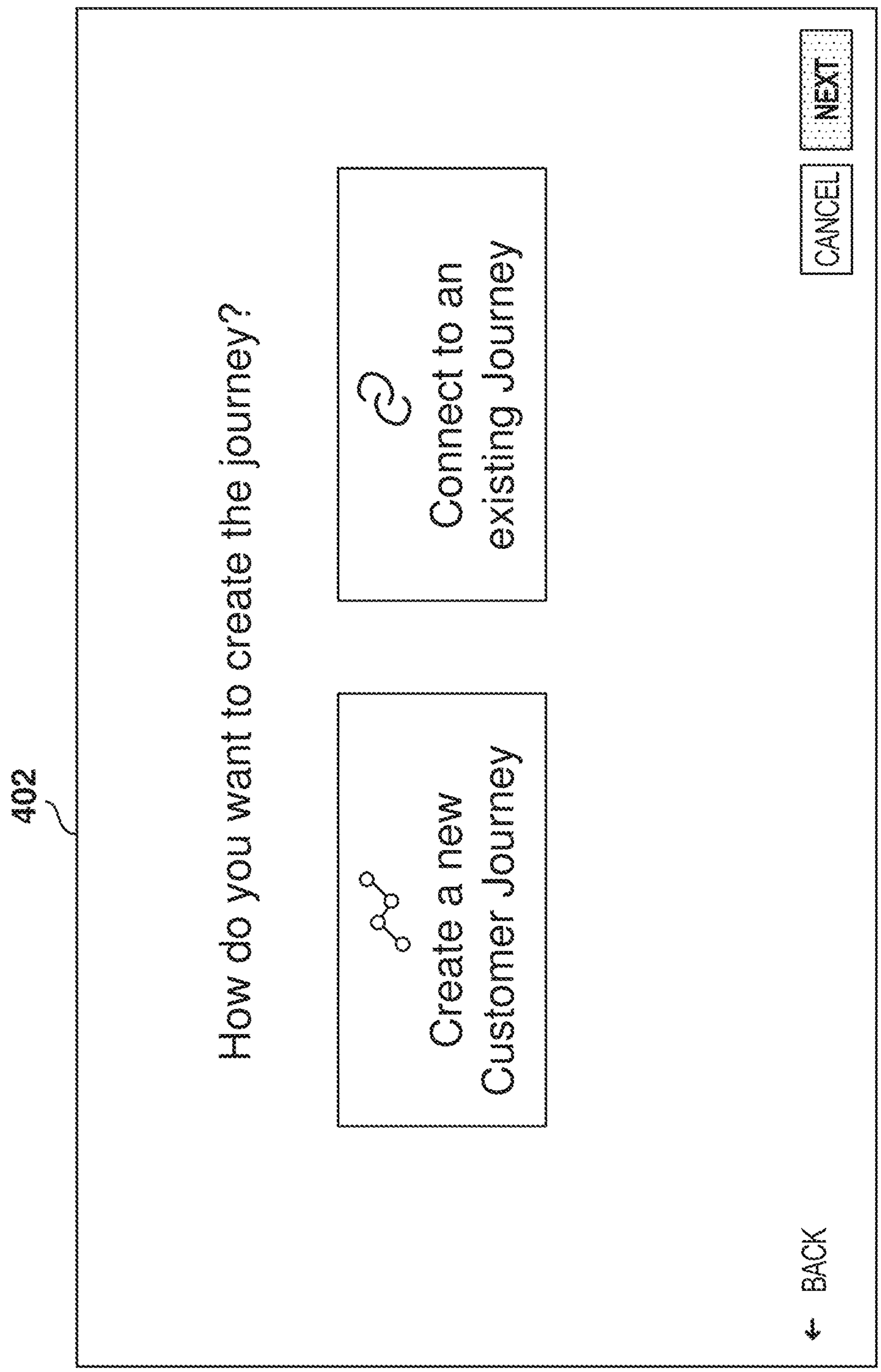
FIG. 4 is an example of a UI to create a new feed of content for a customer journey.

FIG. 4 is an example of a UI 402 for creating a customer journey. The UI 402 provides two options: the first option is to create a new journey, and the second option is to connect the FG to an existing journey created with a third-party tool.

By utilizing the Feed Generator, marketers can overcome the limitations of traditional content creation methods and effectively personalize messages for their audience at scale. The system empowers marketers to deliver targeted and engaging content, resulting in improved customer engagement, increased conversions, and, ultimately, higher revenue. Additionally, the FG monitors content performance in real-time and proactively suggests optimizations to help marketers meet their objectives, such as driving more revenue and increasing user engagement, clicks, and conversions.

Up until recently, companies usually had multiple data platforms scattered across the organization. Every department had its own databases for storing customer and transactional records. As a result, it was challenging to gather insights from data in a consolidated manner. However, with the advent of new technologies, these data sources are being integrated and available to be queried using a unified interface. This way, the data is readily available, and users can ask questions and often get a prompt response.

Multiple users may work on communication content for different purposes. The FG operates as the hub for generating content for multiple purposes, unifying content creation while making the content easily accessible.

Modern marketers tend first to identify the channels they want to publish on, then develop a geographical strategy and create audience segments. Further, marketers can leverage databases to generate data-driven content for their brands. Marketers can gather information about their audience and create a specific group of people. Still, then they are limited to using the same small set of content because they are not able to create new content easily. However, with the FG and its unified content hub, FG takes input from the user, e.g., the channel they want to share on, and uses this input to customize the communication. The user can also choose their audience segments, where audiences can be of any size, even having the size of one person. This also allows geography-based customization, as the way to speak to a 25 to 34-year-old person in one country may be different from how someone would speak to that same age group in another country.

Within a single company, there can be multiple brand identities that differ in terms of their tone and voice. For instance, Coke might have a different way of communicating than Sprite. At a broad level, FG provides a layer that enables the user to input data, such as audience or geographic location, or even previous content, which the system can learn from and use to personalize future content. With this layer, the FG can now generate any piece of content quickly and easily, tailored to the user's specific needs. After becoming unconstrained by content, all existing workflows can be reimagined, as this is where the journey begins.

Figure 5:
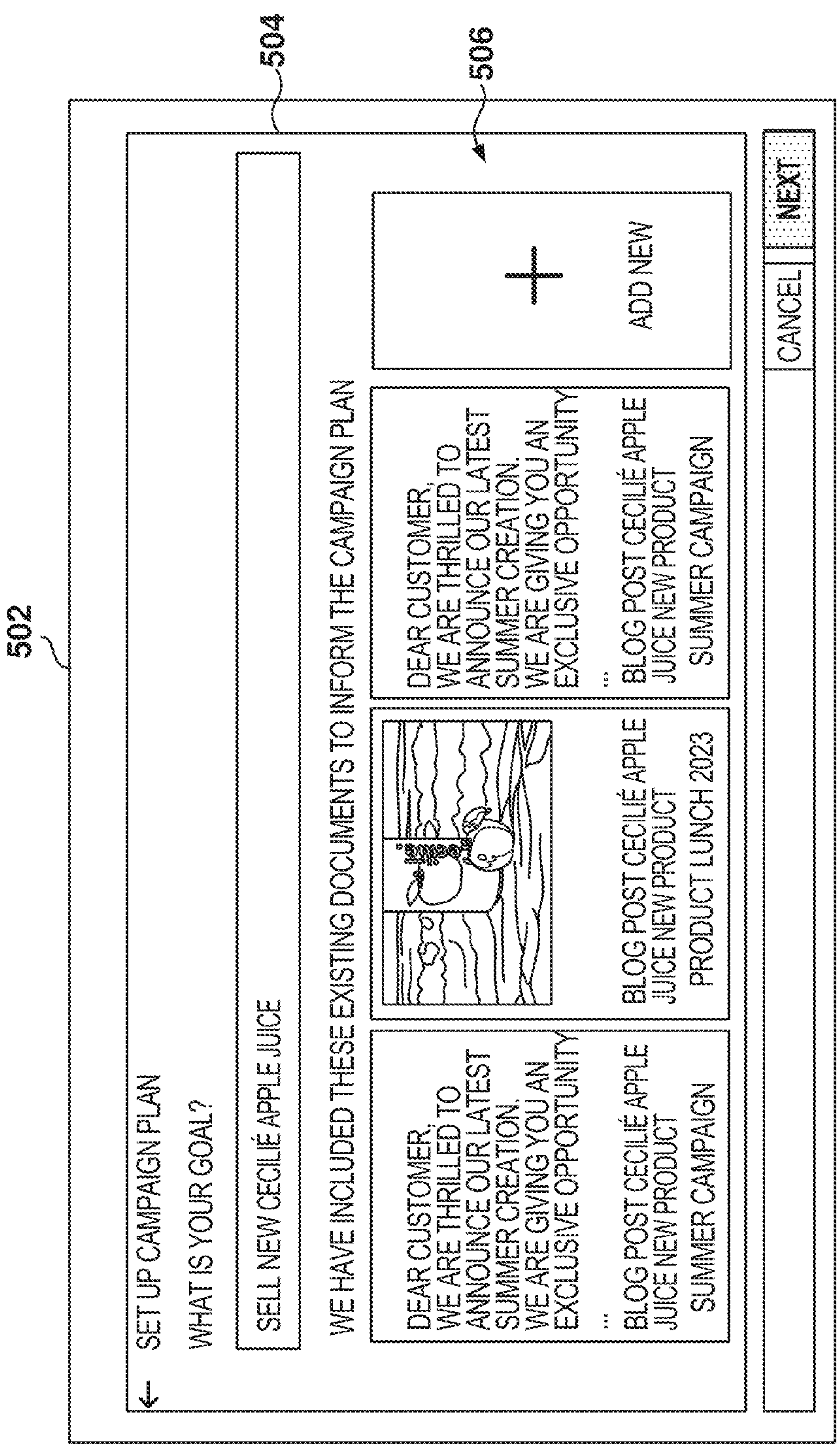
FIG. 5 is an example of a UI for configuring the goal for the campaign.

If the user selects the option to create a new plan, another UI, such as the one in FIG. 5, is presented to enable the user to enter parameters for the plan. Suppose the user selects the option to connect the FG to an existing plan. In that case, another UI is presented (not shown) that allows the user to select the existing plan created with other journey orchestration tools like Salesforce®, Journey Builder®, Microsoft Dynamics®, etc.

The use of the FG to create and implement plans has several benefits for the user:

1. Creation of one or more feeds of generated content: Instead of generating content one prompt at a time, users simply curate proactively generated content and personalized feeds available for each audience. This helps marketers quickly pick the "best message" they want to share with their audiences.
2. Omnichannel and multi-modal content: instead of different teams individually creating content for each channel, marketers can visualize and curate the experience for an audience to be consistent across all channels, like emails, SMS, Push Notifications, blogs, and social media.
3. On-brand content creation: instead of customers having to choose between the "brand loop" (a feedback loop that controls the brand image and perception of a company or product) and the "velocity loop" (a feedback loop that controls the speed of content delivery), FG helps users maintain a consistent brand identity, even when users are rapidly creating content across channels.
4. Content Analytics & Insights: FG has a semantic understanding of the content, e.g., the layers of an image, the people, places, and objects in the image, etc. Another example is to identify if there's a tree, a beach, a product, a dog, etc., in the image. FG uses this understanding to get deep insights into why a particular content variant may be performing better. FG then recommends insights—at a journey level and across multiple journeys—and proactive recommendations for generating new content. Some example actions include setting up new journeys, reviewing new suggested content, and replacing existing content.

FIG. 5 is an example of a UI 502 for configuring the campaign goal. The UI 502 includes a field 504 for entering the campaign goal, e.g., selling new Cecilie apple juice.

Once the user enters the goal, the FG presents document 506, which may be used for the campaign. The documents 506 may be existing documents or documents generated by the FG for the plan. The user may also add, in other following screens (not shown), other details about the campaign, such as the audience, channels selected, performance indicators (KPIs) for the plan, etc.

The FG includes a scaffolding module that facilitates the creation of customer journeys or feeds. In the context of a marketing campaign, scaffolding refers to the initial framework or structure that is set up to support the campaign's goals and objectives. This includes elements such as defining the target audience, identifying the key messages, determining the appropriate channels for communication, and creating a timeline for execution. The scaffolding is the foundation upon which the campaign is built, and it serves as a guide for all the activities that follow. It helps to ensure that the campaign stays on track and that all the different elements work together cohesively to achieve the desired results.

Scaffolding is creating a document or structure that lists all the aspects of the plan. The scaffolding document can be embedded in other journey orchestration tools such as Salesforce Journey Builder, and Microsoft Dynamics. The scaffolding document includes all the necessary aspects of the campaign or journey, provides a comprehensive plan for the marketing activities, and includes the goals for the plan.

The user can edit and refine the plan, and the FG dynamically adjusts the scaffolding for the plan. The FG tool provides cross-section channel content with audience-specific details to enable users to see the messages that each type of audience will receive.

Further, the feed includes all the content created in response to a prompt, a batch request, or some other type of workflow. The FG tool proactively creates, curates, and makes suggestions based on the monitoring of the plan's performance.

The FG tool enables the user to proactively generate content, such as blog posts, emails, social media posts, etc., and the FG tool provides the reason why the content was generated (e.g., based on insight into the performance of the excess income).

Additionally, the FG tool provides insights into the different pieces of content driving use, weeks, conversions, sales, etc., across the different channels. The FG tool uses the insights to proactively generate new content without having to wait for a user request.

One benefit of the FG tool is that it delivers a consistent experience across all channels. In previous solutions, marketers working through agencies and content for different channels like email, SMS, and social networks would be working in different teams, and it was difficult for all the marketers working together to visualize the end experience for any audience and ensure the user experience was consistent.

Another benefit of the FG tools is that they can generate content quickly because of the understanding of the channels and audiences. Further, the FG tool enables personalization at scale because the FG tool lets marketers create content rapidly, allowing them to create a lot more variance.

Figure 6:
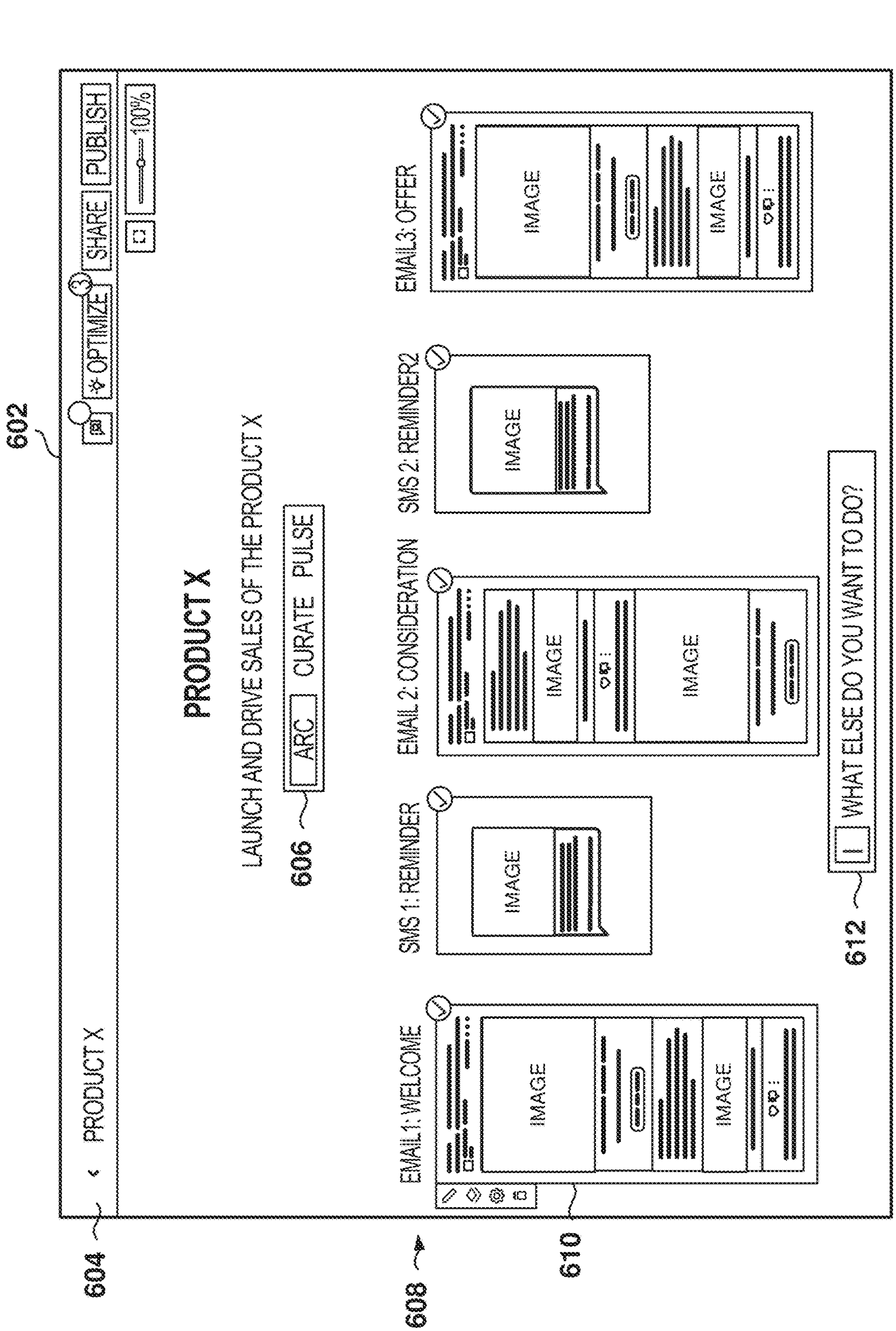
FIG. 6 is an arc UI, according to some examples.

FIG. 6 is an arc UI 602, according to some examples. In literature, a story arc or narrative arc is the chronological structure of a plot in a story. A character arc refers to the journey and transformation undergone by a character throughout a story. The character arc is the evolution of a character's beliefs, personality, or behavior as the character faces challenges and experiences within the narrative.

There can be multiple types of arcs created by marketers in the content generation tool to tell their "story". One of these types of arcs is a customer journey that a marketer creates for their customers to follow. The customer journey arc relates to the creation and dissemination of content. The arc UI 602 shows an example of a customer journey arc.

The arc includes the following items:

- The context provided by the user when generating the feed, e.g., the goal of their "story", the user's products, the user's audiences, and the objectives of each frame of the arc;
- Creating and curating content from the proactively generated feed. The marketers curate down to what they like and associate the content they like with "frames" in the journey;
- Publication and activation of content. Once marketers have curated their journeys, they submit the content back into the orchestrator for publishing to end customers; and
- Content optimization. The content-generation tool surfaces new insights and content recommendations to help marketers create new content that keeps getting better.

The arc UI 602 shows a view of the arc story and provides options to the user, such as adding or removing frames, commenting at the arc level, and seeing insights at the arc level. When the user lands on this page, content may already be available for the user to curate. Some of the icons may have indicators that they need attention (e.g., a yellow alert icon).

At the top of the UI 602, there is a navigation bar 604 that includes a set of action buttons, including an optimize button, a share button, and a publish button. These buttons enable users to optimize the campaign using performance insights, share it with collaborators, or publish the campaign, respectively.

Below the navigation bar, the main content area displays the project title (e.g., "X100 Tent Arc"), followed by a subtitle or description with additional details about the arc, such as the campaign's purpose and goals (e.g., "Launch and drive sales of the x100 All-Weather Tent".)

The UI 602 includes a tabbed navigation section 606 with tabs labeled "Arc," "Curate," and "Pulse," which allow users to switch between different aspects of the campaign management process. The "Arc" tab shows the view of the customer journey story as described above in [0105]. The "Curate" tab shows the feed as described in [1302]. The "Pulse" tab displays performance metrics.

Below the tabbed navigation section 606, there is a campaign flow area 608, which visually represents the sequence of marketing communications planned for the campaign. Each communication is represented by a card 610 that includes a preview of the content, such as "Email 1: Welcome," "SMS 1: Reminder," "Email 2: Consideration," "SMS 2: Reminder2," and "Email 3: Offer." Each card 610 is associated with a status indicator, which shows the current state of the communication, such as draft, scheduled, or sent.

To the left of each card 610, there are action icons that allow users to perform tasks such as editing, duplicating, or deleting the communication. Additionally, a counter may be displayed on the cards, indicating the presence of additional variations of that frame in the arc that are not currently visible in the interface.

At the bottom of the UI 602, there is an interactive prompt 612 with a text field that invites users to input additional actions they wish to perform, with the placeholder text "What else do you want to do?"

The UI 602 is designed to be user-friendly and efficient in managing and executing marketing campaigns. It provides a clear visual representation of the campaign flow and easy access to relevant actions and settings.

The project's images include those created based on a prompt entered by the user and those proactively generated by the FG tool. The campaign plan may include information about the plan objective, project KPIs, configured audiences, and communication channels.

Further, the recommendation for new documents includes documents generated by the FG tool to make them readily available for the project. These documents are part of the feed for available communications. The sample recommendations are described below in more detail with reference to FIG. 7. The FG tool generates recommendations for new documents based on user preferences and campaign context. These recommendations may include blog posts or other relevant content. The FG tool proactively generates these recommendations without the need for user prompts. The generated recommendations aim to assist users in their content-generation efforts and enhance the overall performance of their campaigns.

One or more insights provide information about the performance of the project to date. The project provides a view of all cross-channel content so marketers can see what content each of their different audiences will get.

Figure 7:
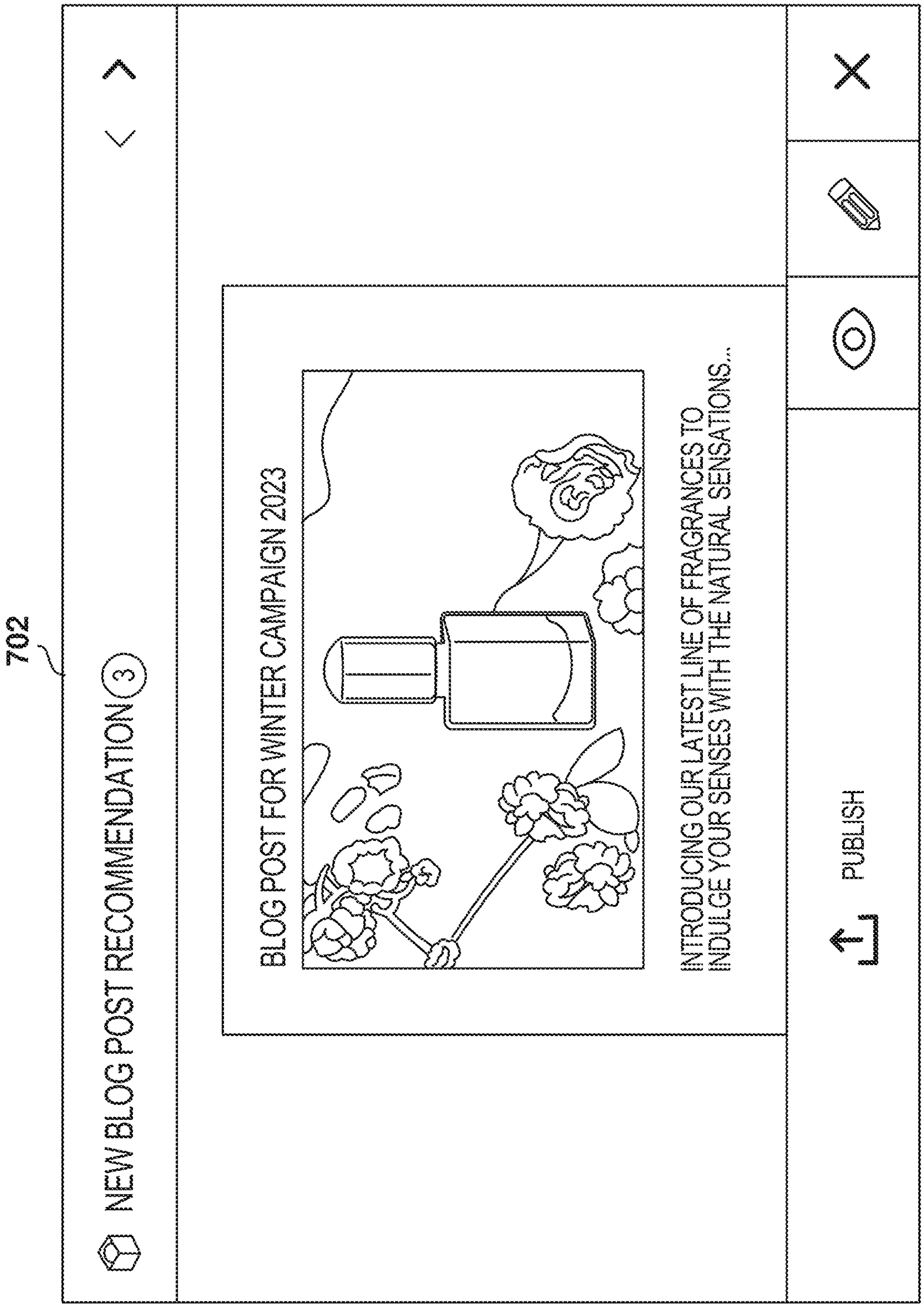
FIG. 7 illustrates an example of a new, proactively generated blog post.

FIG. 7 illustrates an example of a new, proactively generated blog post 702. The example blog post 702 was proactively generated by the FG without receiving a user prompt; that is, the FG generated the blog post 702 based on the project parameters, including channel and audience parameters. The FG may generate different content for different types of audiences and channels.

The blog post 702 includes an image and text accompanying the image to promote a product. The image and text were generated using the respective GAI tools.

Typically, more than one recommendation is generated by the FG, and the user can click on the scroll arrows on the top right to see additional recommendations. Other options allow the user to publish the blog post 702, which will send the blog post 702 to the appropriate audience according to the scaffolding schedule, and an option to edit the text or the image (e.g., requesting that a new image be generated).

Figure 8:
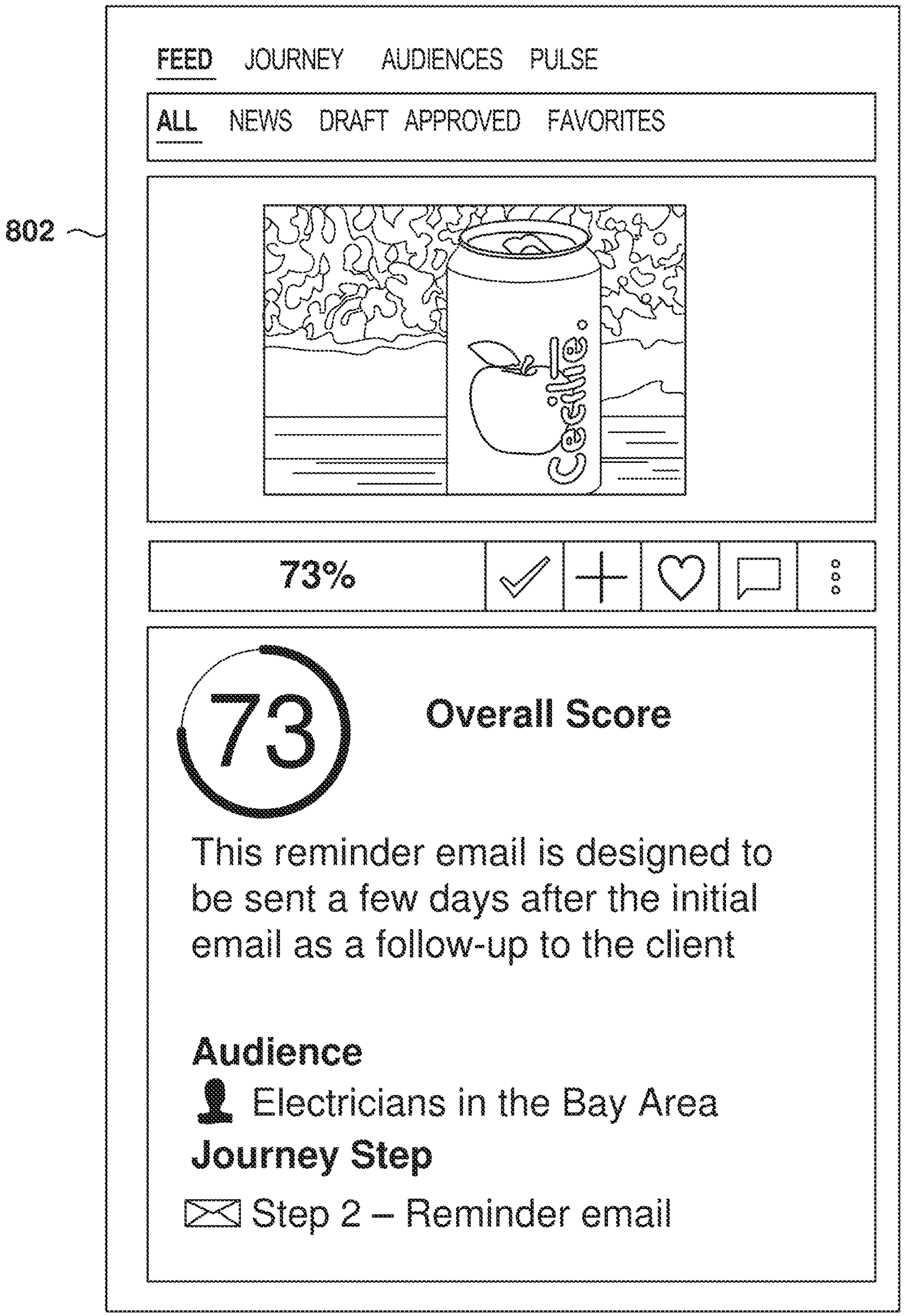
FIG. 8 is a UI for presenting the score of an item in the journey, according to some examples.

FIG. 8 is a UI 802 for presenting the score of an item in the journey, according to some examples. The content of the feed is ranked by confidence score, where the higher the confidence score, the greater the probability that the item will be useful and relevant for the campaign.

The UI 802 shows an item for the feed and its confidence score. In this example, the confidence score is 73 for an item that is part of a journey. The UI 802 shows an image associated with an email to be sent as step 2 in the journey and targeted to an audience that includes Electricians in the Bay Area.

The confidence score allows the user to select those items that FG predicts to have a bigger impact on customers, where the impact may be measured, for example, as the number of users that will respond to the email by selecting a link included in the email.

Figure 9:
FIG. 9 is a UI showing the feed of content, ranked by scores, according to some examples.

FIG. 9 is a UI 902 showing the feed of content, ranked by scores, according to some examples. The UI 902 shows the content of the feed of available items for communications. The selected option is Best Performing 904, so the feed shows the available items ranked according to their performance with uses. Performance is a measurement of the response of users to communications. It is based on one or more of the number of views, percentage of users that selected a link for additional information (e.g., click-through rates), percentage of users that bought the product, etc.

In the disclosed system, after a regeneration process, the generated content is presented to the user. The generated content may include images, blog post recommendations, and social media posts. The generation of this content is based on the information already known by the Alchemist system about the user's company, products, and campaign. The system utilizes past performance data to generate content that is tailored to the user's needs.

The system allows the user to take various actions on the generated content, such as publishing, reviewing, editing, or rejecting it. The user may be presented with multiple options for new blogs or other types of social media content, such as Instagram posts or email recommendations.

The feed allows users to review and take proactive actions on the generated content, such as approving, rejecting, adding to ongoing campaigns, creating variations, editing, and incorporating into the system.

After a goal is provided, the FG quickly curates high-quality, on-brand content in the form of a feed that is ranked based on the objective and personalized across channels and geographies for each audience. The underlying implementation is a semantic graph.

Feed Design & Implementation

A feed of multi-modal content includes emails, images, blog posts, social media posts, text blocks, email subject lines, etc.

Filters based on predicted content performance (some form of a confidence score), channels, audiences, and other attributes like colors.

Dynamic Feed—A feed is a "container" that can be a dynamically generated logical grouping of content based on filters applied. One way to think about the grouping construct is a photo app that supports albums. A photo can be in one or more albums. The album can be created by a human or can be auto-created by AI. Similarly, a piece of content can live in one or more feeds. The feed can be created by a user (by applying filters) or dynamically created by AI.

There are several reasons to create a feed. With feeds, a user can deliver the 'Best Next Message' to engage audiences. Feeds are personalized and ranked for each audience to help you connect with your customers. Insights from the performance of live content help you optimize and dynamically adjust the content in real time. Also, with feeds, the user may tell unlimited stories to the different audiences because there is always something new for the audiences to see.

Additionally, feeds tell a cohesive story across all channels. Feeds deliver the best next message a member should see, regardless of channel, and help the user observe a complete view of everything that an audience segment may see across the channels. Feeds can also inspire users because feeds offer visual discovery and brand-personalized inspiration, sparking user interest and creativity through a large amount of content. The user may create a feed with a single prompt and brand assets and then get creative with the possibilities offered by the feed.

After the feed is created, the content can be delivered in many ways, such as:

- Publish to social media: Users can auto-publish approved content directly to social media channels. Users can use CGS Assistants or plugin feeds in existing tools.
- Connect to email automation systems: The user can connect email automation systems and in-house marketing platforms to fetch content from a feed directly. For example, during render time, email platforms can fetch and embed a piece of content (like a subject line, pre-header, body copy, image, etc.) for each specific audience. The user may also use the CGS email assistant to manually publish an email into a system like Salesforce Content Builder or Microsoft Dynamics 365.
- Audience-level personalization on the web: the user can dynamically serve highly personalized content to each visitor on a website by plugging in a feed. On page load, the feed is queried to get the most relevant content for a visitor and display it on the web page.
- Distribute through Customer Journey Orchestrators.

The user and the CGS can create items and curate the feed. Based on a goal the user specifies, a team of specialized AI assistants generates and curates relevant content for each of the audiences. The user can also manually add or modify content in the feed. Once a campaign is live, the AI assistants proactively create, curate, and suggest content items based on the monitoring of the performance of existing content.

The user controls what appears in the feed for each audience and can further tailor and make the experience more engaging for each user. The user may add content to a feed or request that the FG generate more content to be added to the feed.

Further, when content is added to the feed, that piece of content is ranked along with others in the feed based on predicted performance. Items in the feed are ranked based on the goal of the feed and the likelihood (e.g., probability) of each item achieving the goal. For example, FG looks at the historical performance of content as a signal when generating new content. In addition, each piece of generated or curated content is assigned a confidence score, and the confidence scores are used to rank the items in the feed.

The confidence score is based on the goal specified when creating the project. This is calculated by evaluating and scoring against a set of criteria (e.g., adherence to brand guidelines, relevancy, match for specified audiences, etc.). However, the user can manually change the ranking of any item to control what audiences will see.

The user can configure feed settings that determine how the feed operates, including generating content, ranking content, etc. For example, the user may configure a default state of new items in the feed (draft or approved); items created as "draft" will require user approval before they are distributed. If this setting is set to "approved," new items added will immediately be available for consumption.

Another feed parameter is to configure how to handle requests for items that do not exist (default or generate); the user can configure a feed to return a default value or to generate a piece of content on the fly. Another feed parameter is to configure a mode for removing items from the feed (e.g., remove items automatically that are more than a month old, remove items automatically that are not performing well, remove items that have not been used for a predetermined period, etc.).

Figure 10A:
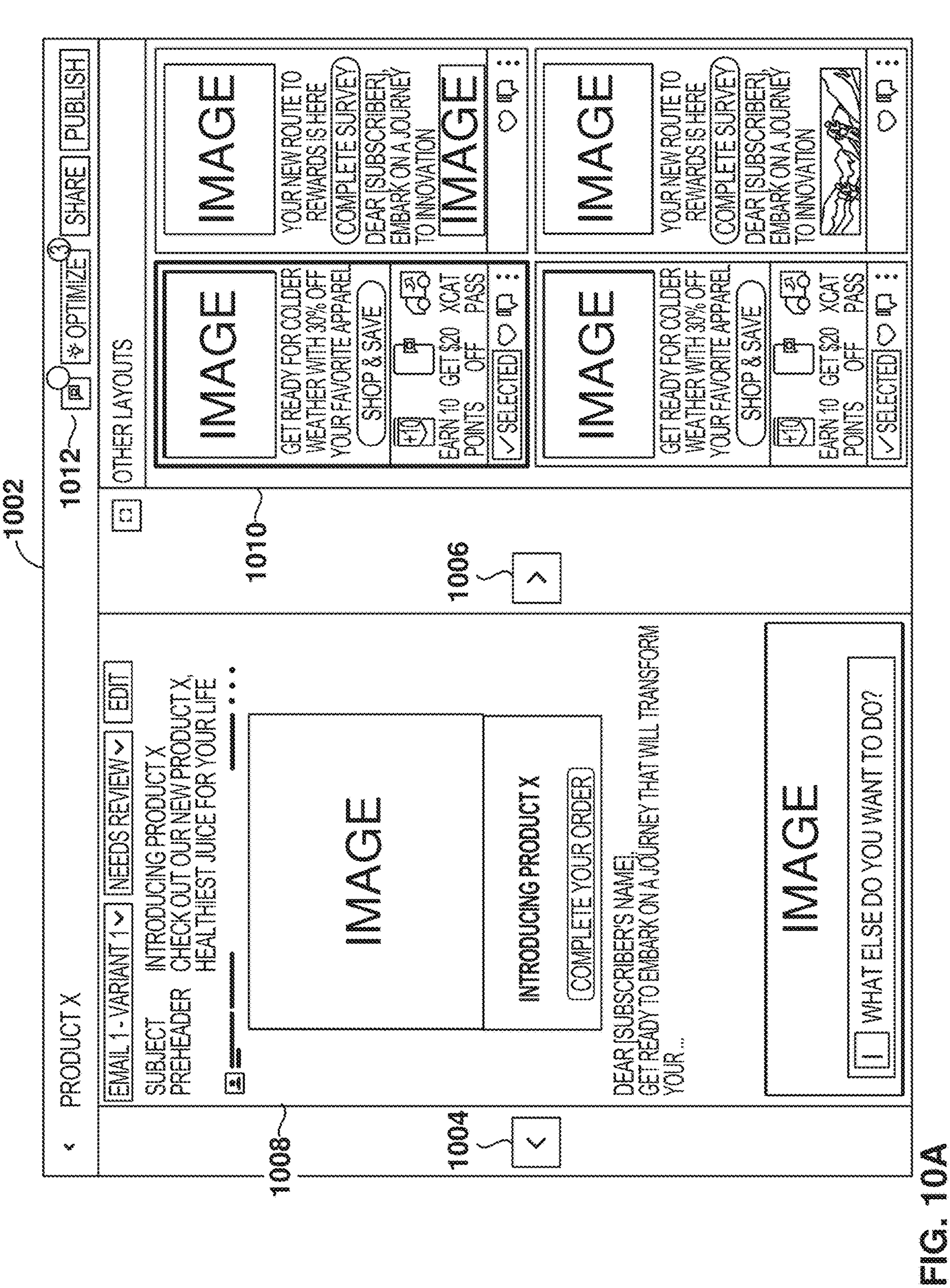
FIG. 10A is an example of a UI to curate content for a customer journey.

FIG. 10A is an example of a UI 1002 to curate content for a feed, according to some examples. The UI 1002 shows the content that a specific audience will see. The UI 1002 provides options to curate content for each step in the journey.

In the illustrated example, the UI 1002 presents an email template as part of a customer journey campaign. The UI 1002 includes an email template 1008 titled "Email 1-Variant 1," which is currently marked with a status indicator "Needs review." Adjacent to the status indicator is an "Edit" button, allowing the user to make modifications to the email template 1008. Further, the email template 1008 includes a prominent image of an image for the campaign (e.g., a tent in a snowy landscape, with the heading "Introducing Cecilie Juice") and a subheading, e.g., "The smarter way to a healthy life." Below the headings, the email template 1008 shows a call-to-action button labeled "Complete your order."

The body of the email template is presented below in the preview area. In this example, the body of the email contains a personalized greeting text addressing the recipient by name, followed by a marketing message encouraging the recipient to embark on a journey that will transform their coffee experience. The message introduces a new machine to enhance the coffee experience and invites the recipient to include a daily cup of a new beverage in their routine. At the bottom of the email template 1008, there is an interactive query, "What else do you want to do?" with a response field for the recipient to engage with.

To the right of the email template 1008, the UI 1002 includes a secondary display area 1010 that presents alternative generated email options for the email template under the heading "Other layouts." This secondary display area 1010 features multiple thumbnail previews of different email layouts, each with a unique design and content arrangement. For example, one of the thumbnails is highlighted with a "Selected" label, indicating the current choice of the user. Each thumbnail preview includes a visual representation of the email content, such as images, text, and call-to-action buttons, and is accompanied by interactive elements such as a heart icon for favoriting, a comment icon, and a numerical indicator of the number of comments received.

Clicking on a frame in the secondary display area 1010 would select that specific generation and display it in the preview area on the left. Further, the UI 1002 provides the option for quick preview of other frames, e.g., by clicking on the left and right buttons to cycle through the different frames.

At the top of the user interface, there are additional control options 1012, including "Optimize," "Share," and "Publish" buttons, which provide the user with the ability to optimize the email content, share the template with collaborators, or publish the email as part of the customer journey campaign.

Further, the UI 1002 presents the status of each node and some collaboration features, e.g., who the content is assigned to, who reviewed the content, who approved the content, and who edited the content. The UI 1002 is designed to facilitate the easy selection and editing of email templates within a customer journey, providing a streamlined and intuitive experience for the user to customize and deploy marketing communications.

Figure 10B:
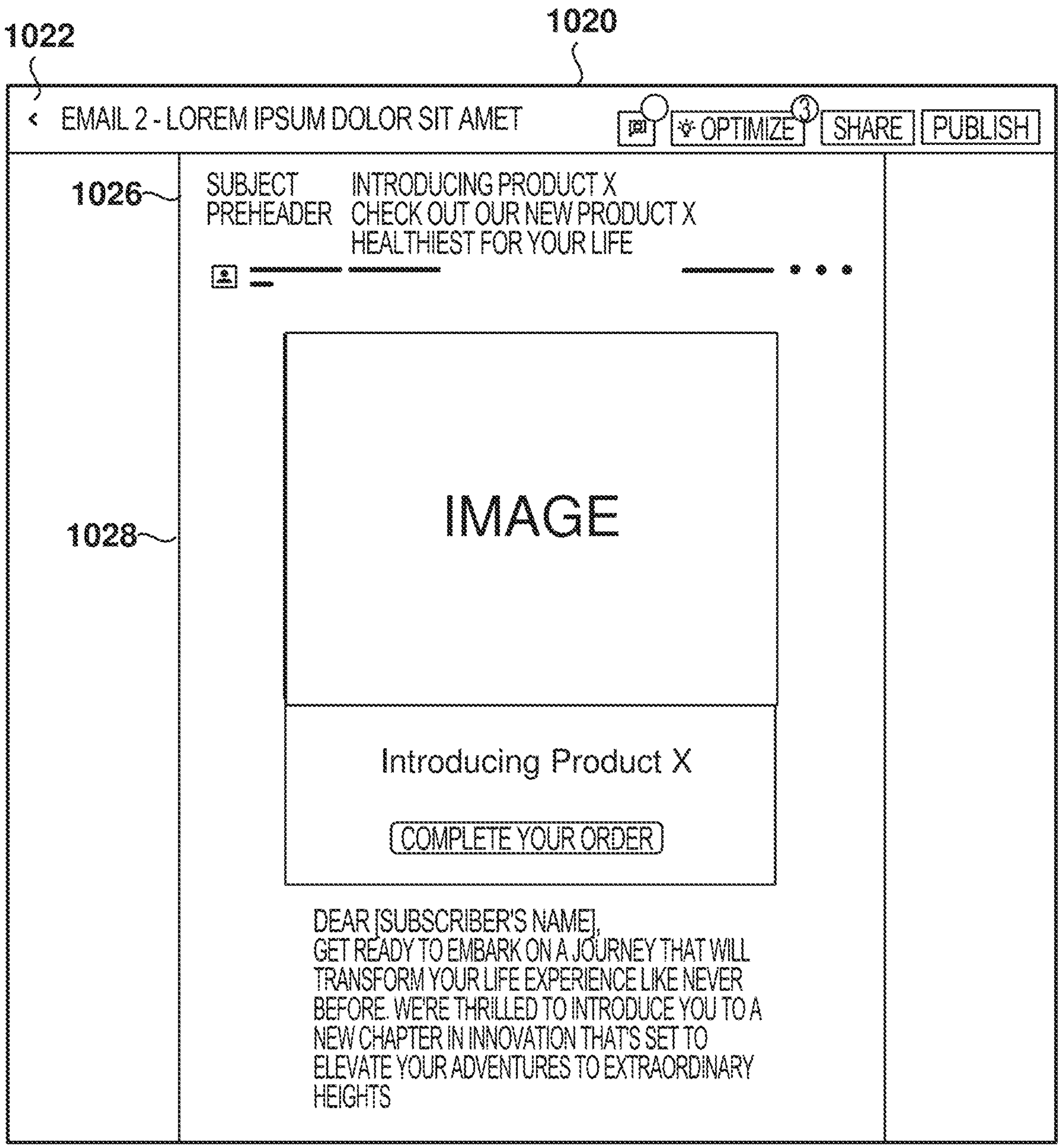
FIG. 10B is a UI to edit multimodal content according to some examples.

FIG. 10B shows a UI 1020 for editing multimodal content according to some examples. The UI 1020 lets marketers use the content-management tool to edit the created content and is designed to facilitate the creation, modification, and publication of multimedia content, such as email marketing materials.

The UI 1020 includes a navigation bar 1022 at the top of the interface, which contains backward 1004 and forward 1006 navigation controls, allowing the user to navigate through different content items. Adjacent to the navigation controls is a content identifier, which provides a title for the current content being edited. The navigation bar 1022 also includes several interactive elements, such as an "Optimize" button, a "Share" button, and a "Publish" button, which allow the user to optimize the content for different platforms, share the content with others for review or collaboration, and publish the content when it is ready, respectively.

The main editing area of the UI 1020 is divided into several sections. The upper section contains an area 1026 with a subject field labeled "Subject" and a preheader field labeled "Preheader," which allow the user to input and edit the subject line and preheader text of the email content, respectively. In this example, the subject field displays the text "Introducing Cecilie Juice," and the preheader field contains the text "Check out our new apple juice, the healthiest juice in the market."

Below the subject and preheader fields is the content editing area 1028, which displays the multimodal content to be edited. This area includes a visual representation of the email, featuring a prominent image (e.g., a tent in a snowy landscape), followed by a headline (e.g., "Introducing Cecilie Juice,") a subheadline (e.g., "The smarter way to a healthy life,") and a call-to-action button labeled "Complete your order." Additionally, the content editing area 1028 includes a text block with placeholder text for the recipient (e.g., "Dear [Subscriber's Name]"), followed by a message body that can be edited by the user.

The user interface is designed with a clean and intuitive layout, ensuring ease of use for content creators while providing powerful tools for editing and managing multimodal content. The interface elements are arranged to provide a logical workflow from content creation to publication.

Figure 11:
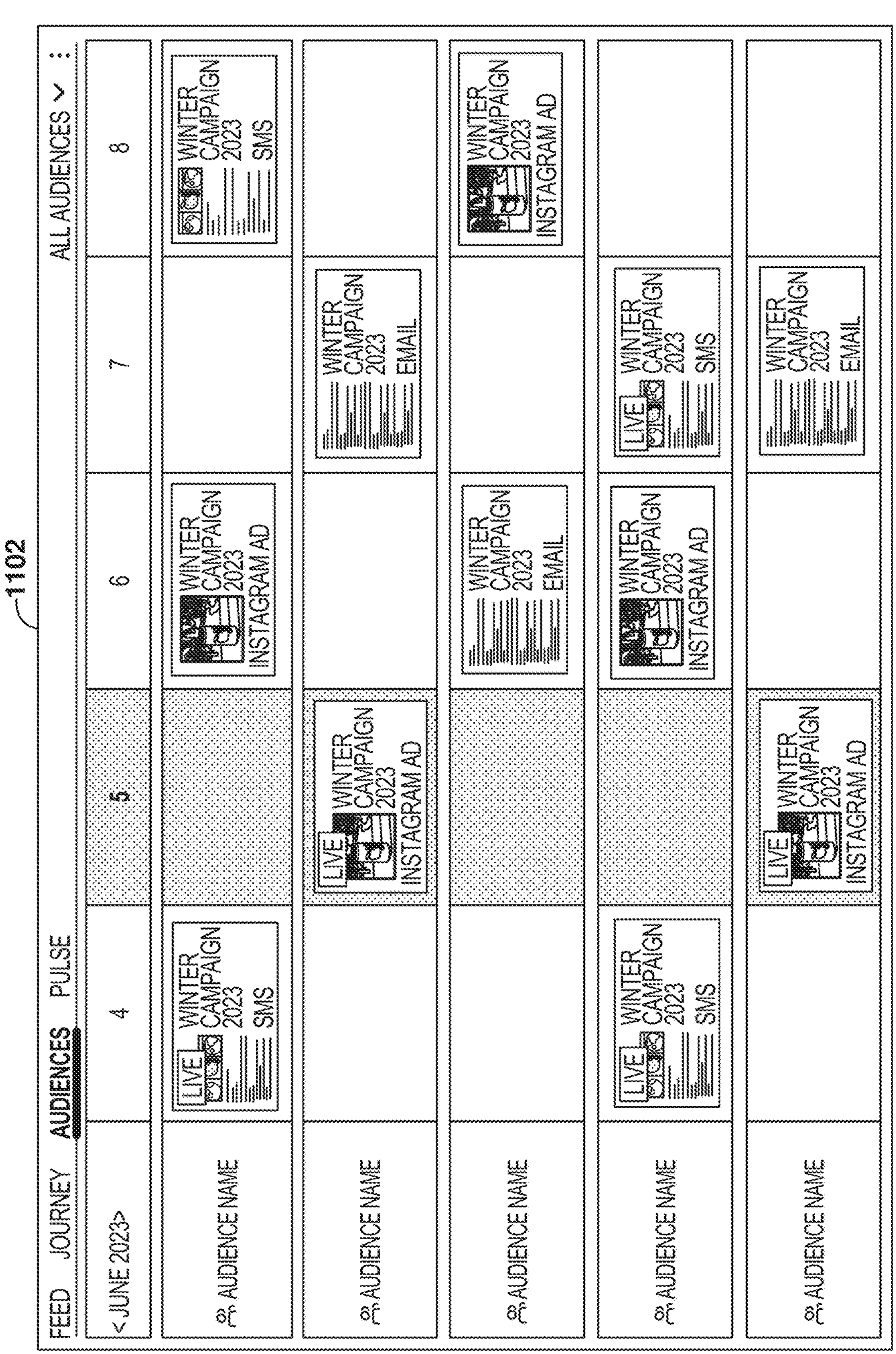
FIG. 11 is an example of a UI to present an audience-centric view of the content for a date-based campaign.

FIG. 11 is an example of a UI 1002 to present an audience-centric view of the content for a date-based campaign. The UI 1102 shows the content, organized by audience, that each particular audience will see. The table is organized by calendar date, with each column for a different day, and each row of the table shows the communications planned or delivered for each day for each particular audience.

The system enables users to set up experiments and analyze the results based on different segments. The system provides insights and recommendations for improving audience engagement. Users can compare existing content with new alternatives and make informed decisions based on the recommendations provided. The system also allows users to view recommendations for blog posts, product ads, and other content types. Users can access detailed information about each recommendation and perform relevant actions.

Further, the FG facilitates an iterative improvement loop where users can configure and select content specifically tailored to different audience segments. By analyzing the performance of different content variations, users can optimize their marketing strategies and enhance audience engagement.

Figure 12:
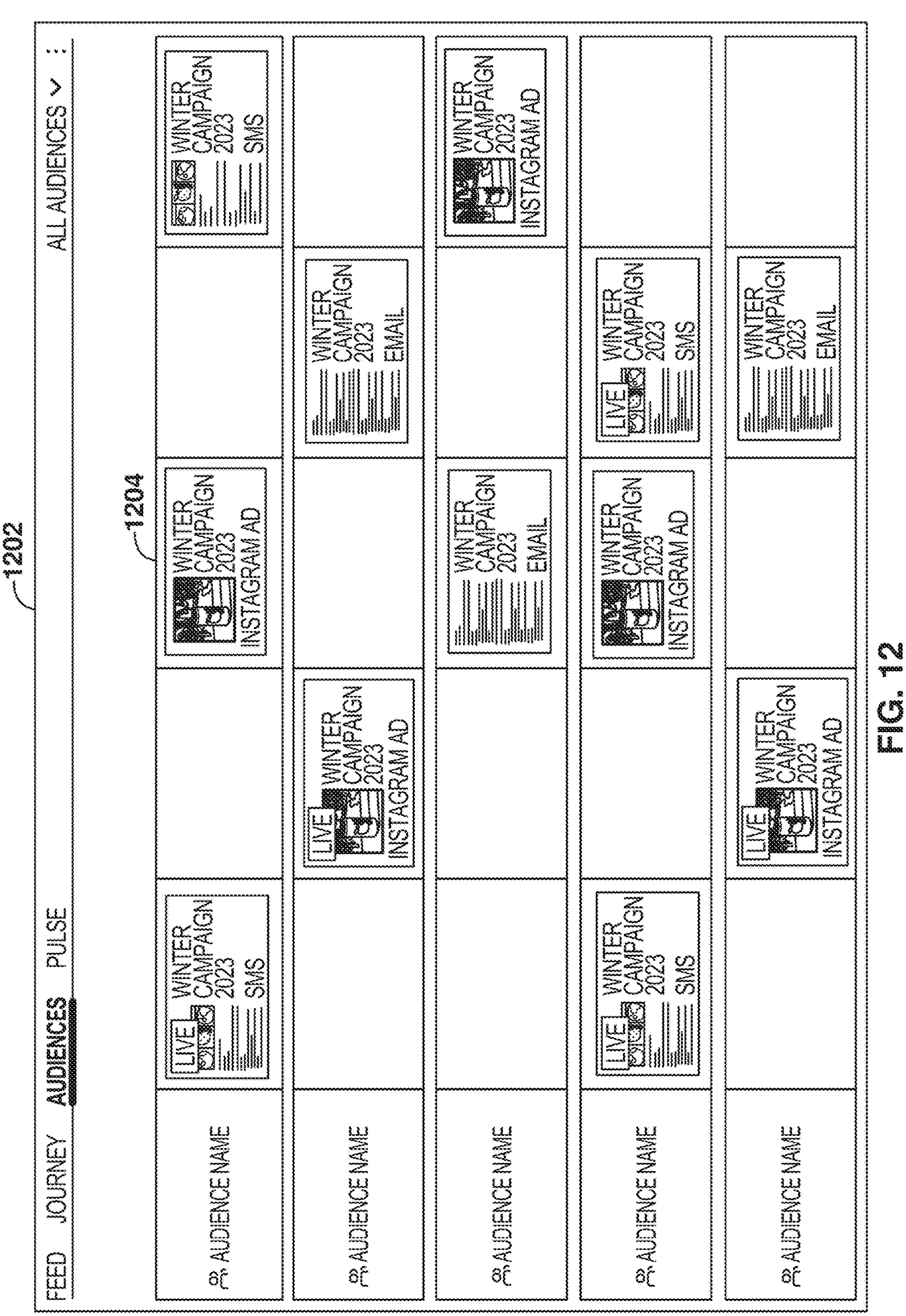
FIG. 12 is an example of a UI to present an audience-centric view of the content for an always-on customer journey.

FIG. 12 is an example of a UI 1202 to present an audience-centric view of the content for an always-on customer journey. The information is organized by audience in each row, and the communications that are part of the campaign are shown.

Each communication is represented by a tile 1204, and selecting a particular tile 1204 (e.g., clicking on the tile 1204 or hungering a mouse over the tile 1204) will provide additional details about the communication, such as whether the communication is live or being planned, a percentage of users engaging with the communication, the number of messages sent, the dates where the communications are sent, etc.

Figure 13:
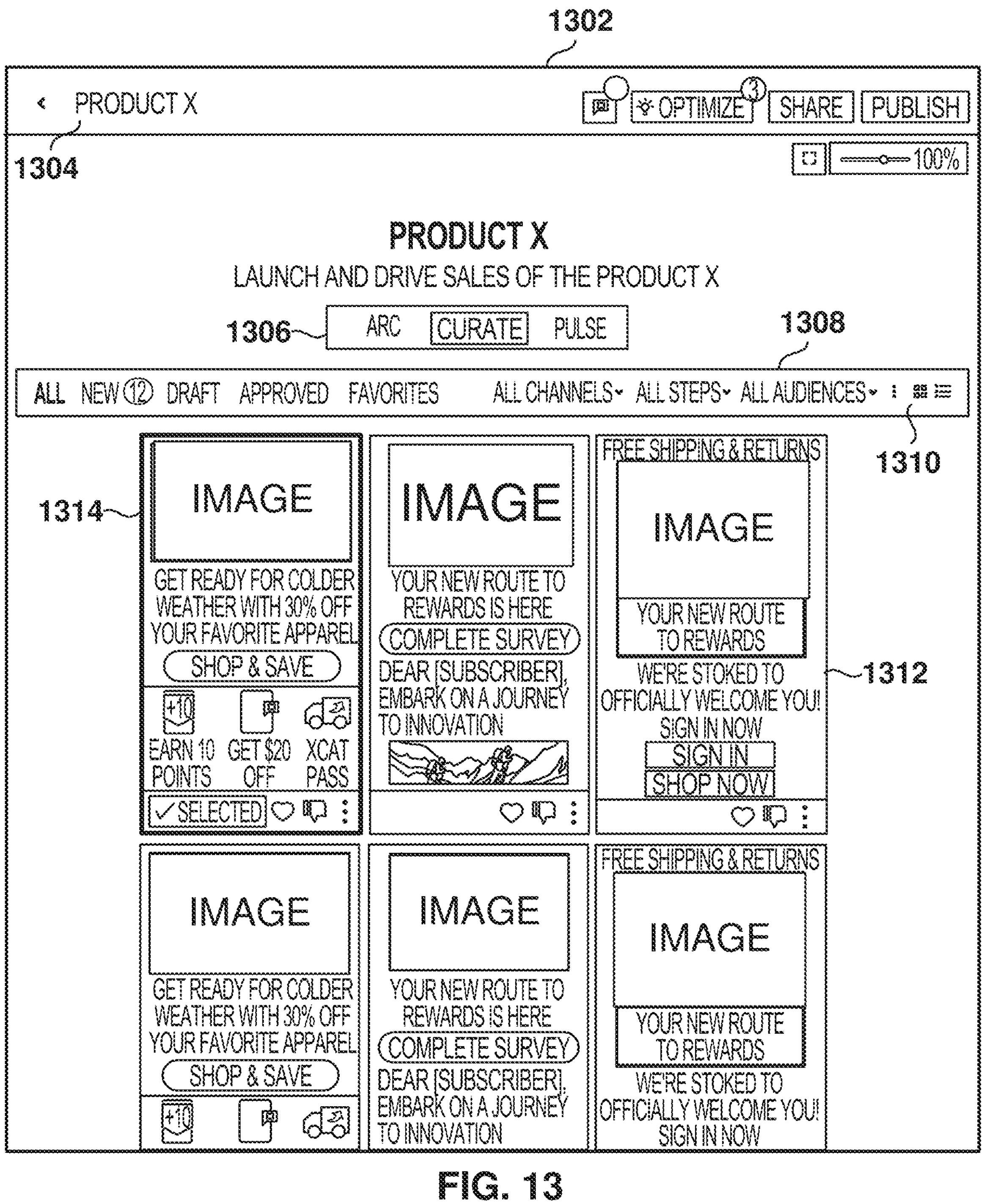
FIG. 13 is an example of a UI to add content to view all the content generated for a in a feed.

FIG. 13 is an example of a UI 1302 to add content to view all the content generated for a in a feed. Users can see all content in a feed and review it (for example, to make sure it aligns with their brand guidelines).

At the top of the UI 1302, there is a navigation bar 1304 that includes a title of the current section (e.g., "x100 Tent Arc") and a set of action buttons including "Optimize," "Share," and "Publish."

Below the navigation bar 1304, the main title is prominently displayed (e.g., "x100 Tent Arc"), followed by a subtitle that describes the purpose of the section (e.g., "Launch and drive sales of the x100 All-Weather Tent") beneath the title. Further, three tab options 1306 "Arc," "Curate," and "Pulse" are presented, which allow the user to switch between different functionalities of the UI 1002.

The central portion of the UI 1002 is for the content management area 1308, which is divided into a filter bar 1310 and a content display grid 1312. The filter bar 1310 includes a series of selectable filters such as "All," "New," "Draft," "Approved," "Favorites," a filter icon, and drop-down menus for "All channels," "All steps," and "All audiences." These filters enable the user to refine the content displayed in the grid below.

The content display grid 1312 presents a collection of content cards 1314, each representing a piece of digital content. Each content card 1314 includes a thumbnail image, a content title, and a brief description. Additionally, each content card 1314 has a status indicator (e.g., "New" or "Selected") and a set of interactive icons for actions like "Add to frame," "Like," "Dismiss," and "More Options." The content cards 1314 are arranged in a manner that allows the user to browse and select content for further editing or publication easily.

The UI 1302 is designed to provide a user-friendly and efficient environment for content managers to oversee the development and distribution of marketing materials across various stages of a customer journey. The combination of filtering options, content previews, and actionable icons creates a streamlined workflow for users to curate and publish content effectively.

Figure 14A:
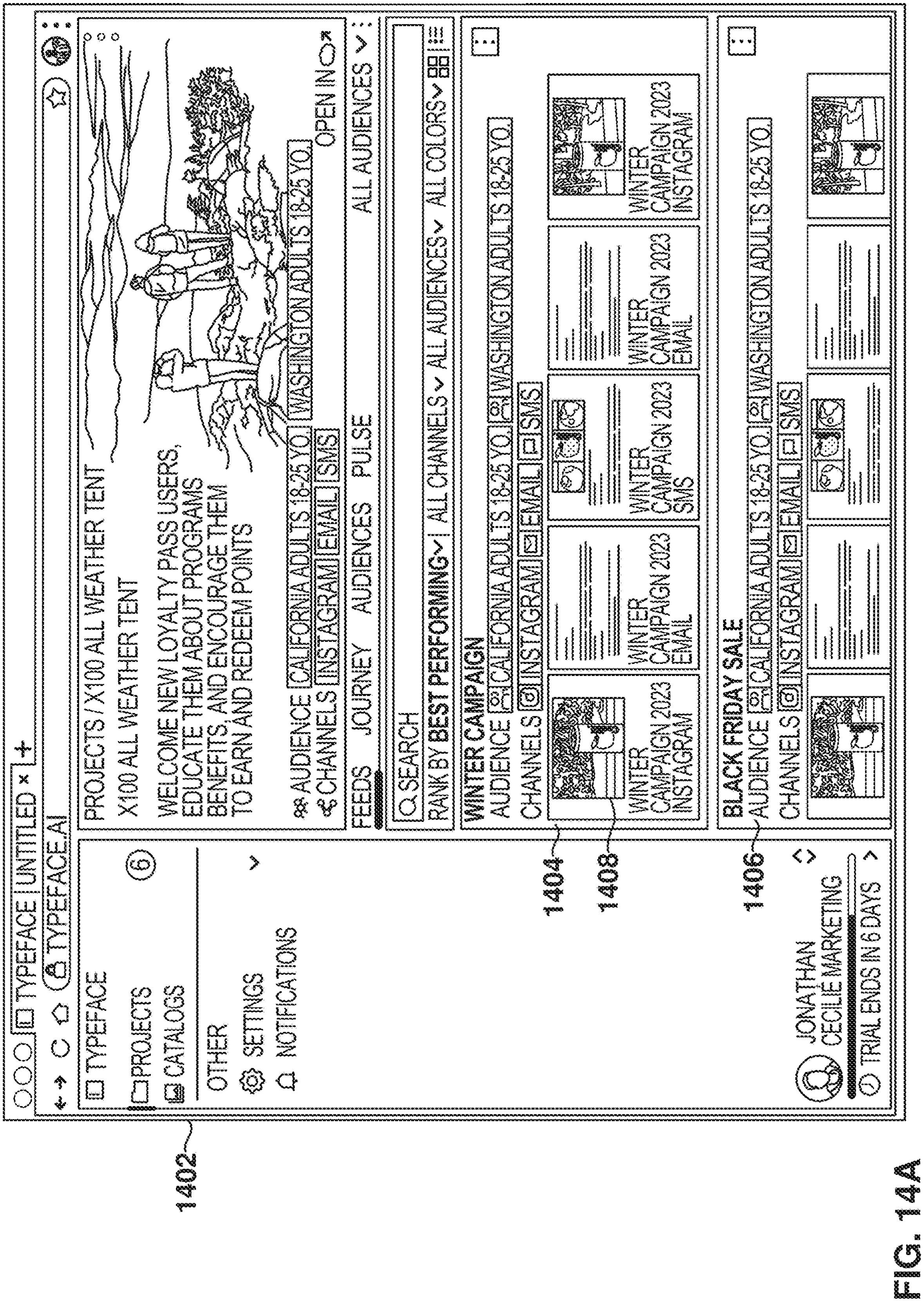
FIG. 14A is an example of a project with multiple feeds.

FIG. 14A is an example of a project with multiple feeds. The UI 1402 is for presenting feeds, and one or more feeds are presented. In the illustrated example, one project includes feed 1404, titled Winter Campaign, and feed 1406, titled Black Friday Sale.

Within each feed, details are presented, such as the audience selected (e.g., 18-25-year-old people), channels used (e.g., Instagram, email, SMS), and a list of communications 1408.

Figure 14B:
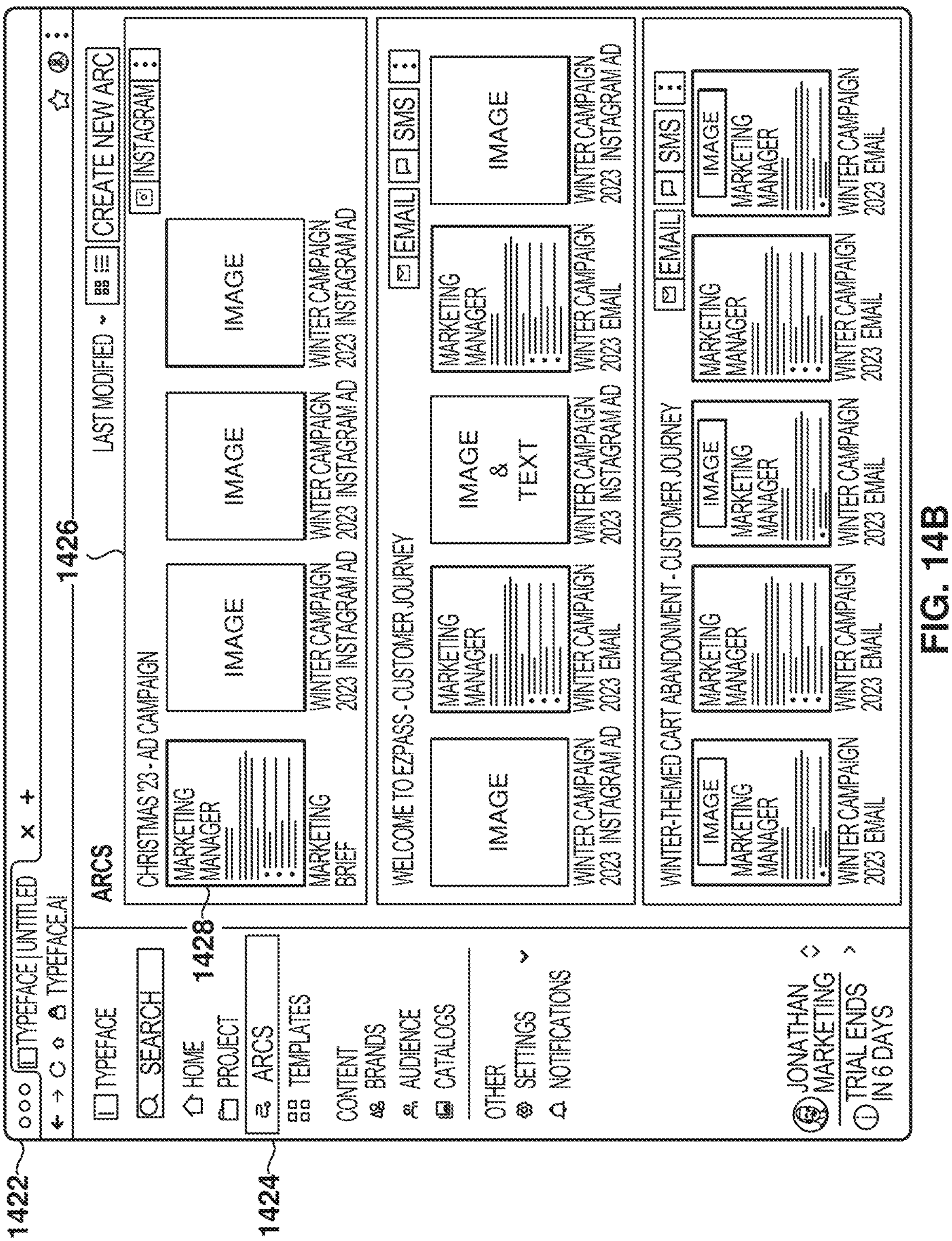
FIG. 14B shows an example of a UI with a list of Arcs for the creation and publication of content, according to some examples.

FIG. 14B shows an example of a UI 1422 with a list of Arcs for the creation and publication of content, according to some examples. The UI 1422 includes a tab named "Arcs," and the UI 1422 shows the interface when this option is selected. The main area of the UI 1422 is divided into two primary sections: a navigation sidebar 1424 on the left and a content management area 1426 on the right.

The navigation sidebar 1424 includes a search bar for querying content within the system. Below the search bar, a series of navigation options are provided, including "Home," "Projects," "Arcs," "Templates," "Brands," "Audiences," and "Catalogs." At the bottom of the navigation sidebar 1424, additional options for "Settings" and "Notifications" are available. A user profile section displaying the user's name is located at the very bottom of the sidebar.

The content management area 1426 is titled "Arcs" to indicate that this is the selected option in the navigation sidebar 1424 and includes a "Last modified" sorting option and a "Create New Arc" button for initiating the creation of new content arcs.

Below the header, the content management area 1426 displays a series of content blocks 1428, each representing a different content arc. These content arcs can be of different types including ad campaigns and customer journeys, as indicated by titles such as "Christmas '23—Ad campaign", "Welcome to Explr Pass—Customer Journey," and "Winter-themed cart abandonment—Customer Journey."

Each content block 1428 includes a thumbnail preview of the content, a title, and a brief description. Additionally, some blocks display icons indicating the platforms on which the content will be published, such as "Instagram," "Email," or "SMS". Some content blocks also include a "+2" indicator, suggesting additional content items are associated with that block but not currently visible.

The UI 1422 is designed to provide a user-friendly and efficient workflow for managing various content arcs, from creation to publication, across multiple platforms and campaigns. The arrangement of elements allows for easy navigation, quick access to important functions, and a clear overview of ongoing content strategies.

Figure 14C:
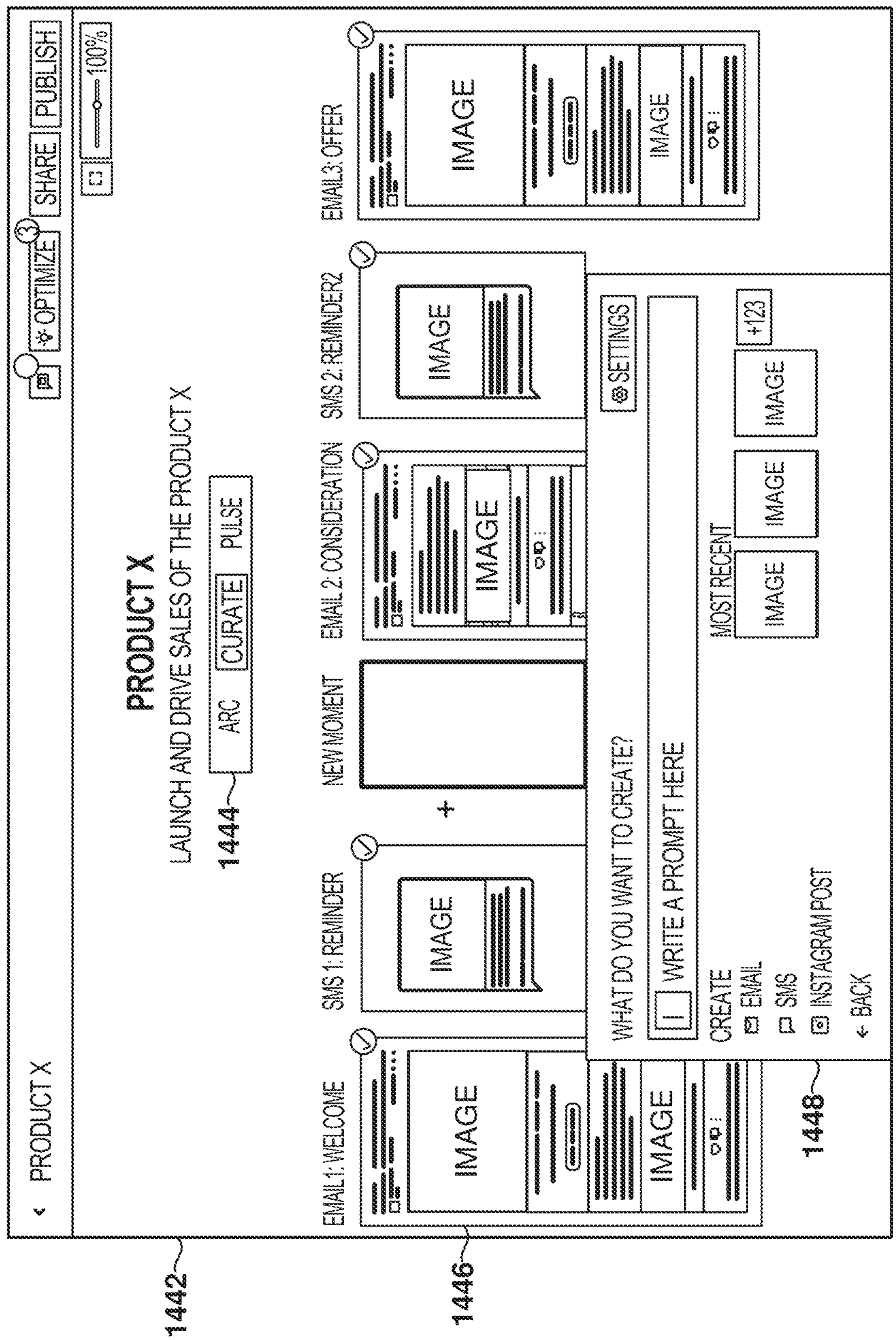
FIG. 14C illustrates the creation of a new content frame in the arc using the copilot, according to some examples.

FIG. 14C illustrates the creation of a new content frame in the arc using the copilot, according to some examples. The UI 1442 provides options for creating and configuring a content arc.

At the top of the UI 1442, the title (e.g., "x100 Tent Arc") is prominently displayed, indicating the current project or campaign focus. Below the title, a descriptive tagline (e.g., "Launch and drive sales of the x100 All-Weather Tent") is provided to give additional context for the user regarding the purpose of the arc.

The UI 1442 also includes navigation tabs 1444 labeled "Arc," "Curate," and "Pulse" situated directly below the title and tagline. These navigation tabs 1444 allow the user to switch between different aspects of the campaign management process.

Below the navigation tabs, a series of content cards 1446 are arranged horizontally, representing different communication moments within the arc. In the illustrated example, the content cards 1446 include several cards associated with the arc, such as "Email 1: Welcome," "SMS 1: Reminder," "New Moment," "Email 2: Consideration," "SMS 2: Reminder2," and "Email 3: Offer." Each content card 1446 may include a visual thumbnail preview of the content and a status indicator, represented by a green checkmark, signifying the completion or active status of the activity in the arc.

A "New Frame" card is selectable to add a new content frame to the arc. If the new-frame option is selected, a prompt box 1448 is presented with the placeholder text "What do you want to create?" to enable the user to input a description or title for the new moment they wish to create.

The prompt box 1448 includes options labeled "Email," "SMS," and "Instagram Post" to allow the user to specify the type of content they intend to create for the new moment.

Figure 15:
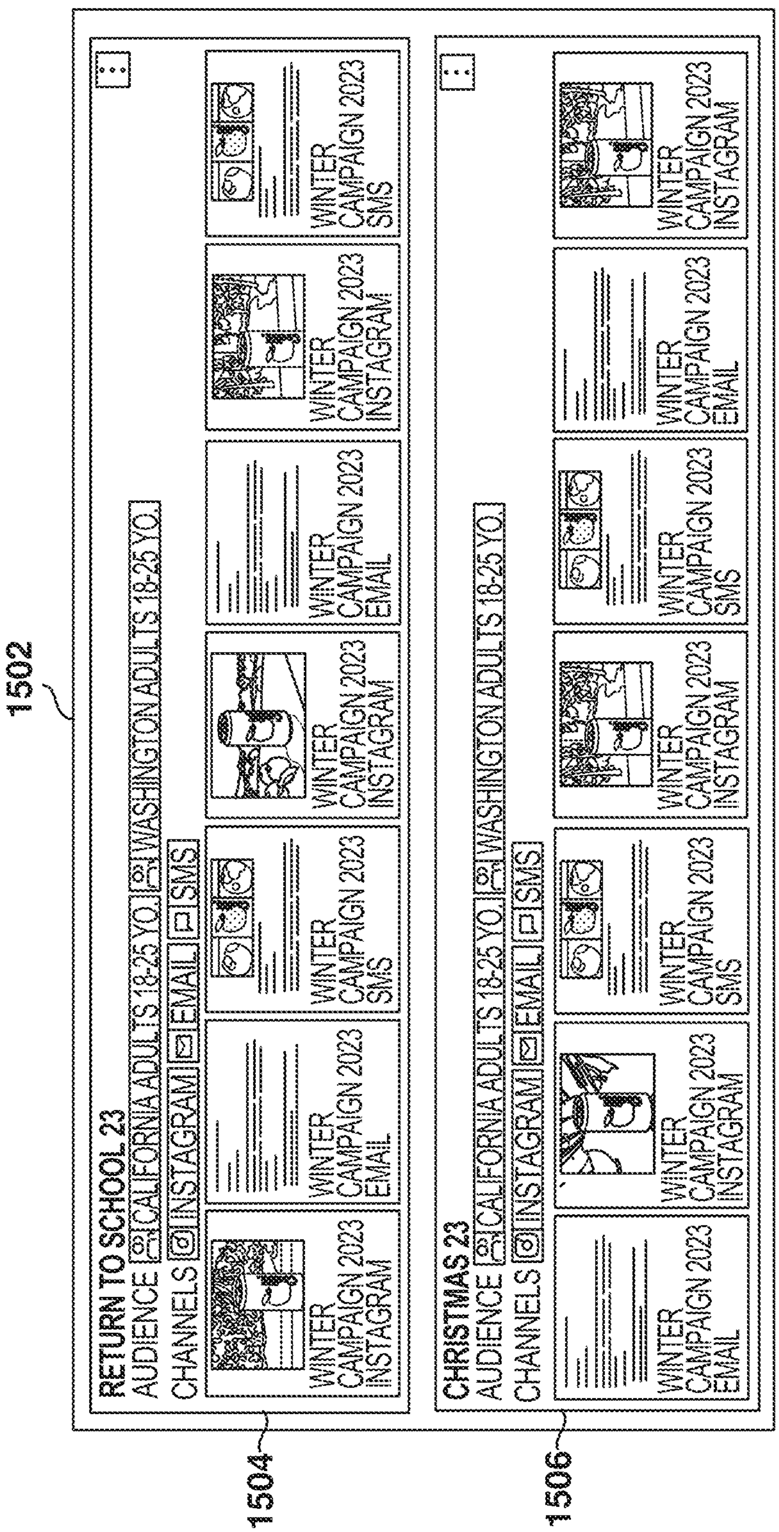
FIG. 15 is an example of two feeds for one or more audiences across one or more channels.

FIG. 15 is an example of two feeds for one or more audiences across one or more channels. The UI 1502 shows feed 1504 and feed 1506, which have content for one or more audiences across one or more channels.

In the illustrated example, feed 1504 includes two target audiences: California adults 18-25 years old and Washington adults 18-25 years old. Other examples may include more than two audiences configured for the same content. Additionally, feed 1504 also includes communications for different channels, such as Instagram, email, SMS, etc.

A feed can contain content for one or more audiences across one or more channels. For example, one feed could be for email messages and multiple audiences, and another feed can be for web and email communications for multiple audiences.

Figure 16A:
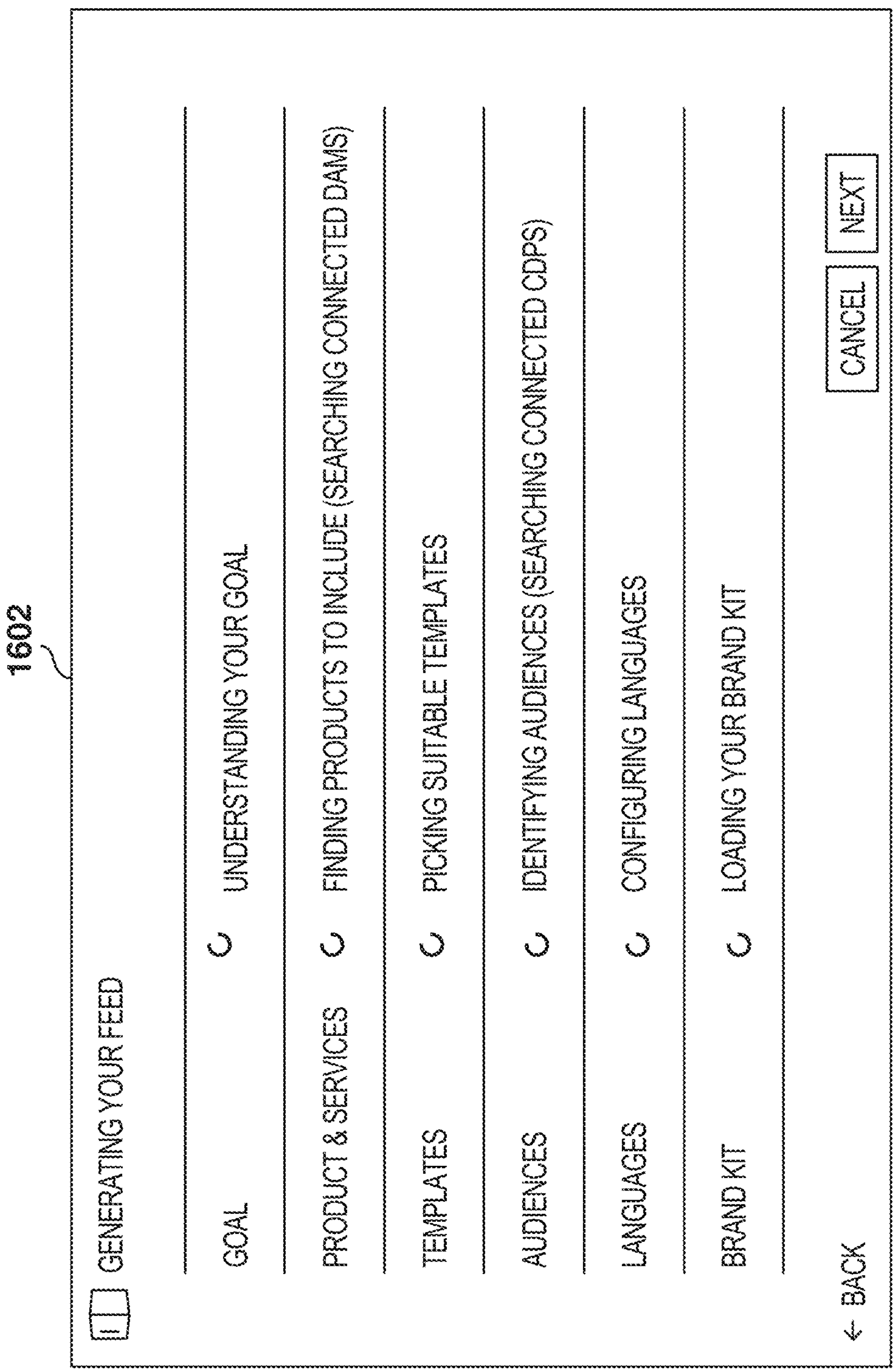
FIG. 16A illustrates the beginning of the process to create a feed, according to some examples.

FIG. 16A illustrates the beginning of the process to create a feed, according to some examples. In some examples, the content-generation tool identifies suitable options to create the feed and presents them to the user, who may then modify the suggestions.

After the user provides a goal to create a new journey or connects to an existing journey in a third-party system (e.g., Salesforce Journey Builder, Microsoft Dynamics Customer Insights), the content-generation tool sets up the arc using the connected context. The content-generation tool searches for suitable products in connected digital asset management systems identifies different steps in the journey, loads suitable templates, and searches for suitable audiences through connected Customer Data Platforms.

The UI 1602 is designed to guide the user through the initial steps of generating the feed by presenting a series of information fields and options. At the top of the interface, a header section with the title "Generating your feed" is displayed.

The main content area of UI 1602 is organized into a list of sequential tasks, each accompanied by a corresponding icon that suggests the action to be taken or the status of the step. In the illustrated example, the tasks include "Goal," "Products & Services," "Templates," "Audiences," "Languages," and "Brand Kit." Each task includes a circular icon indicating that the content-generation tool is performing the corresponding task.

The "Goal" task includes a subtext, "Understanding your goal," indicating the purpose or objective of the feed creation process. The "Product & Services" includes a subtext "Finding products to include (searching connected DAMs)," which implies that the content-generation tool is searching for products for the feed.

The "Templates" task includes a subtext, "Picking suitable templates," indicating that the content-generation tool is looking for a template from various predefined templates for the feed. The "Audiences" task includes a subtext "Identifying audiences (searching connected CDPs)," indicating the search for a target audience.

The "Languages" task includes a subtext, "Configuring languages," which allows the user to set the languages in which to create content in the feed. The "Brand Kit" task includes a subtext, "Loading your brand kit," which refers to customizing the feed with brand-specific elements.

At the bottom of the interface, a navigation bar includes two buttons: "Back," which allows the user to navigate to the previous step in the process, and "Next," which enables progression to the subsequent step. Additionally, a "Cancel" button is provided, offering the user the option to terminate the feed creation process at any point.

The interface is designed with a clean and straightforward layout, utilizing a color scheme that contrasts the text and icons against the background for clear visibility. The use of icons next to each step provides a visual cue to the user, enhancing the user experience by making the process more intuitive.

Figure 16B:
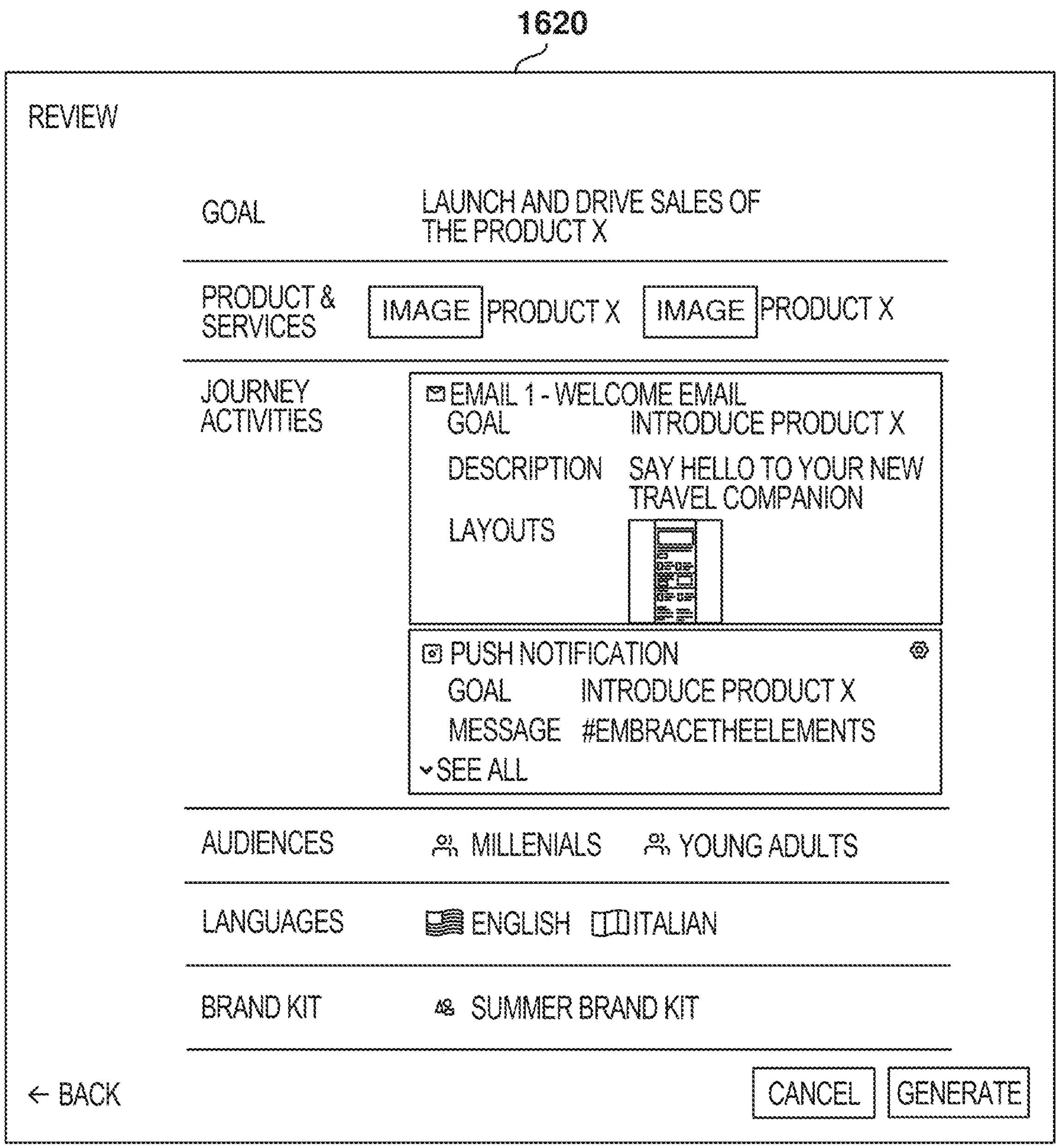
FIG. 16B shows a UI with options to review and modify selections for the feed.

FIG. 16B shows a UI 1620 with options to review and modify feed selections created for a customer journey. The content-generation tool presents the items identified for the feed, and the UI 1620 enables the user to review or modify the suggestions for the marketing campaign feed. The UI 1620's title, "Review," is displayed at the top, indicating that the user is in the review stage of the campaign setup process.

The UI presents the same tasks described above with reference to FIG. 16A and the values proposed by the content-generation tool. In the illustrated example, the "Goal" task displays the campaign's objective, which in this case is "Launch and drive sales of the X100 All-Weather Tent."

The "Product & Services" task includes two versions of the product "X100 Tent" and allows the user to review and potentially modify the products or services being promoted in the campaign.

The "Journey Activities" task includes entries such as "Email 1—Welcome email" with details like the goal "Introduce X100 Tent" and a brief tag description "Say hello to your new Travel companion." Additionally, a visual representation of the email layout is provided. Another entry, "Push Notification," is shown with the goal "Introduce X100 Tent" and the hashtag "#EmbraceTheElements." A pull-down menu labeled "See all" allows the user to expand the list to view additional activities.

The "Audiences" task shows two suggested audience segments: "Millennials" and "Young Adults," indicating the demographic groups the campaign is intended to reach. The "Languages" suggests "English" and "Italian" as languages for the communications. The "Brand Kit" task suggests a kit labeled "Summer rand Kit," which refers to a set of branding materials or themes to be used in the campaign.

At the bottom of UI 1620, navigation and action buttons are provided: a "Back" button, a "Cancel" button, and a "Generate" button, which allows the user to proceed with the campaign generation based on the selections.

Figure 17A:
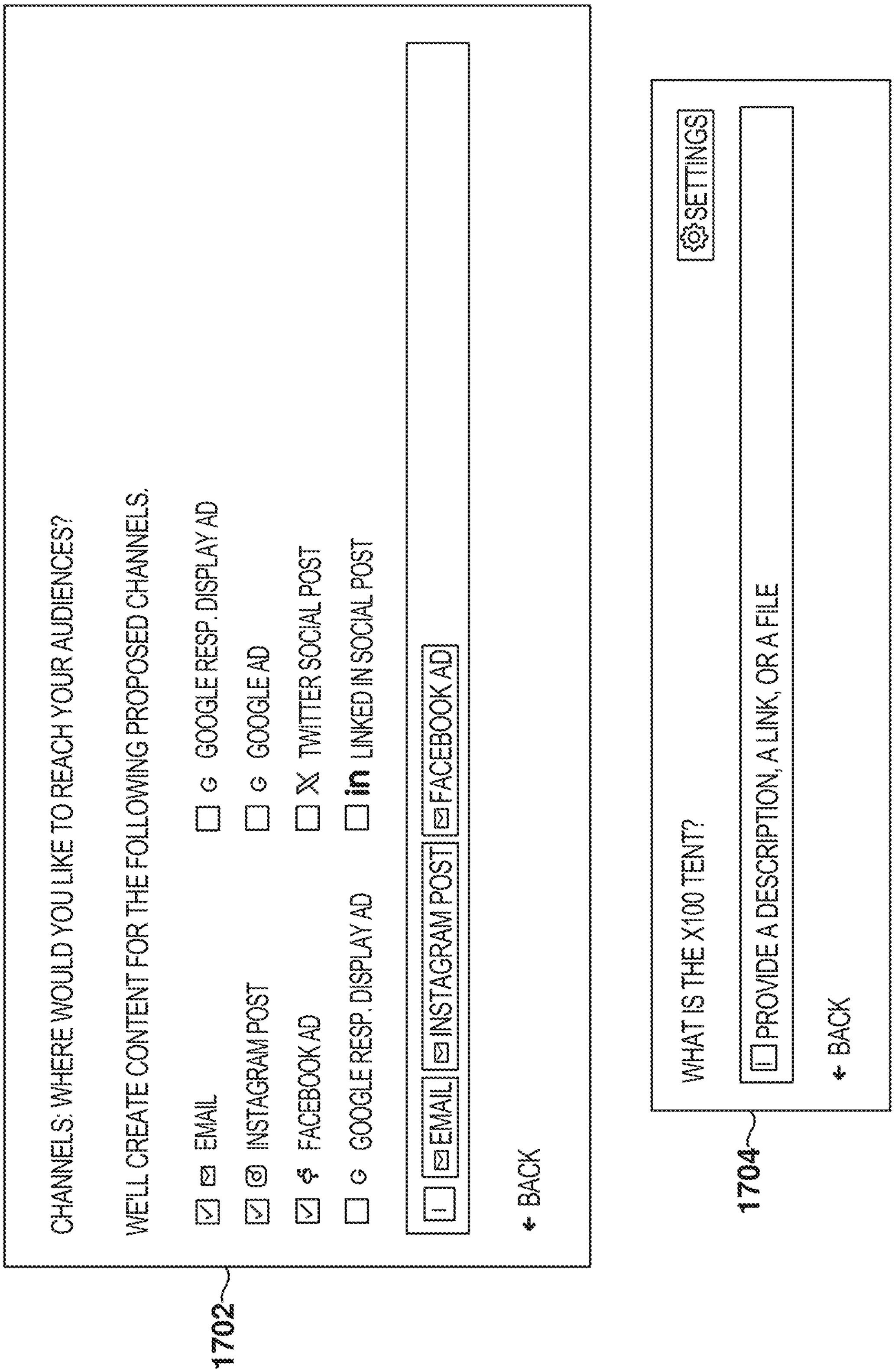
FIG. 17A illustrates further operations in the process of creating a feed, according to some examples.

FIG. 17A illustrates further operations in the process of creating a feed, according to some examples. The UI 1702 is used to configure the channels to reach the selected audiences. The channels are configurable by the user. In some examples, the available channels include one or more of email, Instagram® post, Facebook® ad, Google® ad, X® (previously Twitter) post, LinkedIn® post, SMS message, and YouTube® ad. The user may select any channel by selecting the corresponding box in the UI 1702.

The FG automatically selects products from the user library that match the objective. Additionally, UI 1704 is presented to confirm or change the selected products and brand profile.

Figure 17B:
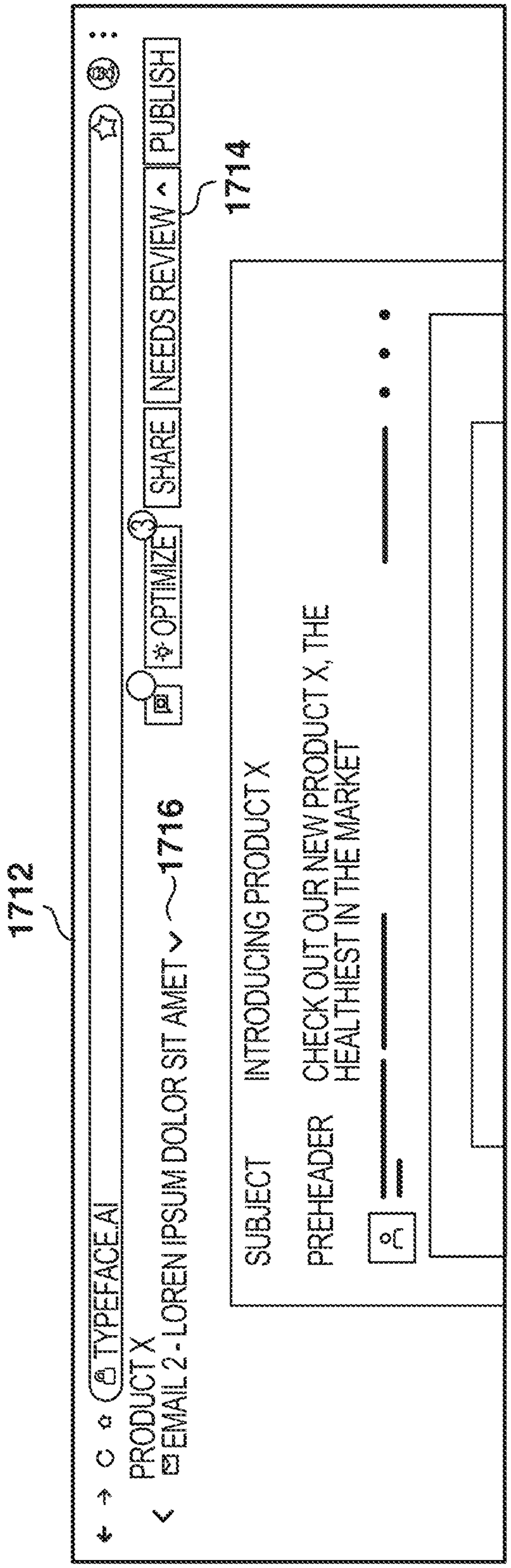
FIGS. 17B-17D illustrate the approval process according to some examples.
Figure 17C:
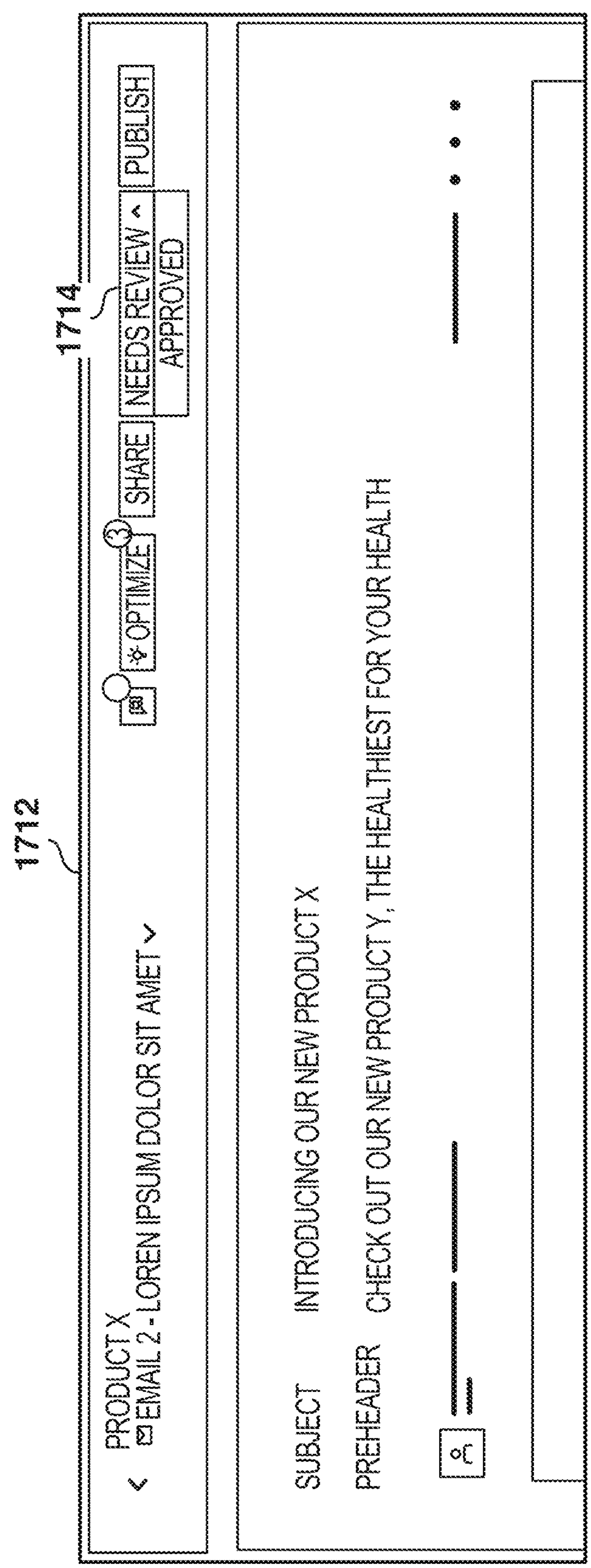
Figure 17D:
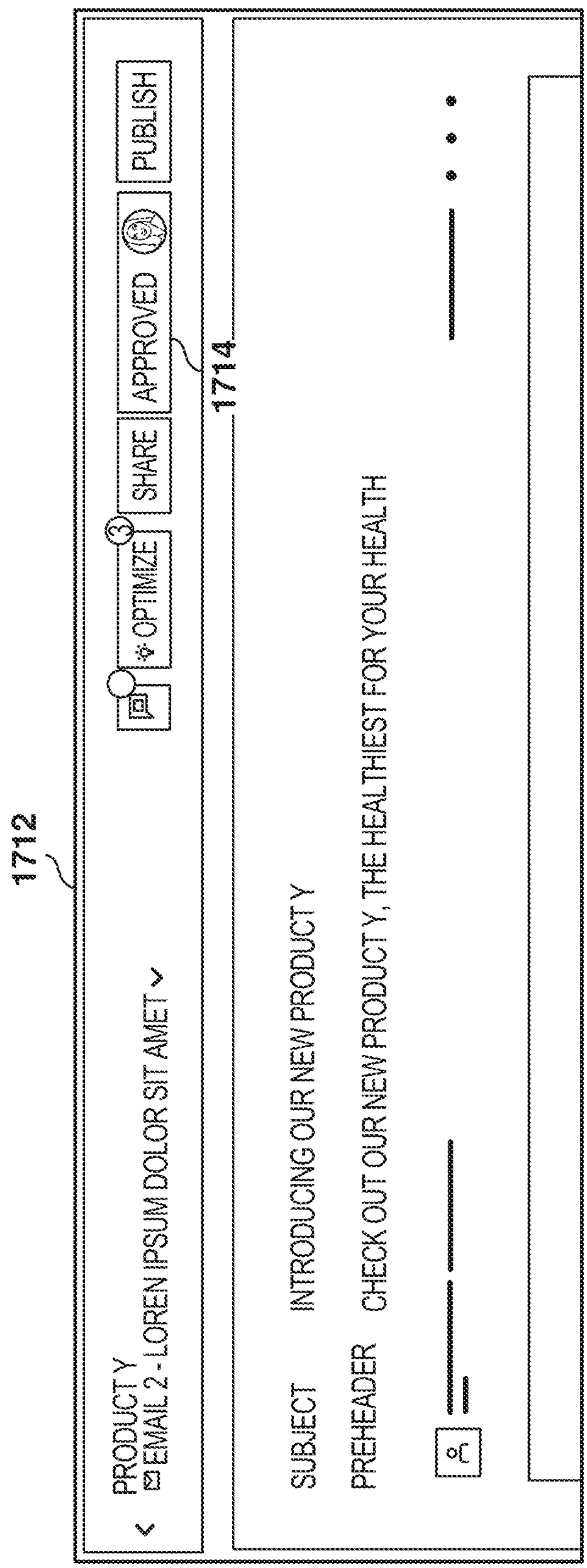

FIGS. 17B-17D illustrate the approval process according to some examples. FIG. 17B shows part of a UI 1712 for previewing the generated content and provides an option to publish. Once the user is done with the content, the user can select the option “Approve” from a drop-down menu 1714 and change the status of the content.

In the illustrated example, the UI 1712 interface includes a dropdown menu 1716 titled “Email 2—Lorem ipsum dolor sit amet” to select from the different pieces of content available in the feed.

The content area 1718 displays an email composition pane with a subject line that reads “Introducing Cécilé Juice” and a preheader text stating, “Check out our new apple juice, the healthiest juice in the market.” The content is presented below the preheader. In this illustration, only a part of the complete UI is presented, and the user may scroll down the page to see all the content.

At the top right corner of the UI 1712, there are several action buttons and indicators. The “Optimize” button is an option to improve the email’s content or deliverability. Adjacent to this is the “Share” button, which allows the user to share the email draft with others for collaboration or review. The drop-down menu 1714 “Needs review” is available to approve the content, and a “Publish” button is provided for sending the content to the email marketing or customer journey orchestration system.

FIG. 17C shows the UI 1712, where the user selects the option “Approved” in the drop-down menu 1714. The opposite operation is also possible, where the user may change the status from “Approved” to “Needs review.”

FIG. 17D shows a UI 1712 after the user has approved the content, showing the drop-down menu 1714 with the selected option of “Approved.” Once the content is approved, the campaign will start.

Figure 18A:
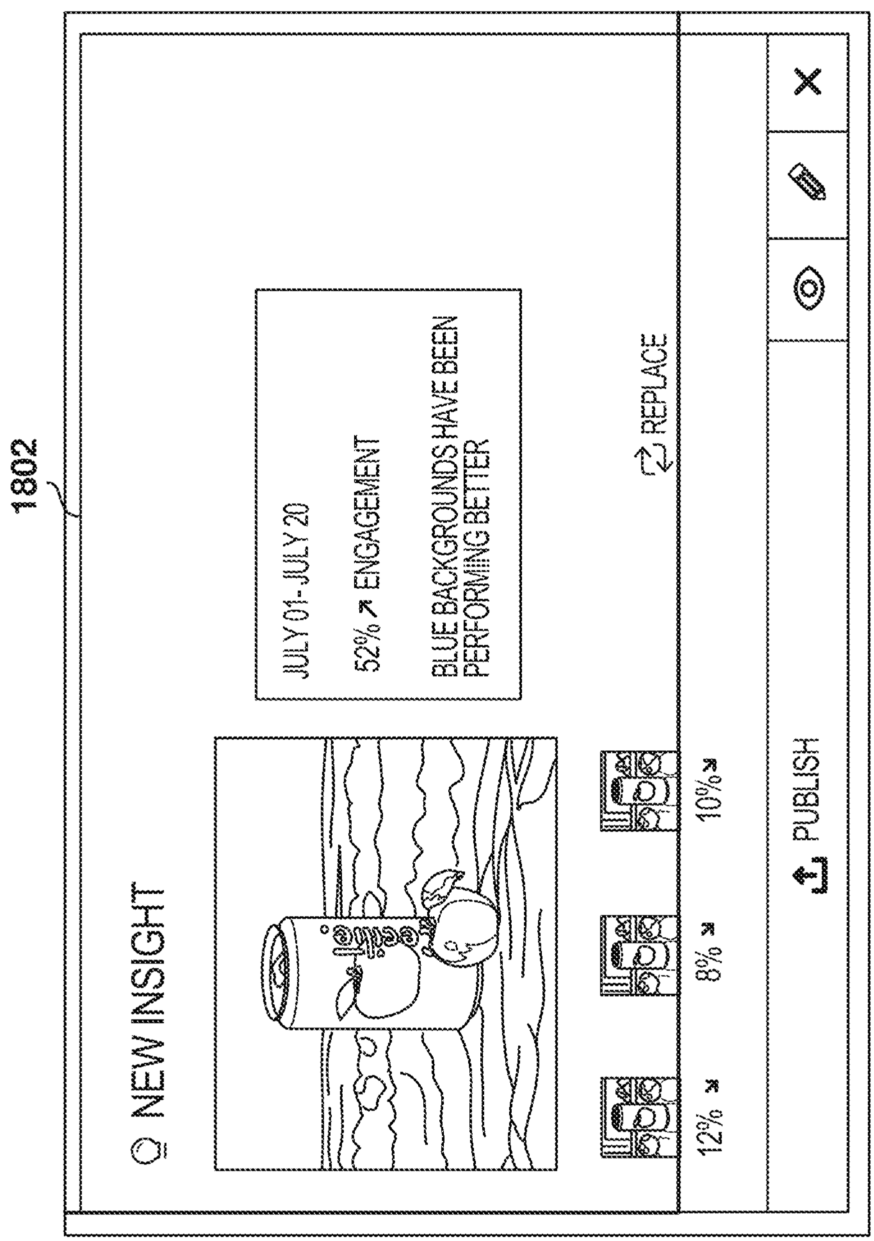
FIG. 18A is an example of a UI that provides performance information for a particular piece of content.

FIG. 18A is an example of a UI 1802 that provides performance information for a particular piece of content. The CGS identifies key visual elements, such as backgrounds and colors, within the images and utilizes a machine-learning model to compare the performance of these features. Based on the comparison, the CGS then identifies differences between the images, allowing for the generation of performance insights and recommendations for image replacement.

The illustrated example shows a predictive uplift in engagement when using blue backgrounds, which is because images with blue backgrounds get better responses from customers.

The CGS system provides performance insights on existing content. For example, if an email has already been sent out as part of a campaign, the system can analyze the performance of the included images and text. This goes beyond the current practice of A/B testing subject lines, as it provides insights into the specific text or body copy. The system can identify which phrases or images are performing better, such as the inclusion of a person’s name in the subject line, leading to more opens, or the use of an image with a blue background in a nature scene, resulting in better performance. These insights offer a deeper understanding of content performance.

In one example, the CGS first identifies the key visual elements present in the images, such as objects, backgrounds, and colors. This identification process involves analyzing the image data and extracting relevant features. The system may utilize image recognition algorithms and deep learning techniques to identify and categorize these visual elements accurately.

Once the key visual elements are identified, the CGS creates a machine-learning model that compares the features of the images. This model is trained using a dataset of images with known performance metrics, allowing it to learn patterns and correlations between the visual elements and content performance. The model can then be used to predict the performance of new images based on their visual features.

The CGS provides a novel approach to analyzing and comparing images for content performance insights. By identifying key visual elements and utilizing a machine learning model, the CGS enables content creators to optimize their content and improve engagement. The CGS’s predictive capabilities offer valuable recommendations for image replacement, leading to enhanced content performance.

The illustrated example shows an insight for comparing several images that have been presented to users, where the different images have different color backgrounds. The insight indicates that blue backgrounds are performing better in the period being tested.

The CGS actively monitors the performance of content in relation to the marketer’s objectives, campaign journey, and key performance indicators (KPIs) and generates content suggestions proactively, even before a specific prompt is given by the user. The CGS then presents these suggestions to the marketer, who can either approve or reject them or make quick edits before incorporating them into the campaign.

Figure 18B:
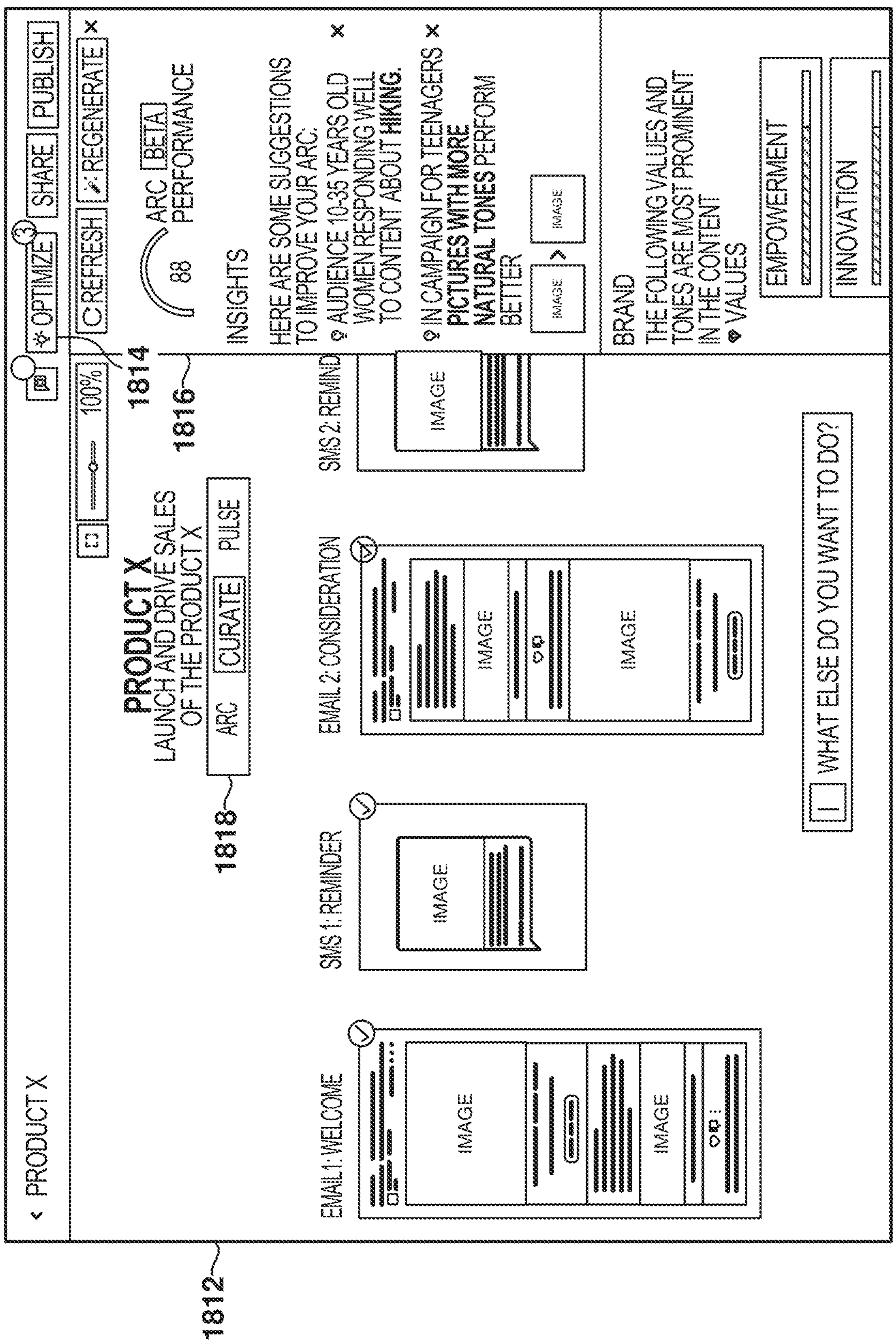
FIG. 18B is a UI showing arc insights according to some examples.

FIG. 18B is a UI 1812 showing arc insights according to some examples. The UI 1812 is designed to provide users with an intuitive and comprehensive overview of various marketing campaign elements and their performance metrics.

The UI 1812 includes a header section labeled “x100 Tent Arc,” which indicates the current marketing campaign being viewed. Below the header, there are tabs 1818 labeled “Arc,” “Curate,” and “Monitor,” which allow users to navigate between different aspects of the campaign management system.

The main area of the interface displays a series of cards 1820, each representing a different stage of the marketing campaign, such as “Awareness,” “Reminder SMS,” “Consideration,” and “Offer SMS.” Each card includes a visual preview of the campaign content, a status indicator, and additional information or actions that can be taken, such as viewing more details or adding new content.

The UI 1812 includes a navigation bar at the top with an “Optimize” option 1814, a “Share” option, and a “Publish” option. When the user selects the “Optimize” option 1814, the panel 1816 is presented with insights information. The user can select and apply any of the insights.

The panel 1816 includes a numerical score (e.g., 88) indicating the Arc performance of the campaign. Below the performance score, there is an “Insights” section providing actionable suggestions to improve the campaign. Examples of insights include demographic performance notes and content optimization recommendations.

Additionally, the panel 1816 contains a “Brand” section that outlines the values and tones most prominent in the content, with indicators such as “Empowerment” and “Innovation” and corresponding progress bars to visualize the extent to which these values are represented.

At the bottom of the UI 1812, there is an interactive element 1822 prompting the user with the question “What else do you want to do?” suggesting further actions or navigation paths the user may wish to explore.

Figure 19:
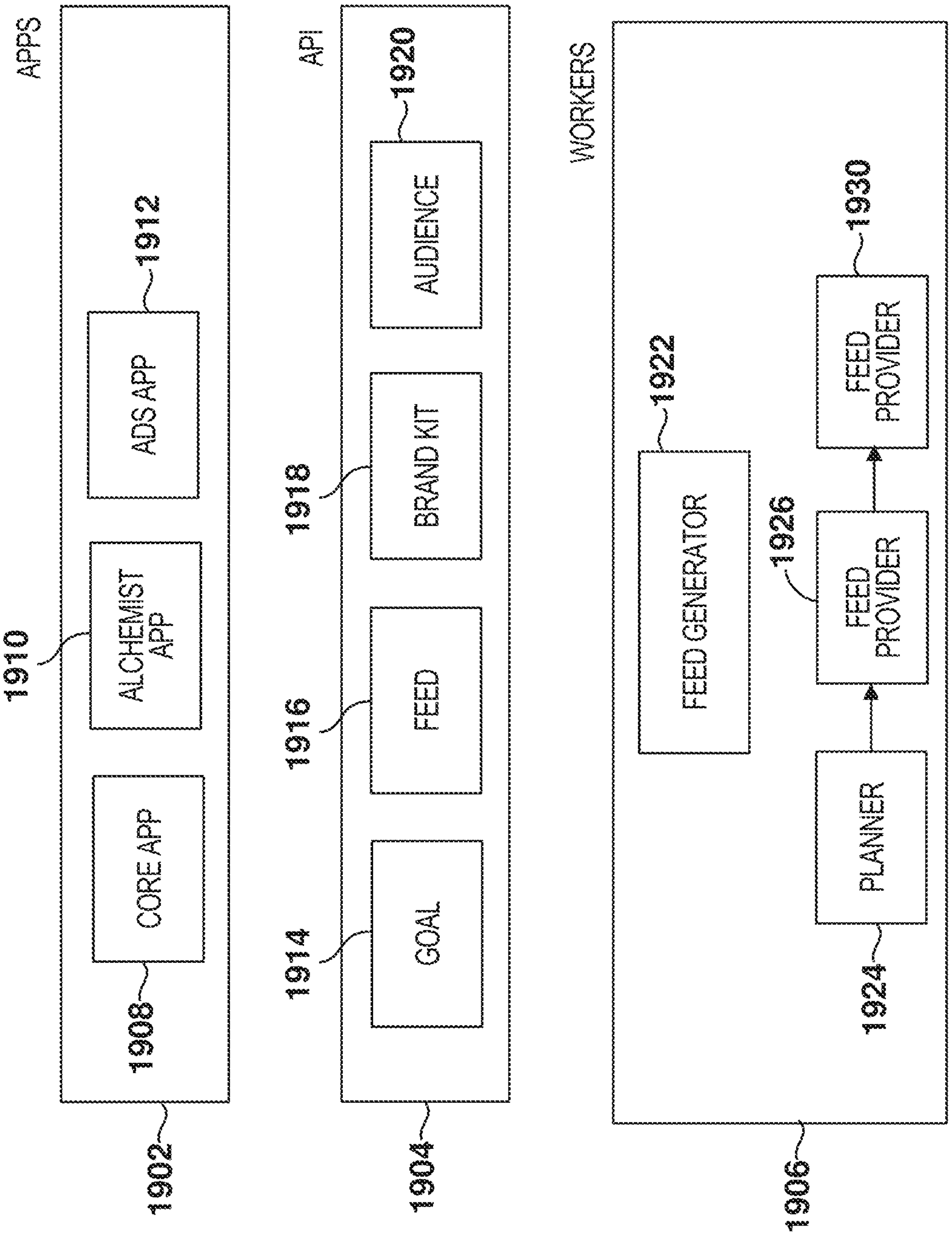
FIG. 19 is a diagram of a high-level architecture for implementing embodiments, according to some examples.

FIG. 19 is a diagram of a high-level architecture for implementing embodiments, according to some examples. In some examples, the CGS includes several layers for implementation, including apps 1902, API 1904, and workers 1906. The apps 1902 provide customers with the tools to access the CGS. The core app is the program that creates content.

Different types of applications allow the user to create content specifically customized and optimized for a particular output channel. To achieve this, specialized apps are provided, e.g., the strategy for email campaigns is different from the strategy for ad campaigns.

The alchemist app indicates any app that may use the Feed Generator, 1910. For example, the Arc app for users creating a customer journey to drive sales of a particular product, such as Cicilie apple juice. The ads app 1,912 indicates a different application of the Feed Generator that specializes in generating advertisements.

The API 1904 refers to the programmatic access to configure the journey generation. The API 1904 includes goal 1914, feed 1916, brand kit 1918, and audience 1920. The goal 1914 is used to define a specific goal in mind for the feed 1916, e.g., to understand both the brand and the audience they are trying to reach. In some examples, a dynamic feed definition takes four inputs: goal for the activity, like a campaign that drives the feed content generation; channel information (like email, social media, etc.); audience description for which the content generation is targeted; and information retrieval sources from the grounding of the generation will happen (like product information and brand assets).

The brand kit 1918 refers to the personalization of the content based on the brand. The FG ensures that the content looks and feels as if it is coming from the brand by using the brand kit, which includes all the characteristics that have been defined for the brand, such as image styles, text tones, voicemail, etc. Additionally, the feed 1916 utilizes information from the audience 1920 to determine the target of the content. The feed 1916 is then generated based on these parameters.

AI agents, also referred to as workers 1906, are used to generate and curate content. In one example, the workers 1906 are built with orchestration on SOTA LLMs, and the image generation models continually use feedback based on content insights to generate new content. The content is built with meta prompts and agentic workflows to drive content for a feed. The meta prompts include plans and guidelines to generate new content, like an email journey for a new customer onboarding.

The feed generator 1922 generates content for the user. The feed generator relies on the planner 1924 to get the information for generating the content. The planner 1924 acts as an assistant that ensures all the necessary information to create content is available.

The planner 1924 has a deep understanding of various channels, such as email and ads, and their respective requirements. Additionally, the planner 1924 takes into consideration the audience and the brand attributes. The planner 1924 is able to access databases for product details and pricing information to include in communications.

The planner 1924 acts as an assistant to help plan marketing campaigns. The user specifies which audiences to target and what product to promote, and the planner 1924 creates a plan for the user. To do this, the planner 1924 gathers insights and information, e.g., what works best for young adults on Instagram? and then may gather data and images to help optimize the campaign. The planner 1924 acts as an orchestrator, coordinating all the different elements of the campaign to ensure maximum success.

It is possible to execute a multiple-channel campaign. For instance, to use both social media and email marketing. In this case, the planner 1924 would create a feed 1926 for email and a feed 1930 for social media.

Figure 20:
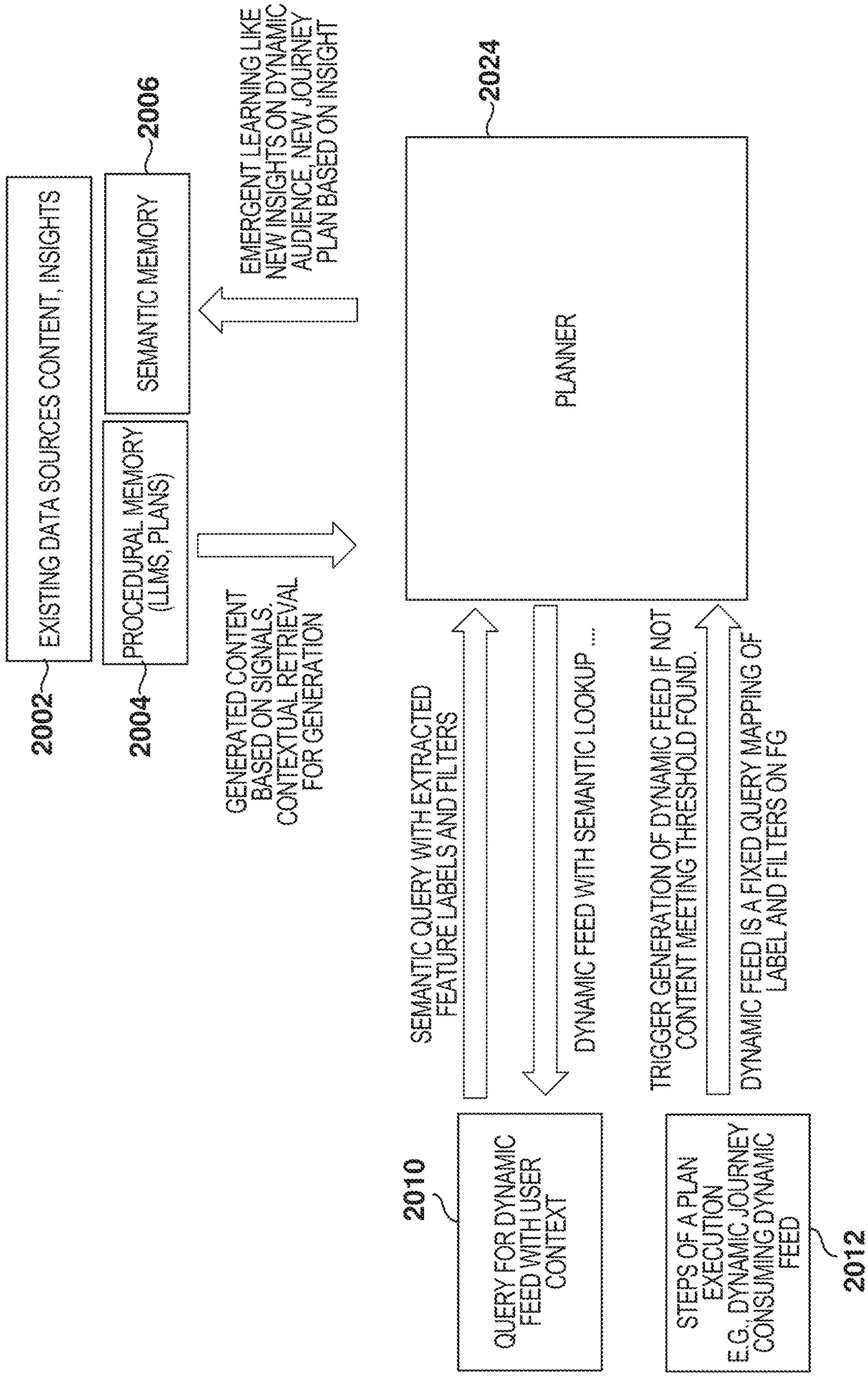
FIG. 20 illustrates details of generation flows, according to some examples.

FIG. 20 illustrates details of generation flows, according to some examples. To generate personalized content, The CGS incorporates a robust semantic content graph, agent operators, and channel-based feeds in a Generative AI stack.

The CGS has three components for generative workflows: 1. A semantic content graph that stores already generated content or helps with the generation of new content; 2. A dynamic feed definition that takes a goal, audience, brand information, insights, and channel as inputs and works on top of the semantic graph to generate new content for the channel based on the customer's needs; and 3. AI Agents (workers) that generate and curate content for each of the feeds based on feed definition and content insights.

The planner 1924 pulls from existing data sources and insights 2002 to create content for the campaign, e.g., analyzing the performance of previous campaigns to create and select new content. For example, if the user has a collection of food images and user searches for "pasta," the semantic memory 2006 recognizes that pasta is a type of food and extracts food images from the existing sources and insights 2002. The semantic memory 2006 semantically understands the relationship between pasta and food and makes the necessary connections.

The planner 1924 gathers brand information from both procedural memory 2004 and semantic memory 2006. The procedural memory 2004 is responsible for creating the plan for content creation, and the semantic memory 2006 determines the meaning of different content. The procedural memory 2004 provides the generated content based on signa. Further, the planner 1924 stores emerging learning data in semantic memory, such as new insights on the dynamic audience and a new journey plan based on insights.

When a query 2010 for the dynamic feed is received, the semantic query with extracted feature labels and filters is sent to the planner 1924. The query 2010 includes user context. For example, the user may request to get all the content for an email or other content that showcases a certain product. The planner 1924 then creates the feed.

The steps of a plan execution 2012 include the steps for executing a customer journey, which may include multiple steps. For instance, in an abandoned cart scenario, the first step would be to remind the person that they forgot to check out, the second step would be to send a notification after three days offering a ten percent discount, and the third step would be to send a note after another three days informing the customer that supplies are running low and that if they want to purchase the item, they should check out now. This is the customer journey that makes use of the dynamic feed.

The following points provide a high-level overview of the operational process of Retrieval Augmented Planning and Generation, utilizing an agent framework:

1. Receive a feed creation request articulated in natural language.
2. The CGS retrieves the necessary tools and metadata information from the semantic store, which are required for the subsequent plan formulation.
3. The CGS creates a plan of action to accomplish the task at hand. This is done by employing a generative AI model, into which the pertinent tool and metadata information are input.
4. The plan is executed by activating the necessary tools, carrying out the specified intermediate steps, and utilizing the context information retrieved from both the application and the semantic store.

5. As the process proceeds, intermediate steps and results are recorded and stored back into the semantic store.
6. If the CGS requires further clarification to execute a query or to make progress, it seeks this from the user. This newly obtained information is then stored back into the semantic storage system.
7. Finally, once the result is generated, the CGS stores the result in the semantic storage and simultaneously returns the result to the application as part of the ongoing session. The output can take various forms, including textual content or multi-modal content such as graphs, plots, or tables.

The following are some design considerations for storage and retrieval:

Relevance Lookup: The semantic storage system must be designed to allow the retrieval of contextual information, which will be input into the context window of a Language Learning Model (LLM). This feature yields near-text results, as the quality of the output is significantly influenced by this factor.

Coherence: a method is established to synchronize this store with a reliable source, such as application storage, ensuring that the data remains consistent across both. In one example, a look-aside pattern is used, but other methods may be used to continually monitor and maintain the synchronization between the semantic store and the original storage.

Compliance & Security: When dealing with customer data that will be indexed in a CGS abstracted semantic storage system, it is important to adhere to all relevant compliance and security requirements. Considerations include employing customer-managed keys (CMK) and end-to-end (E2E) encryption.

Efficiency: To keep the cost of embedding re-computation low for lookups, the storage and retrieval system must be designed with efficiency in mind.

Regarding security, since the content might contain Personally Identifiable Information (PII) and sensitive information, the proper compliance requirements are implemented to protect customer privacy. One of the considerations is to look at where the store is located and how retrieval happens from the store.

Right prompt templates with the ground truth are implemented because it is important to make sure the model does not hallucinate, or if the model hallucinates, to detect and possibly correct hallucinations.

The system performs periodic performance evaluation and fact-checking. Agents can get into an error loop or be faulty with incorrect information. This might require evaluating and getting the system out of fault by reconstructing the prompt automatically or by requesting user intervention.

Figure 21:
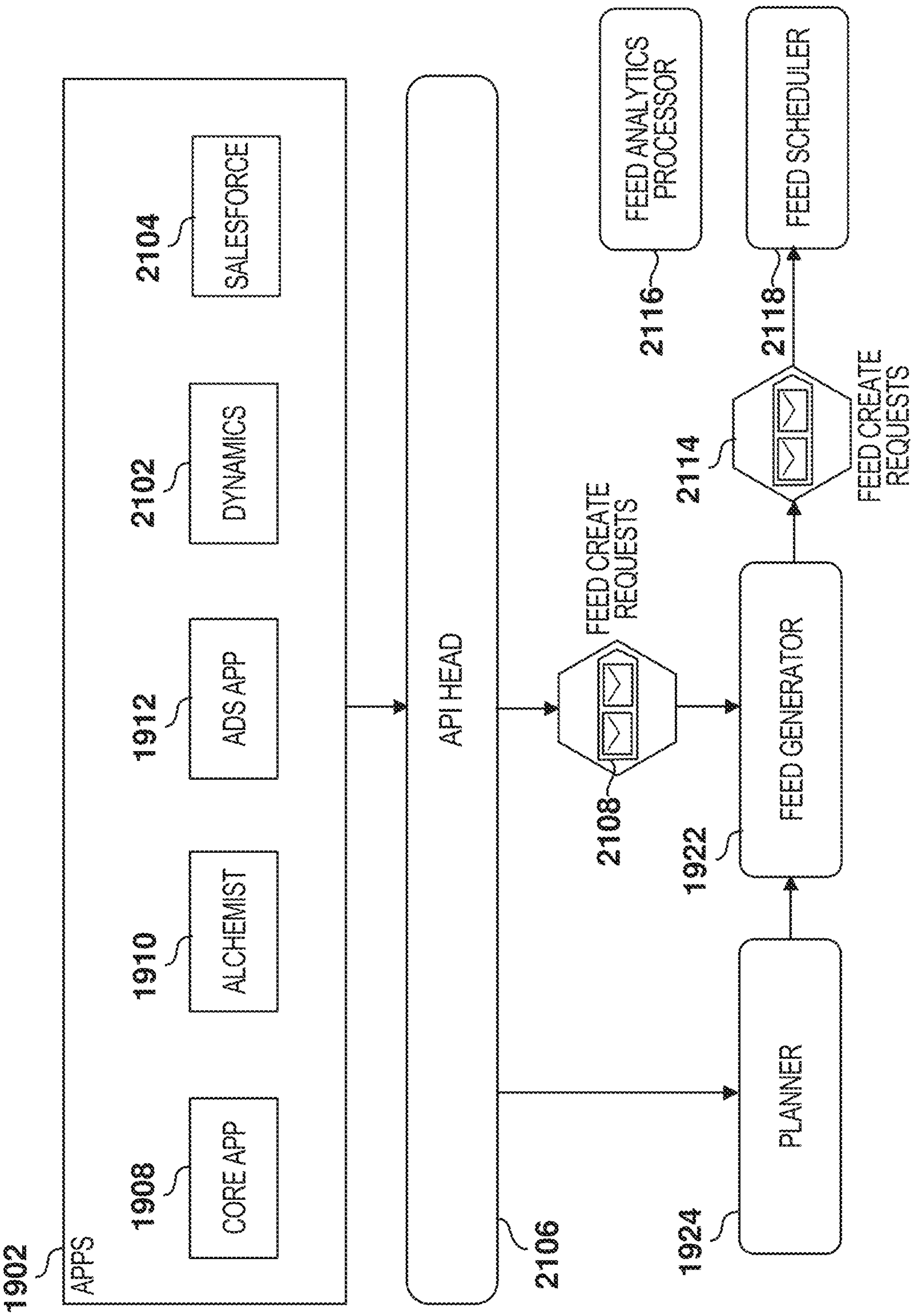
FIG. 21 illustrates the process for generating items for user feeds, according to some examples.

FIG. 21 illustrates the process for generating items for user feeds, according to some examples. While the various operations in this flowchart are presented and described sequentially, one of ordinary skill will appreciate that some or all of the operations may be executed in a different order, combined, omitted, or executed in parallel.

The apps 1902 interface with an API head 2106 (e.g., API interface) to submit requests. The apps 1902 include the core app 1,908, the alchemist app 1,910, the app 1,912, a Microsoft Dynamics app 2,102, and a Salesforce app 2,104 that interfaces with a Salesforce system to gather information about the user's campaigns.

The API head 2106 sends requests to the planner 1924 to plan the content to be created. The planner 1924 sends requests to generate content to the feed generator 1922. Further, the API head 2106 may also send feed-create requests 2108 to the feed generator 1922.

The feed generator 1922 sends feed-create requests 2114 to a feed scheduler 2118 that manages the scheduling of request processing in the CGS. Further, a feed analytics processor 2116 monitors the performance of the generated content.

Figure 22:
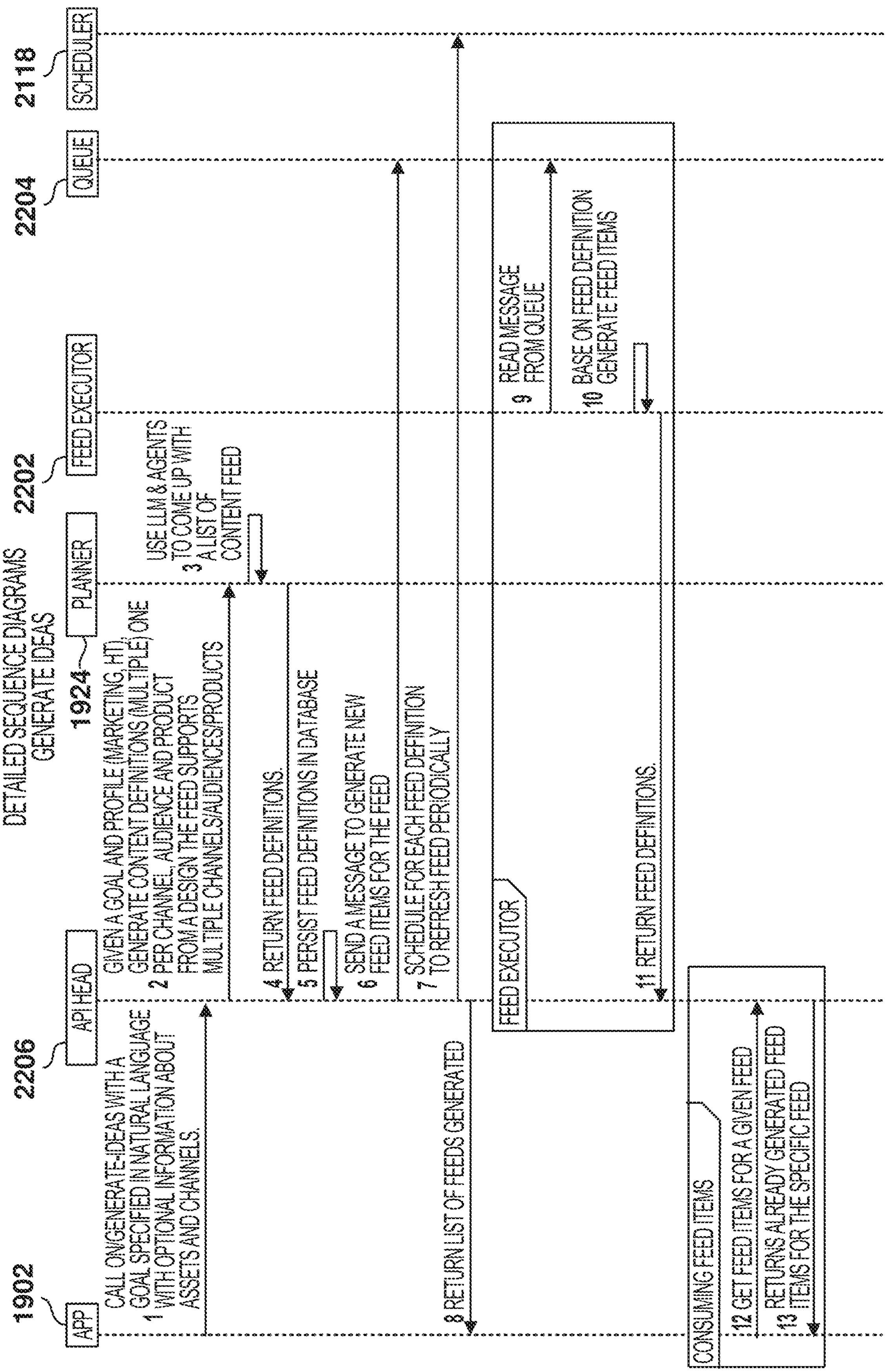
FIG. 22 is a swim chart showing the process for generating content, according to some examples.

FIG. 22 is a swim chart showing the process for generating content, according to some examples. The swim chart describes the interactions among the app 1,902, the API head 2206, the planner 1924, the feed executor 2202, a queue 2204 (holds creation requests), and the scheduler 2118.

The app 1,902 sends a call to the API head 2206 to generate ideas with a goal specified in natural language and optional information about assets and channels.

The API head 2206 then sends a request to the planner 1924 to, given a goal and profile, generate content definitions, one per channel, with audience and product information. The feed supports multiple channels, audiences, and products.

The planner 1924 uses LLMs and agents to develop a list of content for the feed. The planner 1924 then returns feed definitions to the API head 2206, and the API head 2206 persists (e.g., stores) the feed definitions in a database.

The API head 2206 sends a message to be placed in the queue 2204 for processing, the message including a request to generate new feed items for the feed. Further, the API head 2206 sends a scheduling request to the feed scheduler 2118 for each definition to refresh the feed content periodically (e.g., every 24 hours). After the content is generated, the API head 2206 returns a list of feeds generated to the app 1902.

The feed executor 2202 reads messages from the queue 2204 and, based on the feed definition, generates feed items for each message in the queue 2204. The feed executor 2202 then sends the feed definitions to the API head 2206.

The app 1,902 consumes feed items by sending requests to the API head 2206 for feed items for a given feed, and the API head 2206 returns the feed items already generated for the specified feed.

Figure 23:
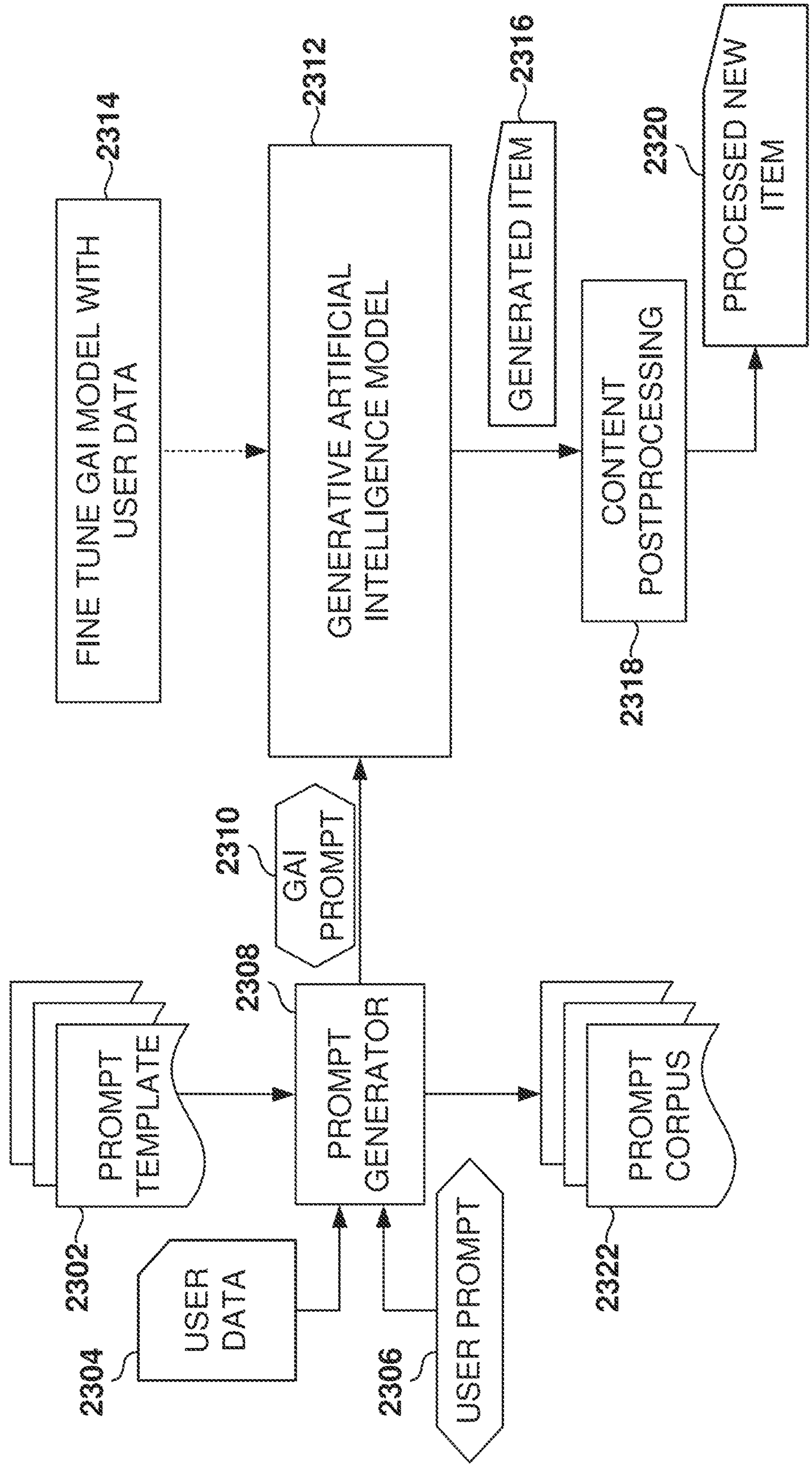
FIG. 23 illustrates the use of a Generative Artificial Intelligence (GAI) model to generate new content, according to some examples.

FIG. 23 illustrates the use of a Generative Artificial Intelligence (GAI) model 2312 to generate new content, according to some examples. GAI is a type of AI that can generate new content, such as images, text, video, or audio. The GAI model 2312 is trained on large datasets of data and uses this data to learn the patterns and relationships between different elements of the data. There are several types of GAI models, such as Generative Adversarial networks (GANs), Variational Autoencoders (VAEs), and Autoregressive models.

The GAI models generate items of different types, such as GAI models for creating text (e.g., GPT-4, Pathways Language Model 2 (PaLM 2), LaMDA), images (e.g., DALL-E 2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 2310 provided to the GAI model 2312. Users can utilize the GAI model 2312 as provided by the vendor or can optionally fine-tune 2314 the GAI model 2312 with their user data to adjust the parameters of the GAI model 2312 in order to improve performance on a specific task or domain.

In some examples, fine-tuning the GAI model 2312 includes the following operations:

1. Collect user data: Gather a collection of user data that is relevant to the target task or domain. This data could include text, images, audio, or other types of data;
2. Label the data: if the task requires supervised learning, the user data is labeled with the correct outputs;
3. Select a fine-tuning method. Some of the methods for fine-tuning GAI models include Full fine-tuning, Few-shot fine-tuning, and Prompt-based fine-tuning;
4. Train the GAI model 2312: Perform incremental training of the tune 2314 using the selected fine-tuning method and
5. Optionally, evaluate the performance of the fine-tuned model on a held-out dataset.

The GAI model 2312 can be used to generate new content based on the GAI prompt 2310 used as input, and the GAI model 2312 creates a newly generated item 2316 as output.

The GAI prompt 2310 is a piece of text or code that is used to instruct the GAI model 2312 towards generating a desired output (e.g., generated item 2316). The GAI prompt 2310 provides context, instructions, and expectations for the output. The newly generated item 2316 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 2310 input to the GAI model 2312, ensuring that the GAI prompt 2310 accurately conveys the task, context, and desired style of the output.

A prompt generator 2308 is a computer program that generates the GAI prompt 2310. There are several ways to generate the GAI prompt 2310. In one example, the prompt generator 2308 may use a user prompt 2306 entered by the user in plain language as the GAI prompt 2310. In other examples, the prompt generator 2308 creates the GAI prompt 2310 without having a user prompt 2306, such as by using a static pre-generated prompt based on the desired output.

In other examples, the prompt generator 2308 uses a prompt template 2302 to generate the GAI prompt 2310. The prompt template 2302 defines the structure of the GAI prompt 2310 and may include fields that may be filled in based on available information to generate the GAI prompt, such as user data 2304 or user prompt 2306. The prompt template may also include rules for creating the GAI prompt (e.g., include specific text when the recipient resides in California, but do not include the text if the recipient does not reside in California). In other examples, the prompt generator 2308 uses heuristics codified into a computer program to generate the GAI prompt 2310.

An example template for generating a prompt to create an image for a marketing campaign is as follows:

You are an AI Assistant that will help create prompts that can be used to generate images with Dall-e and stable diffusion.

The user can provide information as input for generation:

1. Product or service information (e.g., selling t-shirts)
2. Goal—Example—I want to run a promotion for Halloween
3. Audience Information—Location, Gender, Demographics, Age group
4. Channel—Email, Instagram, TikTok, etc.

Use the above information in the following way to generate the prompt.

Product Information:

Clearly highlight the main product.

Example: “A t-shirt”

Goal:

Incorporate the objective or theme of the promotion.

Example: “with a unique Halloween-themed design”

Audience Information:

Add elements that resonate with the target audience’s location, gender, demographics, and age group. Ensure the depiction is inclusive and diverse.

Example (based on hypothetical audience info): “being worn by a young male from Italy in his 20s”

Channel:

Tailor the style and format based on the channel you’re targeting. For instance:

Email: A more detailed and descriptive scene as it’s viewed on larger screens.

Instagram: Focus on aesthetics and vibrant visuals.

TikTok: Dynamic and engaging visuals, perhaps hinting at movement or a narrative.

Example (for Instagram): “The setting is a moonlit night in an Italian piazza, where the young man joins friends for a Halloween celebration. The atmosphere is festive with jack-o’-lanterns, cobblestone streets, and ancient buildings in the background. The image is vibrant and aesthetically pleasing, perfect for an Instagram post.”

Final Prompt:

“A t-shirt with a unique Halloween-themed design being worn by a young male from Italy in his 20s. The setting is a moonlit night in an Italian piazza, where the young man joins friends for a Halloween celebration. The atmosphere is festive with jack-o’-lanterns, cobblestone streets, and ancient buildings in the background. The image is vibrant and aesthetically pleasing, perfect for an Instagram post.”

Remember, this is just one example. Depending on the specifics of the audience information and the chosen channel, the prompt can be tailored differently. The idea is to incorporate all the provided details into a cohesive and engaging narrative for the image.

Creating a good prompt structure for generating images with models like DALL· E or Stable Diffusion requires a balance of specificity and creativity. Here’s a breakdown of the essential elements and how you can structure them:

1. Type of Image: Start by specifying the format or medium of the image. For example:

Photo
Oil painting
Watercolor painting
Illustration
Cartoon
Drawing
Vector
Render 2. Main Subject: Clearly identify the primary focus or subject of the image. Be as specific as you can. Instead of “bird,” say “a crimson-feathered parrot.”
3. Action or State: Describe what the subject is doing or the state it’s in. For instance, “soaring through a clear blue sky” or “perched on a wooden branch.”
4. Setting or Background: Provide context by describing the environment or setting. This could be “a bustling city square,” “a serene lakeside,” or “a starry night.”
5. Additional Details: Enhance the scene with additional elements or props. These can be objects, secondary characters, or even weather conditions. For example, "with children flying kites" or "as rain gently falls."

6. Mood or Atmosphere: If you have a particular mood or tone in mind, specify it. Words like "sunset," "dreamy," "nostalgic," or "futuristic" can guide the generation.
7. Diversity and Representation: Especially for images with people, ensure that you specify diverse gender, racial, and other representations to avoid unintentional biases.
8. Perspective and Orientation: Mention if you want a specific viewpoint like "bird's eye view" or "close-up." Also, if the image should be "wide" (landscape) or "tall" (portrait), include that.

Here's a structured example:

"Photo of a diverse group of young people sitting around a campfire in a dense forest at twilight, laughing and sharing stories, with sparks from the fire rising into the starry night."

Remember, while it's essential to be specific to guide the model, leaving a bit of room for creativity can lead to surprising and delightful results. Adjust the level of detail based on the desired outcome.

Targeting imagery based on audience demographics like location, gender, and age can enhance the effectiveness of the visual content. Here's how you can tailor image prompts to appeal to specific audience attributes:

1. Location:
   Cultural References: Incorporate elements, symbols, or landmarks that resonate with people from that specific region.
   Landscapes & Settings: Use typical settings from the location, such as cityscapes, countryside, beaches, or mountains.
   Color Palette: Some cultures have color preferences based on traditions, seasons, or festivals.
2. Gender:
   Inclusivity: Ensure representation of all genders. Avoid stereotypes; instead, focus on universal themes or elements that resonate with the target gender.
   Themes & Motifs: Depending on research and insights, you might incorporate certain themes, patterns, or motifs that appeal to a specific gender.
3. Age:
   Children (below 12 years):
   Style: Cartoons, animations, or illustrations with bright colors.
   Elements: Friendly animals, magical creatures, superheroes, and playful settings.
   Teens (13-19 years):
      Style: Trendy illustrations, digital art, or photographs.
      Elements: Pop culture references, technology, hobbies, and youth-centric activities.
   Adults (20-60 years):
      Style: Realistic photos, classic paintings, or mature illustrations.
      Elements: Daily life, work, family, nature, hobbies, and contemporary themes.
   Seniors (60+ years):
      Style: Vintage or nostalgic imagery, calming watercolors, or serene photos.
      Elements: Nature, landscapes, nostalgia, classical art, and leisure activities.
4. Interests & Hobbies:
   If you have information on the target audience's interests, incorporate elements that resonate with those hobbies or passions.
5. Emotional Appeal:
   Think about the emotion you want to evoke. Children might respond to joy and wonder, teens to aspiration and adventure, adults to connection and nostalgia, and seniors to tranquility and reflection.
6. Narrative & Storytelling:
   Craft a narrative that resonates with the target group. Kids might enjoy a story of adventure, teens a coming-of-age tale, adults a journey of discovery, and seniors a trip down memory lane.

When constructing your prompt, always combine these tailored elements to create a cohesive and appealing image. For instance:

"Cartoon illustration of a magical forest with bright-colored trees, where friendly animals host a picnic for children, with a backdrop of a famous landmark from [Location]."

Remember, while these are general guidelines, individual preferences can vary widely. It's essential to understand your specific audience and adjust the attributes accordingly.

Incorporating channel-specific information into your image prompts is crucial because each platform has its own audience expectations, content style, and purpose. Here's how you can tailor your prompts based on popular social media channels:

1. Instagram:
   Purpose: Primarily visual content; used for personal sharing, lifestyle branding, and visual storytelling.
   Prompt Attributes: Focus on aesthetics, vibrant colors, and visually pleasing compositions.
   Example: "Photo of a minimalist workspace with pastel-colored stationery, a succulent plant, and a morning coffee cup, suitable for a lifestyle influencer on Instagram."
2. TikTok:
   Purpose: Short-form video platform known for fun, entertaining, and sometimes educational content.
   Prompt Attributes: Emphasize dynamic, youthful, and trendy elements. Consider popular challenges, dances, or meme formats.
   Example: "Illustration of a diverse group of young people dancing in trendy outfits to a popular song, with vibrant neon lights in the background, perfect for a TikTok dance challenge."
3. LinkedIn:
   Purpose: Professional networking and industry news.
   Prompt Attributes: Prioritize professional, clean, and formal visuals. Showcase industry-related themes, corporate environments, and professional individuals.
   Example: "Photo of a diverse group of professionals in a modern office boardroom, discussing a project with charts and graphs projected on a screen, suitable for a LinkedIn post on teamwork."
4. Twitter:
   Purpose: News, updates, personal opinions, and quick information sharing.
   Prompt Attributes: Go for relevant, timely, and sometimes witty or satirical visuals. Infographics or concise visuals work well.

Example: "Illustration of a bird (representing Twitter) perched on a globe, tweeting out news headlines, ideal for a tweet about current global events."

5. Facebook:
   Purpose: Personal updates, news sharing, and community interactions.
   Prompt Attributes: Focus on relatable, family-friendly, and community-centric visuals.
   Example: "Photo of a community event in a local park, with families enjoying a barbecue and kids playing games, fitting for a Facebook community group post."
6. Pinterest:
   Purpose: Inspiration, DIYs, recipes, and mood boards.
   Prompt Attributes: Emphasize creativity, inspiration, and how-to visuals.
   Example: "Illustration of a step-by-step DIY craft project, showcasing materials, and the final product, perfect for a Pinterest pin."
7. YouTube:
   Purpose: Long-form video content ranging from entertainment to tutorials.
   Prompt Attributes: Create thumbnails or visuals that encapsulate the video's theme and are attention-grabbing.
   Example: "Illustration of a person in front of a computer, with graphics of video editing tools around them, suitable for a YouTube tutorial on video editing."

When crafting prompts for each channel, always consider the platform's primary audience, content format, and purpose. Tailor your visuals to resonate with the users of that specific platform and align with the content type they expect to see.

Using the provided audience segmentation types, you can craft a detailed and targeted image prompt. Let's break down how to incorporate each segmentation type into the prompt:

1. Demographic Segmentation:
   Utilize outward-facing attributes to describe individuals or groups in the image.
   Example (based on hypothetical data): "A middle-aged married woman"
2. Behavioral Segmentation or Persona:
   Integrate actions or habits that resonate with the audience's behavior.
   Example (based on hypothetical data): "who frequently shops online, actively engages on social media, and enjoys mobile gaming on her tablet"
3. Psychographic or Attitudinal Segmentation:
   Infuse elements that align with the audience's interests, preferences, and values.
   Example (based on hypothetical data): "She has a preference for eco-friendly brands, enjoys mystery movies, and values sustainability and wellness."
4. Geographic Segmentation:
   Set the scene in a location that matches the audience's geographic region.
   Example (based on hypothetical data): "She is situated in a cozy apartment in downtown Toronto, Canada."

Final Prompt:

"A middle-aged married woman who frequently shops online, actively engages on social media, and enjoys mobile gaming on her tablet. She has a preference for eco-friendly brands, enjoys mystery movies, and values sustainability and wellness. She is situated in a cozy apartment in downtown Toronto, Canada."

This prompt provides a comprehensive view of the target audience, painting a vivid picture that encompasses demographic, behavioral, psychographic, and geographic attributes.

However, the granularity of the prompt will depend on the specificity of the data the user has provided. The more detailed the data, the more tailored the prompt can be, allowing for a more targeted image generation.

There are generic guidelines. Use the user-provided information and your expertise as an AI Assistant in generating good prompts for the generation of images with Dall-e or stable diffusion to help generate the same.

The user can provide additional information with user instructions for the CGS to generate images. This information may be derived from information about products, audiences, etc., configured by the user on DGS. In the example below, the information contains the product with a description of the customer, an audience definition with a description, and some relevant prompt examples.

You are an AI Assistant who will help generate good image-generation prompts.

I sell the following products:

1. Barista-101—Espresso machine for home.
2. OffEspro-101—Espresso machine for office.
3. KidsChoc-101—Hot chocolate vending machine for kids.

Following are the descriptions of my audiences:

1. Goldstar—Home users from North America who use Barista-101 machines.
2. KidChamp—Kids from California who use KidsChoc-101
3. OffPro—Office users from New York who use OffEspro-101

Incorporate some key attributes or adjectives of the product in the prompt generated.

Incorporate some key attributes or adjectives of the audience in the prompt generated.

Some prompt examples below. Don't use the same as is but use them as inspiration:

Photo of [XM-Coffee-machine] on a wooden table, bakery in the background, streets of London elegant, perfect composition, perfect composition, beautiful detailed intricate, insanely detailed, 8k artistic photography, photorealistic, soft natural cinematic lighting.

In one example, the user prompt is a single-line goal, "I want to promote a home coffee machine for Halloween."

The prompt generated CGS is:

"A photo of the Barista-101 espresso machine, adorned with Halloween-themed decorations like cobwebs and mini pumpkins. The machine is set in a cozy North American home kitchen, with a steaming cup of espresso on the side. The atmosphere is warm and inviting, with soft lighting and autumnal colors, perfect for a Facebook post to engage with the Goldstar audience."

In one example, the CGS generated four images of the espresso machine based on this prompt.

In another example, the user prompt is "I want to promote office coffee machine for Christmas holidays targeting Instagram channel."

The prompt generated CGS is:

"A photo of the OffEspro-101 espresso machine, decorated with Christmas ornaments and twinkling fairy lights. The machine is placed in a bustling New York office setting, with a steaming cup of espresso and a plate of Christmas cookies on the side. The atmosphere is festive and energetic, with a beautifully decorated Christmas tree in the background. The image is vibrant and aesthetically pleasing, perfect for an Instagram post to engage with the OffPro audience."

In one example, the CGS generated four images of the espresso machine with holiday backgrounds based on this prompt.

In another example, the CGS generates an email for a marketing campaign. An example prompt template is as follows:

You are an AI Assistant that will help generate email for my email marketing campaign.

Creating an email for a marketing campaign requires gathering specific information from the user to ensure that the campaign is well-targeted and effective. Here's a structure for the brief, along with the inputs you should request from the user:

Below is an example structured template for a marketing email promoting a product for Halloween. Keep in mind that the specifics can be tailored to suit the company's brand voice, product features, and campaign goals.

Subject Line: Unlock Spooky Savings This Halloween with [Product Name]!

Preheader Text: Dive into the Halloween spirit! Enjoy exclusive deals on [Product Name] for a limited time.

[Email Header Image: A visually appealing and themed image showcasing the product.]

Hi [First Name],

[Introduction: Capture their attention and set the tone]

Get ready to make this Halloween spook-tacular with [Product Name]! Whether you're planning a haunted house extravaganza or a cozy night in, [Product Name] is the perfect companion for your festivities.

[Product Showcase: Highlight the product's key features and benefits]

Spooky Feature #1: [Brief description]

Spooky Feature #2: [Brief description]

Spooky Feature #3: [Brief description]

[Product Image]

With [Product Name], you're guaranteed an unforgettable Halloween experience, packed with [mention any specific benefits or features].

*: [Special Offer: Present the Halloween promotion or special deal]**

For a limited time only, enjoy a frighteningly good discount of [X] % when you purchase [Product Name] using the code SPOOKYSAVINGS at checkout!

[Testimonials/Reviews: Share social proof]

But don't just take our word for it! Here's what our happy customers have to say about [Product Name]:

"I can't imagine Halloween without [Product Name]. It totally transformed our celebration!"—[Customer Name]

[Call-to-Action: Encourage them to take action]

Ready to elevate your Halloween? Click the button below to grab your [Product Name] at this exclusive price!

[CTA Button: "Shop Now" or "Get My Deal"]

[Additional Information: Provide any necessary details about the promotion]

This haunting deal won't last long-the clock strikes midnight on [Date], and the savings will vanish!

: [Footer: Include contact information and legal compliance]

Stay spooky,

[Your Brand Name]

[Your Company's Physical Address]

[Unsubscribe Link]

[Optional: Social Media Links]

Connect with us:

[Social Media Icons/Links]

This structure aims to create a sense of excitement, highlight the product's benefits, provide social proof, and encourage immediate action, all while maintaining a festive Halloween theme. Ensure that the visuals, tone, and content align with your brand identity and resonate with your target audience.

Below is an example of user-provided information for generating the prompt:

You are an AI Assistant who will help generate good image-generation prompts.

I sell the following products:

1. Barista-101—Espresso machine for home.
2. OffEspro-101—Espresso machine for office.
3. KidsChoc-101—Hot chocolate vending machine for kids.

Following are the descriptions of my audiences:

1. Goldstar—Home users from North America who use Barista-101 machines.
2. KidChamp—Kids from California who use KidsChoc-101
3. OffPro—Office users from New York who use OffEspro-101

Incorporate some key attributes or adjectives of the product in the prompt generated.

Incorporate some key attributes or adjectives of the audience in the prompt generated.

Use the following brandkit information where appropriate

Normal font: Calibri

Header font: Calibri

Logo small: https://examplecompany.com/logo.png

Brand primary color pallet: #77DD7

Use the following email HTML template structure to fill up the relevant content. Make sure the header, footer, logo, and style are maintained as part of the generation

```
<html>
  <head>
    <img src https://examplecompany.com/logo.png>
  </head>
<body>
    <div>
{{ fill this with the content of max 512 length on product description
targeting the audience}}
    </div>
<img src={{ AI Assistant fill the link to the image required in format --
https://cdn.typeface.ai?product='productname' & audience ='audience
description' & prompt='a simple prompt to generate image with dale-3'
&width=512&height=512 }}/>
<div style='background-color:green'>
      {{ fill up call to action over here}}
</div>
</body>
<footer>
      Copyright www.examplecompany.com
</footer>
</html
```

Example output 1:

```
<html>
  <head>
    <img src="https://coffeemachineco.com/logo.png">
  </head>
  <body>
```

-continued

```
    <div>
      Hi [First Name],
      <p>
```

Transform your kitchen into a professional cafe this Halloween with Barista-101! Specially designed for coffee enthusiasts in North America, this espresso machine brings quality, efficiency, and the spirit of a barista right to your home.

```
      </p>
    </div>
    <img src="https://cdn.typeface.ai?product=Barista-
101&audience=Home%20users%20from%20north%20America&prompt=Capture%20a%20spo
oky%20and%20festive%20scene%20with%20Barista-
101%20perfectly%20brewing%20a%20cup%20of%20espresso,%20decorated%20with%20Hall
oween%20elements&width=512&height=512"/>
    <div style='background-color:green'>
      <p>
        Ready to brew like a pro? Click below to unlock your exclusive Halloween discount
on Barista-101!
      </p>
      <button style='color:white'>Get My Deal</button>
    </div>
  </body>
  <footer>
      Copyright www.coffemachineco.com
  </footer>
</html>
Example output 2 for kids:
<html>
  <head>
    <img src="https://coffeemachineco.com/logo.png">
  </head>
  <body>
    <div>
      Hi [First Name],
      <p>
```

Make every coffee break a treat this Halloween with OffEspro-101! Designed for the fast-paced environment of New York offices, this espresso machine ensures a quick, smooth, and delightful coffee experience every time.

```
      </p>
    </div>
    <img src="https://cdn.typeface.ai?product=OffEspro-
101&audience=Office%20users%20from%20New%20York&prompt=Showcase%20OffEspro-
101%20in%20a%20busy%20office%20setting,%20decorated%20with%20Halloween%20eleme
nts,%20highlighting%20its%20efficiency%20and%20style&width=512&height=512"/>
    <div style='background-color:green'>
      <p>
        Upgrade your office coffee experience today! Click below to snag your OffEspro-
101 at an unbeatable Halloween price!
      </p>
      <button style='color:white'>Get My Deal</button>
    </div>
  </body>
  <footer>
      Copyright www.examplecompany.com
  </footer>
</html>
```

Here is another example of a prompt template for generating a post for job recruiters to be posted on a social network or a jobs website:

```
POST_HR = BasePromptBlueprint(
    task_description="Write a job post that recruiters would make for ${purpose}.",
    task_command="The job post that recruiters would make for ${purpose } is as
follows:",
    task_details=("Tailor your content to resonate with professionals, industry insiders,
potential hires, or partners."
        +("\n- Clearly state the post's purpose and benefits for connections. Include the
company details ${company_name}")
        +("\n- Acknowledge the two-second time frame to engage users, emphasizing the
need for a compelling headline.")
        +("\n- Address the potential intimidation of walls of text and advocate for using
short, easily digestible sentences.")
        +("\n\t"""Call to action:
          % if cta:\n- Call to action with desired outcomes: ${cta}.\n% endif""")
        +("\n\t"""Sign Up Details:
          % if sign_up:\n - Sign Up Details for the event:
            ${sign_up}.\n% endif""")
          +("\n- Conclude the post effectively with a question, emphasizing increased
trending potential with more comments.")
          ).
    working_document=cleandoc("""${content}\n"""),
    task_constraints=["Omit references to attached documents due to limitations.",
          "Rely only on content provided. Do not make up information.",
          "Limit the use of emojis to a maximum of 2.",
          "Ensure a professional tone and adhere to proper grammar and punctuation."
          ],
    output_structure="Use a top line header followed by the use of bullet points or
numbered lists, as this will grab attention and break up the text, meaning viewers can engage
with what you have to say without losing much time.",
    Config={
        "essential_task_vars": ["content", "purpose","company_name"],
        "optional_task_vars": ["cta","sign_up"]
        }
    )
```

Further, the prompt generator 2308 may access prompts from a prompt corpus 2322 that includes a curated set of prompts that perform well for specific scenarios. The prompt corpus 2322 is a database of the best prompts that we have carefully selected and tested. By combining the prompt corpus with the template and user inputs, a quality prompt is selected for use.

After the generated item 2316 is generated, an optional operation 2318 of content postprocessing may be performed to modify or block the newly generated item 2316, resulting in a processed new item 2320. The generated item 2316 may be post-processed for various reasons, including improving accuracy and consistency (e.g., checking for factual errors, grammatical mistakes, or inconsistencies in style or format); enhancing quality and relevance (e.g., removing irrelevant or redundant content, improving coherence and flow, ensure that the output aligns with the intended purpose); enhancing output (e.g., polish wording, improve images, ensure that the style matches the desired effect); personalizing the newly generated item 2316; and ensuring ethical and responsible use.

The generated item 2316 is new content, and it does not refer to content that is the result of editing or changing existing material (e.g., editing an image to include text within is not considered GAI-generated new content). One difference between the generated item 2316 and material created with editing tools is that the newly generated item 2316 is entirely new content, while the editing tool modifies existing content or creates the content one instruction at a time. Another difference is that the GAI model 2312 can produce highly creative and imaginative content, while editing tools focus on enhancing the existing content based on user commands. Another difference is that the GAI model 2312 can generate content rapidly, while the editing tools require more time and effort for thorough editing and refinement.

Figure 24:
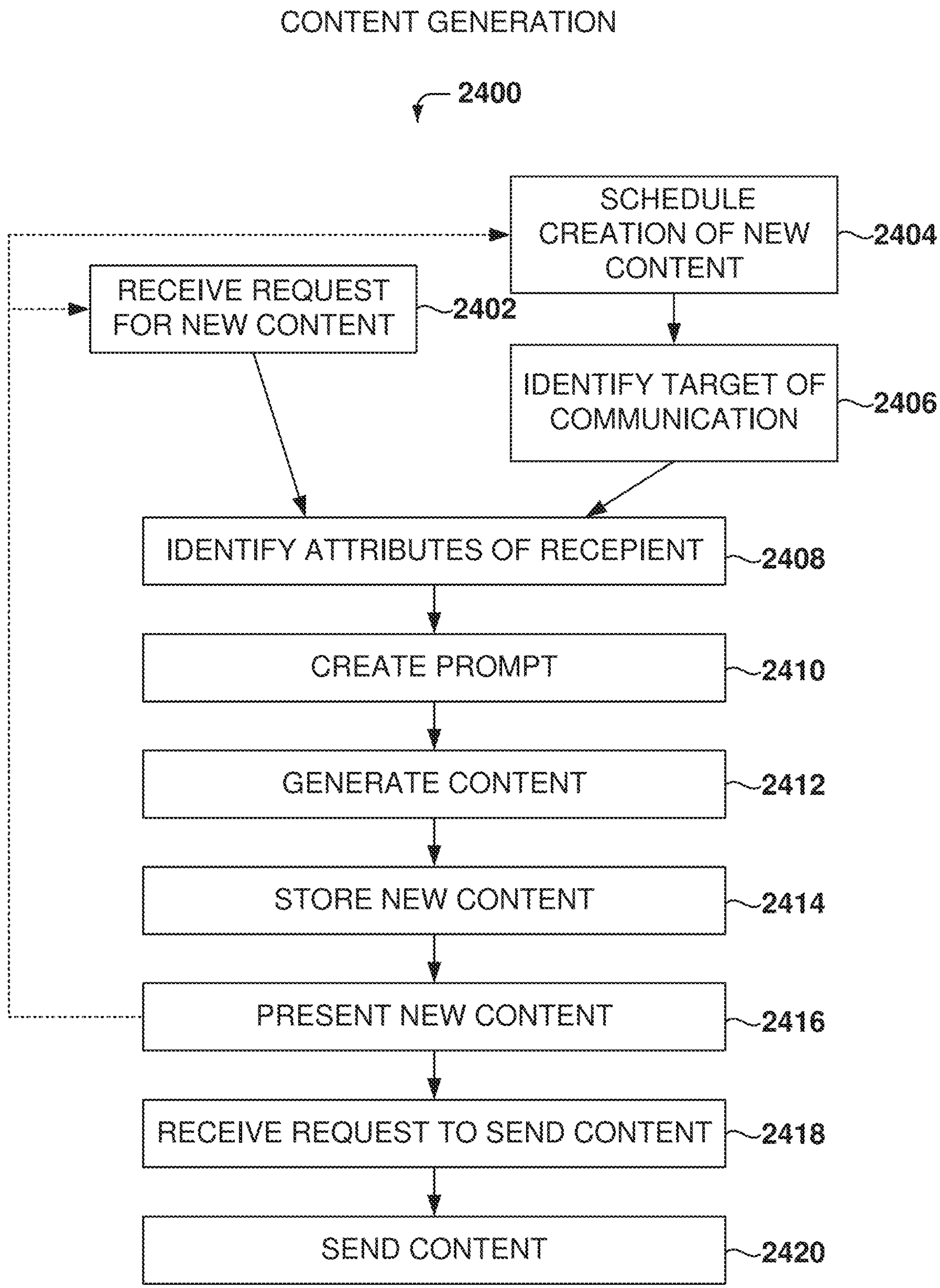
FIG. 24 is a flowchart of a method for generating content according to some examples.

FIG. 24 is a flowchart of a method 2400 for generating content according to some examples. While the various operations in this flowchart are presented and described sequentially, one of ordinary skill will appreciate that some or all of the operations may be executed in a different order, be combined or omitted, or be executed in parallel.

FG can use the results of FG's analytics for the content created in order to improve the effectiveness of the content, such as images shown in communications. This process can be automated to create more of the successful images. However, FG also leverages human input to learn from the user what is working better for the user in order to refine the process further to generate the personalized content feed.

Once a feed is established, FG can apply the parameters of the feed to different app-level patterns, such as email journeys, orchestrations, social media, and paid media. If there is a marketing job that needs to be done, the FG can help a growth marketer by creating advertisements. FG works with the user to create a customized solution that utilizes feeds as a core and optimizes the experience level to fit the user's specific workflows. For example, if the user needs an integration into the email system, FG can facilitate that.

There are two ways in which the creation of new content is triggered: when a request for new content is received at operation 2402 and when the creation of new content is scheduled at operation 2404, e.g., generation of content every night while the system is less busy, so the user can access and select new content generated automatically by the FG.

From operation 2404, the method 2400 flows to operation 2406 to identify the target of the communication that will use the generated content, e.g., selecting the project and audience for the communication. The process may be repeated multiple times for each of the different projects and active audiences.

From operation 2406 and operation 2402, the method 2400 flows to operation 2408 to identify the attributes of the recipient (e.g., demographics, channel, brand parameters, user curation history).

From operation 2408, method 2400 flows to operation 2410, which creates a prompt for the GAI tool.

From operation 2410, the method 2400 flows to operation 2412, where the content is generated using the selected GAI tool From operation 2412, the method 2400 flows to operation 2414 to store the generated content in memory, e.g., a database.

From operation 2414, the method 2400 flows to operation 2416, where the new content is presented to the user, e.g., in the canvas tool of FIG. 1. After the new content is presented, the content creation may be repeated by reentering the method 2400 at operation 2402 or operation 2404.

From operation 2416, the method 2400 flows to operation 2418, where a request is received to send the content item in a communication.

From operation 2418, the method 2400 flows to operation 2420, where the content is transmitted for presentation to an end-user.

Further, the FG can leverage the campaign journey orchestration that has been defined in a third-party system. FG gathers data from these systems, compiles it, and then creates a personalized content feed as indicated in the method 2400.

Figure 25:
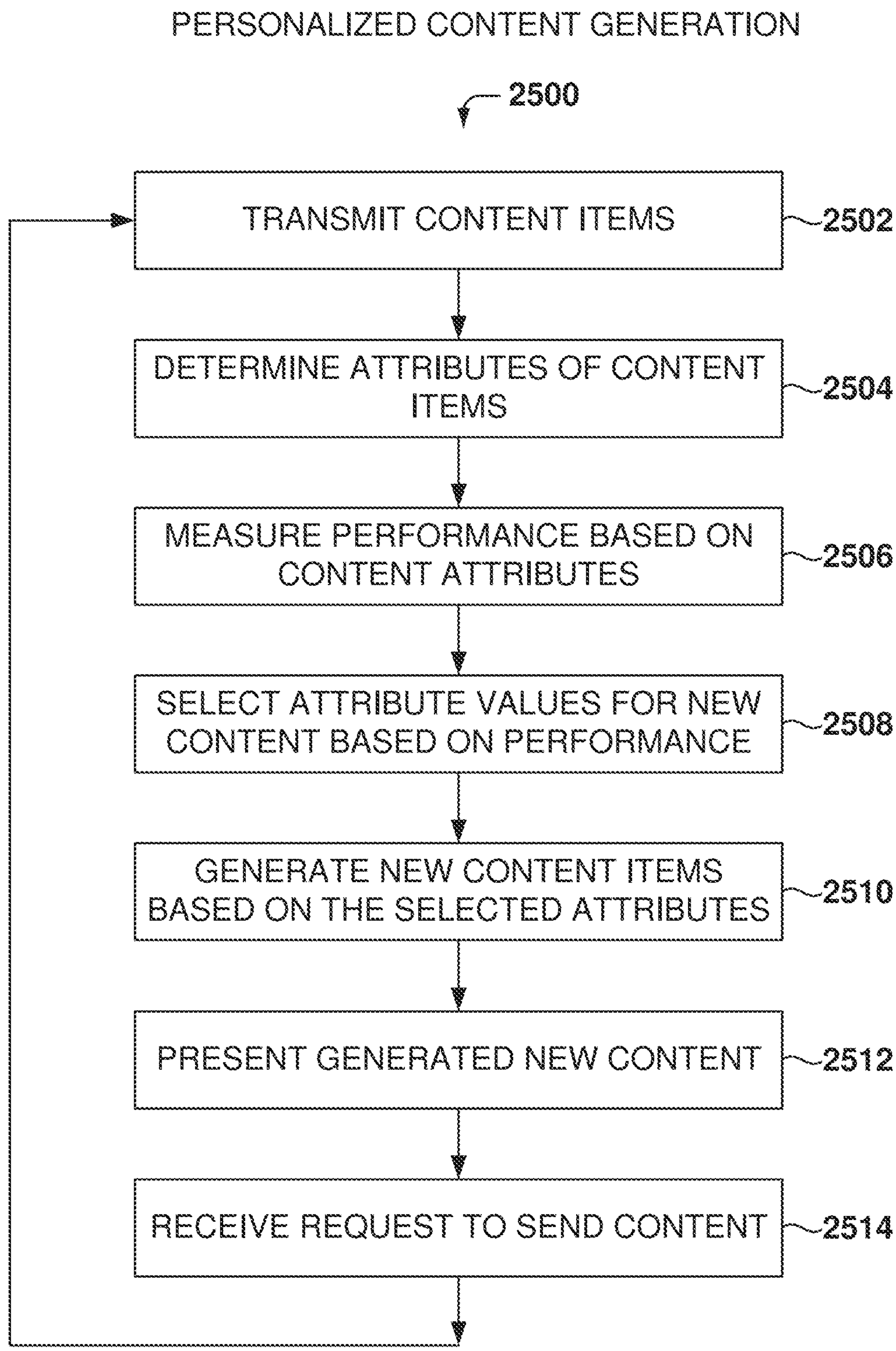
FIG. 25 is a flowchart of a method for generating personalized content according to some examples.

FIG. 25 is a flowchart of a method 2500 for generating personalized content according to some examples. While the various operations in this flowchart are presented and described sequentially, one of ordinary skill will appreciate that some or all of the operations may be executed in a different order, be combined or omitted, or be executed in parallel.

To track customer communications, the user may select to perform A/B testing with FG. The A/B testing involves testing two different versions of an item (e.g., an Instagram post) and comparing their relative performance, e.g., which item produced better results, such as a higher clickthrough rate. However, with the ease of creating new content, the user can perform multiple rounds of A/B testing during a campaign in order to optimize the content performance continuously. By doing so, the user can create a feedback loop to allow the ongoing improvement of the campaign's effectiveness.

The FG is designed to prompt users for content and generate personalized content based on data feeds and previous campaigns. As the content creation process becomes more streamlined, the focus may shift from creation to curation, allowing users to sift through content to find what they like best without having even to request the generation of new content.

How does the user improve the content used in campaigns? There are two parts: the FG creates and transmits personalized content, and the experience gained from the performance of past communications is used to curate the feed content.

There are two parts to finding what the user prefers: first, there is an engine that creates personalized content, and second, there is an experience-level innovation to curate a feed of content. With the ability to generate a large number of content items (e.g., hundreds of items), FG can create batches of bulk creations to create content in the background, even while the user is not logged in. Every day, the user can see new ideas and decide which ones to select. Further, based on the user choices, the user can request more options and set up performance testing. This is how the experiences and content evolve and improve over time.

Operation 2502 is for transmitting one or more content items to users.

From operation 2502, the method 2500 flows to operation 2504 to determine the attributes of the content items (e.g., the content of an image, text sent, the layout of the communication, frequency of communications, and the audience).

From operation 2504, the method 2500 flows to operation 2506 to measure the performance of the content items based on the content attributes. As discussed above, A/B testing can be used to test the performance based on the selected predetermined performance parameters (e.g., clickthroughs to a website included in the communication, amount of time spent on the communication, number of visits to the website, number of sales, total amount of sales, number of shares of the communication with other users, number of responses sent to the communication).

From operation 2506, the method 2500 flows to operation 2508 to select the attribute values for new content to be generated based on the measured performance. In some examples, a machine learning (ML) model may be used to select the attribute values that perform best given the item promoted and the target audience. More details regarding the ML model are provided below with reference to FIG. 27.

In other examples, rules may be used to select attributes based on past performance; however, given the large number of options in the system, it may be difficult to create a large number of rules for selecting content, and that is why the ML model works best in complex environments. However, rules may also be valuable in smaller environments with less complexity (e.g., a small number of products, a small number of campaigns, and a small number of customer communications).

From operation 2508, the method 2500 flows to operation 2510 to generate new content items based on the selected attributes (e.g., ocean background, friendly-tone text).

From operation 2510, the method 2500 flows to operation 2512 to present the generated new content to the user.

From operation 2512, the method 2500 flows to operation 2514 to receive a request to send selected content to customers.

From operation 2514, the method 2500 flows to operation 2502 to transmit the one or more content items.

Figure 26:
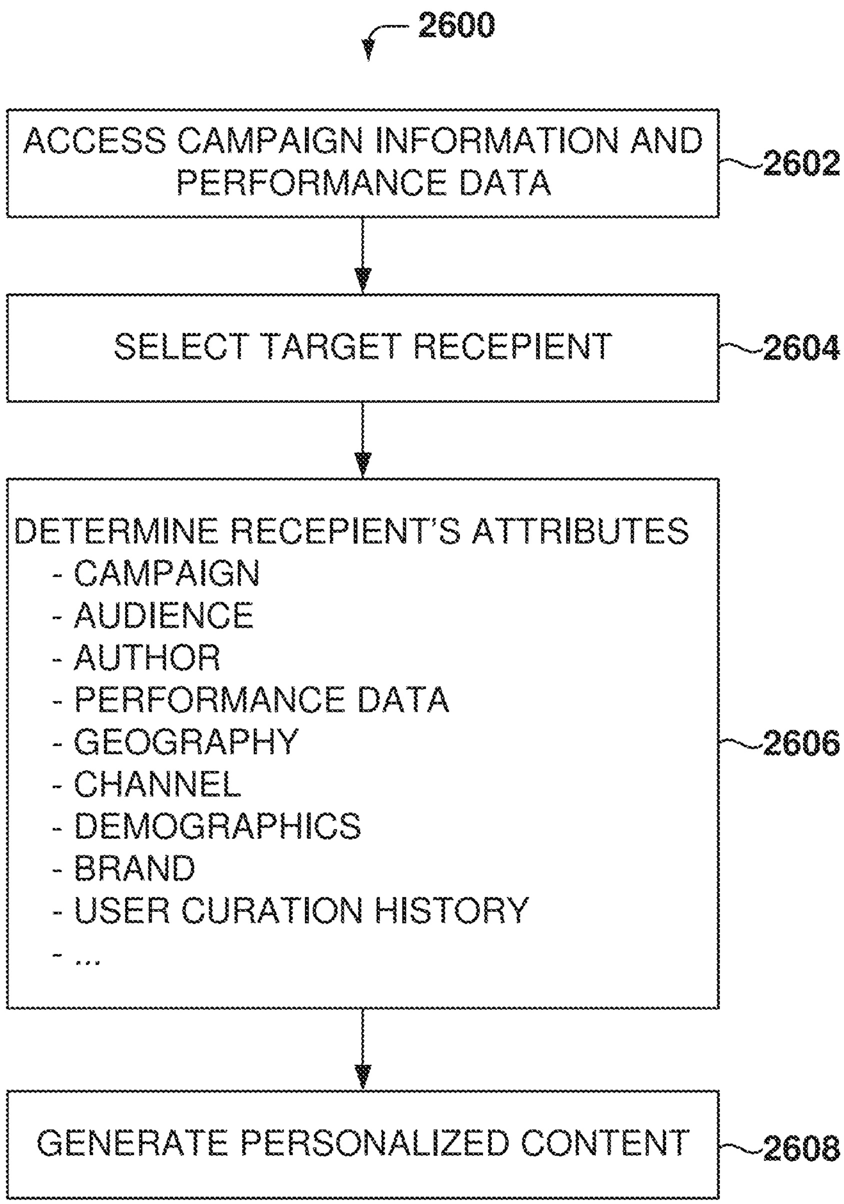
FIG. 26 is a flowchart of a method for details on generating personalized content according to some examples.

FIG. 26 is a flowchart of a method 2600 for details on generating the personalized content according to some examples. While the various operations in this flowchart are presented and described sequentially, one of ordinary skill will appreciate that some or all of the operations may be executed in a different order, be combined or omitted, or be executed in parallel.

Operation 2602 is for accessing campaign information and performance data. As described above with reference to FIG. 23, there are two ways to improve the outputs: by improving the GAI prompt 2310 or by fine-tuning 2314 the GAI model with user data. For example, after running several campaigns, performance data shows that images with water backgrounds perform better. Afterward, the GAI prompt 2310 will include text requesting a water background: e.g., " . . . create an image with water background . . . and the following attributes: . . . ". Further, the GAI model 2312 will be improved with the performance data from previous campaigns.

From operation 2602, the method 2600 flows to operation 2604 to select the target recipient of the communication, e.g., a user or an audience.

From operation 2604, the method 2600 flows to operation 2606 to determine the recipient's attributes. To create personalized content, the user attributes are determined. There may be multiple sources of attributes about the user. In some examples, the recipient's attributes include data from one or more of campaign, audience, author, performance data of the content previously sent, geography, channel, demographics, brand, usurped duration history, etc.

The campaign data refers to information about past campaigns, such as channel used, audiences, content sent, scheduling of communications, etc. The author refers to the person who is sending the communication, e.g., the CEO of the company is the sender of the communication, a technical lead, or a support person.

The performance data refers to the performance of previous communications, such as the number of users who responded to the communication. Geography refers to the location of the recipient, as the local messaging styles may differ from country to country, from large cities to small cities, etc.

The channel refers to the media that will be used for the communication, such as email, texting, social media posts, advertisements, etc. The demographics refer to information about the user, such as age, gender, city of residence, etc.

The brand refers to the requirements set up by the user for the brand, such as professional content, casual content, the brand's values, etc. Further, the user curation history refers to the selections made by users when content was previously suggested to them, e.g., what content was discarded and what content was used for communications.

The FG will determine what attributes are important for the communication, e.g., when the tone of the content is friendly and the images used are related to water, the click-through rate for this particular audience segment increases. With the use of AI, it is possible to analyze the images and identify their contents, such as a blue chair, a black dress, a pool, or a sky. This is a valuable insight generated by tracking performance instead of having to rely on user feedback.

From operation 2606, the method 2600 flows to operation 2608 to generate personalized content for the user.

Figure 27:
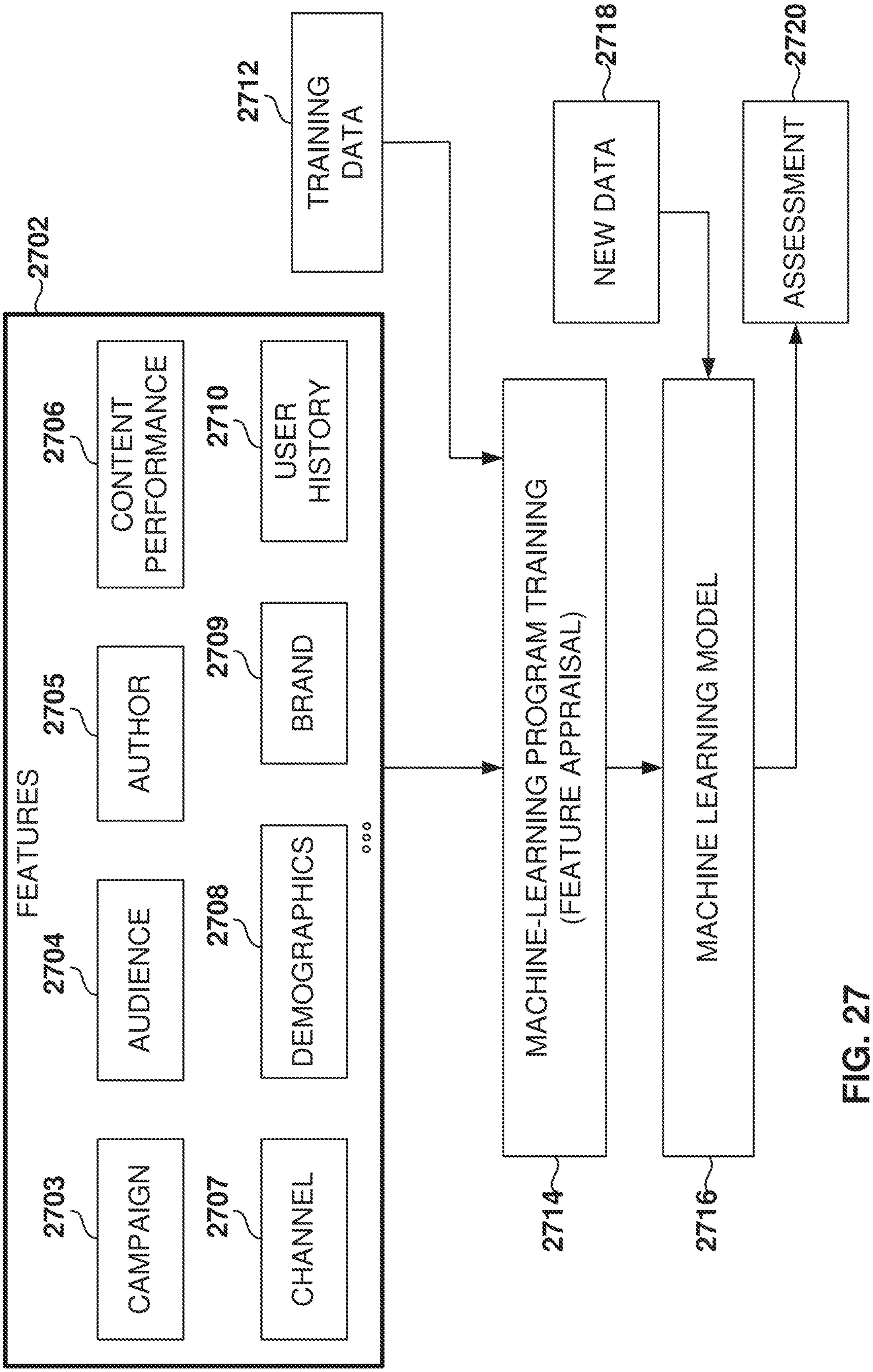
FIG. 27 illustrates the training and use of a machine-learning model, according to some example examples.

FIG. 27 illustrates the training and use of a machine-learning model 2716, according to some example examples. In some examples, machine learning (ML) models 2716 are utilized to select attributes for generating content.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 2716 from training data 2712 in order to make data-driven predictions or decisions expressed as outputs or assessments 2720. Although examples are presented with respect to a few machine-learning tools, the principles presented herein may be applied to other machine-learning tools.

The performance data feeds into the generative AI models to improve the content creation itself. As often is the case with GAI, the GAI models improve over time as more people use them. Therefore, every campaign is a learning opportunity, and the subsequent campaign will start with better content than in the previous campaign. In some examples, the ML model 2716 provides a score of attributes that can be used to generate content. The attributes with the highest scores are then used to create the prompts for the GAI tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

The training data 2712 comprises examples of values for the features 2702. In some examples, the training data comprises labeled data with examples of values for the features 2702 and labels indicating the outcome, such as the user clicked on the content, the user made a purchase, the user asked for additional information, etc. The machine-learning algorithms utilize the training data 2712 to find correlations among identified features 2702 that affect the outcome. A feature 2702 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In one example, the features 2702 may be of different types. They may include data from one or more of campaign 2703, audience 2704, author 2705, content performance 2706, channel 2707, demographics 2708, brand 2709, user history 2710 (e.g., content selected by the user), etc. The layout is another feature that may be considered, e.g., for communications with the same content, which layout performed better: the image on top, the image on the left side of the text, the image on the center of the text, the image on the right side of the text, the image below the text. When a certain layout performs the best for a certain audience, this layout will be given preference in future communications to this audience.

Features related to the content may also be included. The content created can take on various forms, such as text, images, or videos. Each form has its own unique attributes. For text, for instance, one consideration is the length of the text. Is it better to use short-form or long-form text? This will depend on the type of content and the intended audience. Additionally, the tone used is another feature because the tone will vary depending on the audience. For example, different tones would be used when communicating with a teenager versus when communicating with a professional.

For video, multiple attributes define a video, such as whether animations work better than still images, what the length of the video is, whether there is sound with the video, etc.

Regarding author 2705 attributes, the communication will account for who the author or sender behind the message is. For example, if a CEO communicates, people may expect the CEO to be inspirational, versus a communication from a technical lead will have more technical content.

The characteristics of the brand 2709 relate to the guidelines used for communications associated with the brand, such as the set of brand values and tones that the marketers are consistently using or avoiding. Thus, it is important to ensure that the brand's voice and tone are being reflected in the best possible way so they are being reflected accurately.

Typically, there is a process of personalizing a brand. As a brand, the marketeer may choose to use warm tones instead of cool ones or use vector graphics for the background instead of real photography. All of these preferences can be learned based on measuring the performance, e.g., what works well and what does not work well.

The content performance 2706 of the content previously presented is also a valuable feature for selecting content attributes. For example, what image resolution works best, does landscape perform better than portrait orientation, etc. Additionally, what is in the image (e.g., the background of the image, whether it is a city, forest, or ocean), and how does it affect performance for each audience?

In some examples, AI tools for computer vision are utilized to identify the contents of the images, and these tools are sometimes referred to as visual Q&A systems. For example, what is the color of the T-shirt shown in the image? Is there a pattern on the T-shirt? etc. The FG may utilize the tool to determine what is in the image and then use the content identified for performance tracking that may be used in the training data 2712.

During training 2714, the ML program, also referred to as ML algorithm or ML tool, analyzes the training data 2712 based on identified features 2702 and configuration parameters defined for the training. The result of the training 2714 is the ML model 2716, which is capable of taking inputs to produce assessments.

Training an ML algorithm involves analyzing large amounts of data (e.g., from several gigabytes to a terabyte or more) in order to find data correlations. The ML algorithms utilize the training data 2712 to find correlations among the identified features 2702 that affect the outcome or assessment 2720. In some examples, the training data 2712 includes labeled data, which is known data for one or more identified features 2702 and one or more outcomes. In some examples, the training data 2712 includes content items previously created (including the attributes associated with the content), and the outcomes include performance metrics of the content items (e.g., items were selected for transmittal or not, number of clickthroughs on the communications sent, number of sales, number of visits to the website referenced in the communication, etc.).

The ML algorithms usually explore many possible functions and parameters before finding what the ML algorithms identify to be the best correlations within the data; therefore, training may make use of large amounts of computing resources and time.

When the ML model 2716 is used to perform an assessment, new data 2718 is provided as input to the ML model 2716, and the ML model 2716 generates the assessment 2720 as output. In some examples, the input for the ML model 2716 includes information about an attribute, and that assessment 2720 provides a score (e.g., a number from 1 to 100, a real number between 0 and 1) regarding the relevance of the attribute for generating content.

In other examples, the input to the ML model 2716 includes a list of attributes (e.g., represented within a vector), and the output provides scores for the list of attributes. In another example, the output includes a list of a predetermined number of the best attributes for generating content. The list of attributes of the input may include the audience that is targeted for the communication.

In some examples, results obtained by the model 2716 during operation (e.g., assessment 2720 produced by the model in response to inputs) are used to improve the training data 2712, which is then used to generate a newer version of the model. Thus, a feedback loop is formed to use the results obtained by the model to improve the model.

Figure 28:
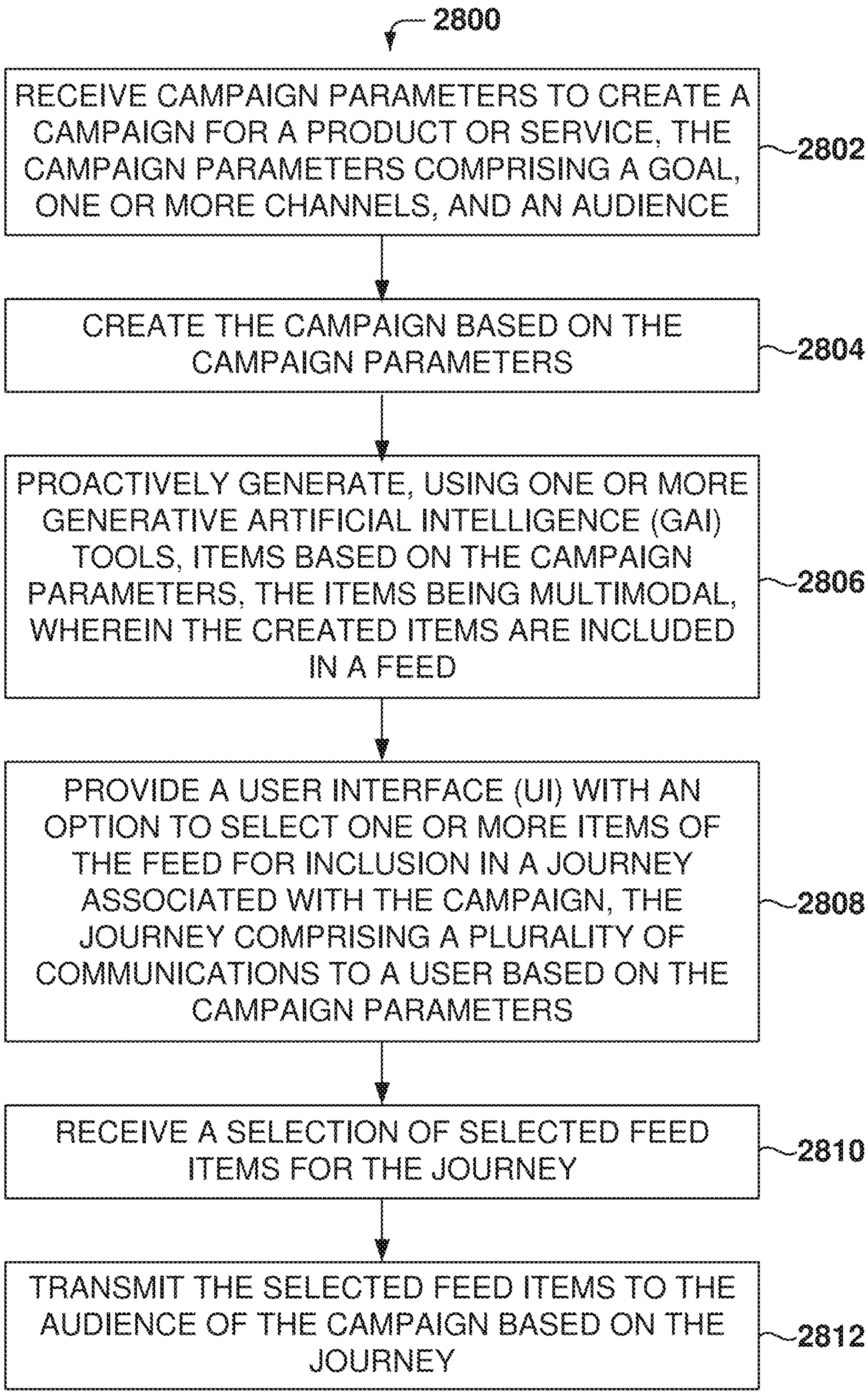
FIG. 28 is a flowchart of a method for proactively generating personalized content according to some examples.

FIG. 28 is a flowchart of a method 2800 for proactively generating personalized content according to some examples. While the various operations in this flowchart are presented and described sequentially, one of ordinary skill will appreciate that some or all of the operations may be executed in a different order, be combined or omitted, or be executed in parallel.

Operation 2802 is for receiving campaign parameters to create a campaign for a product or service. The campaign parameters comprise a goal, one or more channels, and an audience.

From operation 2802, the method 2800 flows to operation 2804 for creating the campaign based on the campaign parameters.

From operation 2804, the method 2800 flows to operation 2806 to proactively generate, using one or more generative artificial intelligence (GAI) tools, items based on the campaign parameters, the items being multimodal, wherein the created items are included in a feed.

From operation 2806, the method 2800 flows to operation 2808 for providing a user interface (UI) with an option to select one or more items of the feed for inclusion in a journey associated with the campaign, the journey comprising a plurality of communications to a user based on the campaign parameters.

From operation 2808, the method 2800 flows to operation 2810 for receiving a selection of selected feed items for the journey.

From operation 2810, the method 2800 flows to operation 2812 for transmitting the selected feed items to the audience of the campaign based on the journey.

In some examples, the method 2800 further comprises providing an option in the UI to generate additional items for the feed based, the UI comprising a field for entering user instructions to generate the additional items.

In some examples, proactively generating the items further comprises, for each item to be generated, selecting a GAI tool based on a type of item to be generated; creating a prompt to generate the item; and providing the prompt as input to the GAI tool that generates the item as output.

In some examples, the method 2800 further comprises providing an option in the UI to access an existing plan created with a third-party tool and obtaining the campaign parameters using the third-party tool.

In some examples, the items are generated based on brand parameters for the product or service.

In some examples, the multimodal items are configured to include text items, image items, sound items, and video items.

In some examples, the campaign parameters further comprise one or more channels for the distribution of the content.

In some examples, creating the campaign further comprises identifying messages for the campaign, determining channels for communication, and creating a timeline for execution.

In some examples, image items generated for the campaign comprise images generated based on a prompt entered by the user and images proactively generated.

In some examples, the method 2800 further comprises providing an audience UI that presents audience information of the feed in a table, wherein the audience information is organized by having an audience type in each row and communications for the audience type in the row.

Another general aspect is for a system that includes a memory comprising instructions and one or more computer processors. The instructions, when executed by the one or more computer processors, cause the one or more computer processors to perform operations comprising: receiving campaign parameters to create a campaign for a product or service, the campaign parameters comprising a goal, one or more channels, and an audience; creating the campaign based on the campaign parameters; proactively generating, using one or more generative artificial intelligence (GAI) tools, items based on the campaign parameters, the items being multimodal, wherein the created items are included in a feed; providing a user interface (UI) with an option to select one or more items of the feed for inclusion in a journey associated with the campaign, the journey comprising a plurality of communications to a user based on the campaign parameters; receiving a selection of selected feed items for the journey; and transmitting the selected feed items to the audience of the campaign based on the journey.

In yet another general aspect, a tangible machine-readable storage medium (e.g., a non-transitory storage medium) includes instructions that, when executed by a machine, cause the machine to perform operations comprising: receiving campaign parameters to create a campaign for a product or service, the campaign parameters comprising a goal, one or more channels, and an audience; creating the campaign based on the campaign parameters; proactively generating, using one or more generative artificial intelligence (GAI) tools, items based on the campaign parameters, the items being multimodal, wherein the created items are included in a feed; providing a user interface (UI) with an option to select one or more items of the feed for inclusion in a journey associated with the campaign, the journey comprising a plurality of communications to a user based on the campaign parameters; receiving a selection of selected feed items for the journey; and transmitting the selected feed items to the audience of the campaign based on the journey.

Figure 29:
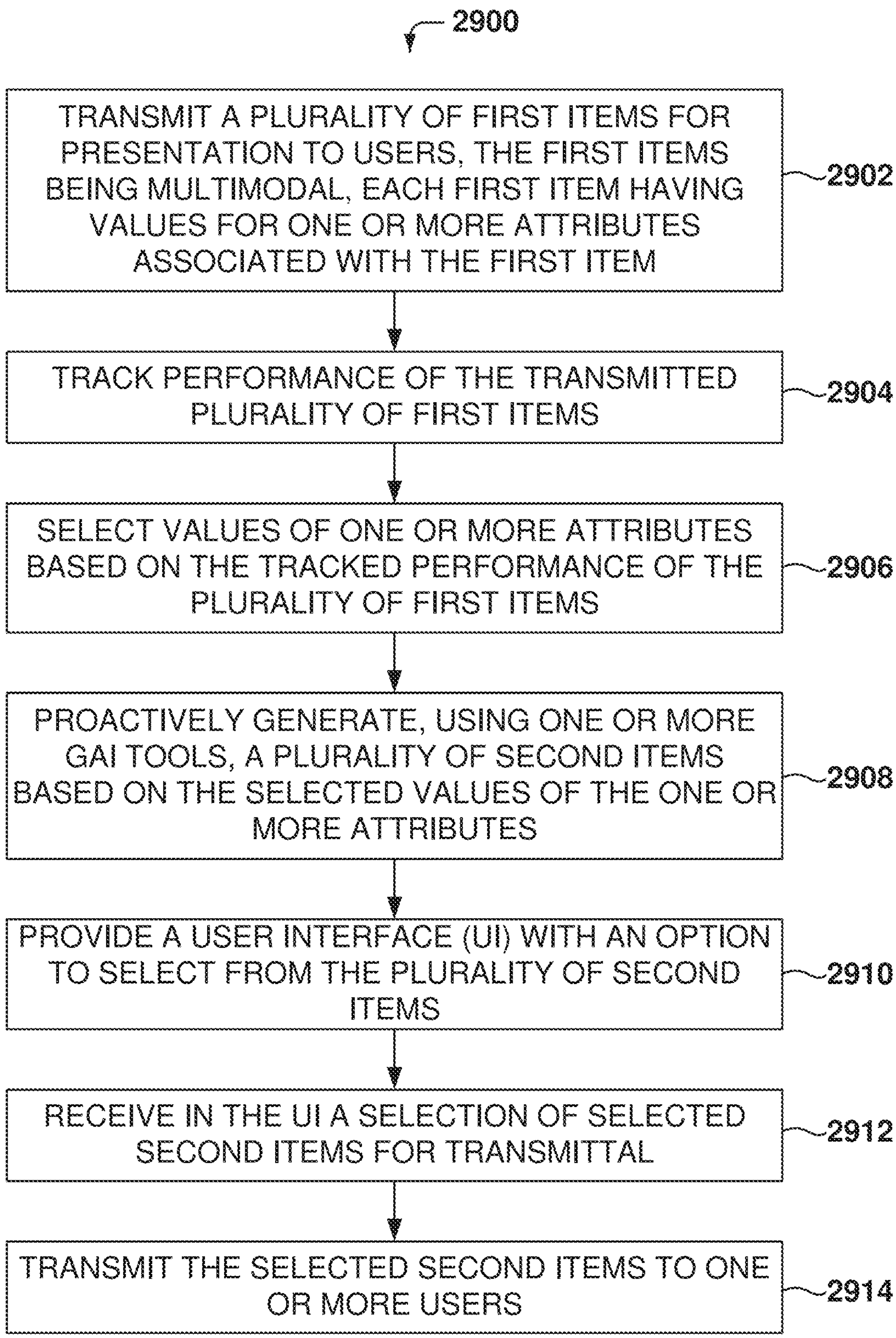
FIG. 29 is a flowchart of a method for proactively generating content based on the tracked performance of previous content, according to some examples.

FIG. 29 is a flowchart of a method 2900 for proactively generating content based on the tracked performance of previous content, according to some examples. While the various operations in this flowchart are presented and described sequentially, one of ordinary skill will appreciate that some or all of the operations may be executed in a different order, be combined or omitted, or be executed in parallel.

Operation 2902 is for transmitting a plurality of first items for presentation to users, the first items being multimodal, each first item having values for one or more attributes associated with the first item.

From operation 2902, method 2900 flows to operation 2904 to track the performance of the transmitted plurality of first items.

From operation 2904, the method 2900 flows to operation 2906 for selecting values of one or more attributes based on the tracked performance of the plurality of first items.

From operation 2906, the method 2900 flows to operation 2908 for proactively generating, using one or more generative artificial intelligence (GAI) tools, a plurality of second items based on the selected values of the one or more attributes.

From operation 2908, the method 2900 flows to operation 2910 for providing a user interface (UI) with an option to select from the plurality of second items.

From operation 2910, the method 2900 flows to operation 2912 for receiving in the UI a selection of selected second items for transmittal.

From operation 2912, the method 2900 flows to operation 2914 for transmitting the selected second items to one or more users.

Given the disclosure above, various examples are set forth below. It should be noted that one or more features of an example, taken in isolation or combination, should be considered within the disclosure of this application.

In some examples, the method 2900 further comprises training a machine-learning model with training data comprising performance information of items, the machine-learning model generating relevance scores of attributes for generating items.

In some examples, the machine-learning model receives as input information about an attribute and produces an output that is a score regarding a relevance of the attribute for generating content.

In some examples, the one or more attributes comprise one or more of campaign, audience, author, content performance, channel, demographics, or brand.

In some examples, proactively generating a plurality of second items further comprises, for each second item to be generated: selecting a GAI tool based on a type of item to be generated; creating a prompt to generate the second item; and providing the prompt as input to the GAI tool that generates the second item as output.

In some examples, the method 2900 further comprises receiving values of user attributes for the recipient of a communication; and selecting one or more items from the plurality of second items for presentation on a user interface (UI) based on the user attributes and the tracked performance of the plurality of first items.

In some examples, the method 2900 further comprises receiving values of audience attributes for an audience of a communication; and selecting one or more items from the plurality of second items for presentation on a user interface (UI) based on the audience attributes and the tracked performance of the plurality of first items.

In some examples, the method 2900 further comprises providing a UI for presenting performance information for the plurality of first items, the UI providing a table with content for each type of audience, the content being ranked according to performance.

In some examples, the method 2900 further comprises providing a UI for adding content to a feed of items, the content being selected from the plurality of second items.

In some examples, the method 2900 further comprises providing a UI for presenting information about the tracked performance, the information comprising insights based on the tracked performance for placement of items.

Another general aspect is for a system that includes a memory comprising instructions and one or more computer processors. The instructions, when executed by the one or more computer processors, cause the one or more computer processors to perform operations comprising: transmitting a plurality of first items for presentation to users, the first items being multimodal, each first item having values for one or more attributes associated with the first item; tracking performance of the transmitted plurality of first items; selecting values of one or more attributes based on the tracked performance of the plurality of first items; proactively generating, using one or more generative artificial intelligence (GAI) tools, a plurality of second items based on the selected values of the one or more attributes; providing a user interface (UI) with an option to select from the plurality of second items; receiving in the UI a selection of selected second items for transmittal; and transmitting the selected second items to one or more users.

In yet another general aspect, a tangible machine-readable storage medium (e.g., a non-transitory storage medium) includes instructions that, when executed by a machine, cause the machine to perform operations comprising: transmitting a plurality of first items for presentation to users, the first items being multimodal, each first item having values for one or more attributes associated with the first item; tracking performance of the transmitted plurality of first items; selecting values of one or more attributes based on the tracked performance of the plurality of first items; proactively generating, using one or more generative artificial intelligence (GAI) tools, a plurality of second items based on the selected values of the one or more attributes; providing a user interface (UI) with an option to select from the plurality of second items; receiving in the UI a selection of selected second items for transmittal; and transmitting the selected second items to one or more users.

Figure 30:
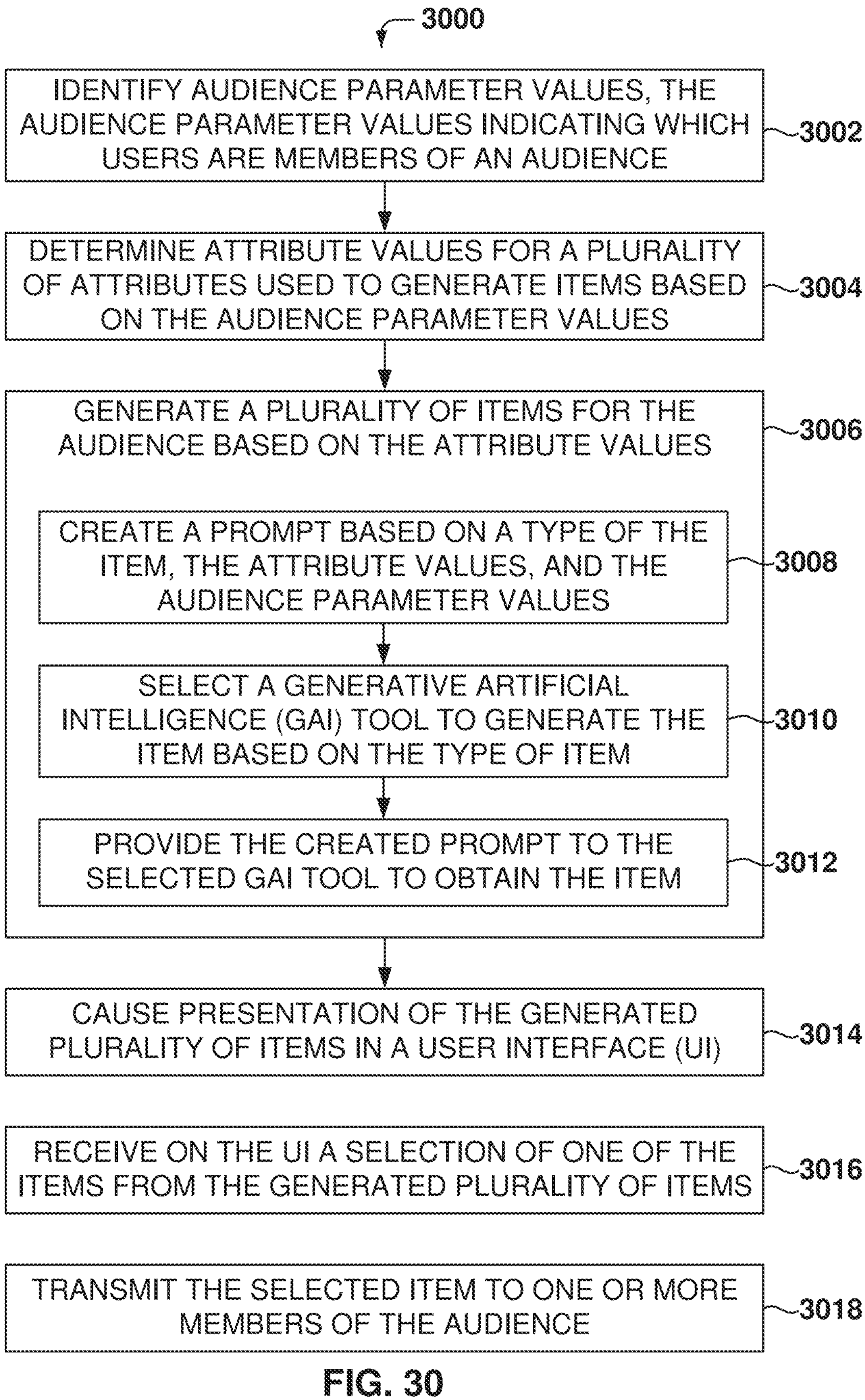
FIG. 30 is a flowchart of a method for generating personalized content, according to some examples.

FIG. 30 is a flowchart of a method 3000 for generating personalized content, according to some examples. While the various operations in this flowchart are presented and described sequentially, one of ordinary skill will appreciate that some or all of the operations may be executed in a different order, be combined or omitted, or be executed in parallel.

Operation 3002 is for identifying audience parameter values, the audience parameter values indicating which users are members of an audience.

From operation 3002, the method 3000 flows to operation 3004 for determining attribute values for a plurality of attributes used to generate items based on the audience parameter values.

From operation 3004, the method 3000 flows to operation 3006 for generating a plurality of items for the audience based on the attribute values. Operation 3006 comprises operations 3008, 3010, and 3012.

Operation 3008 is for creating a prompt based on a type of the item, the attribute values, and the audience parameter values.

From operation 3008, the method 3000 flows to operation 3010 for selecting a generative artificial intelligence (GAI) tool to generate the item based on the type of item.

From operation 3010, the method 3000 flows to operation 3012 for providing the created prompt to the selected GAI tool to obtain the item.

From operation 3012, the method 3000 flows to operation 3014 for causing the presentation of the generated plurality of items in a user interface (UI).

From operation 3014, the method 3000 flows to operation 3016 for receiving on the UI a selection of one of the items from the generated plurality of items.

From operation 3016, the method 3000 flows to operation 3018 for transmitting the selected item to one or more members of the audience.

Given the disclosure above, various examples are set forth below. It should be noted that one or more features of an example, taken in isolation or combination, should be considered within the disclosure of this application.

In some examples, the method 3000 further comprises providing a first user interface (UI) displaying information regarding different audiences, audience preferences, and content designed for each audience, the first UI providing an option to select and filter information by audience.

In some examples, the first UI provides cards showing documents generated for each communication channel.

In some examples, the method 3000 further comprises providing a second UI showing a performance of content presented to users and a feed of items available for future communications to the audience.

In some examples, the performance is a measurement of a response of users to communications, and the performance is based on one or more of a number of views, a percentage of users that selected a link for additional information, a percentage of users that bought a product or service associated with a transmitted item.

In some examples, generating each item further comprises utilizing past performance data to generate the item.

In some examples, determining attribute values further comprises utilizing an image-recognition model to determine features of images sent to users, determining a relevance score for the features based on the tracked performance of the images sent to users, and selecting the attribute values based on the relevance score of the features.

In some examples, the image-recognition model is trained using a dataset of images with known performance metrics, the image-recognition model learning correlations between visual elements and item performance, wherein the image-recognition model predicts a performance of new images based on visual features of the new images.

In some examples, the method 3000 further comprises providing a second UI showing audience information on a feed, the second UI showing content organized by audience for a plurality of audiences, the second UI presenting the audience information in a table organized by calendar date, with each column for a different day and each row showing communications planned or delivered for each day for each audience.

In some examples, the method 3000 further comprises generating a feed for the audience, wherein the items generated for the feed are deliverable via a plurality of channels that comprise publishing to social media, connecting to email automation systems, providing audience-level personalization on a webpage, and distributing through customer journey orchestrators.

Another general aspect is for a system that includes a memory comprising instructions and one or more computer processors. The instructions, when executed by the one or more computer processors, cause the one or more computer processors to perform operations comprising: identifying audience parameter values, the audience parameter values indicating which users are members of an audience; determining attribute values for a plurality of attributes used to generate items based on the audience parameter values; generating a plurality of items for the audience based on the attribute values, wherein generating each item from the plurality of items comprises: creating a prompt based on a type of the item, the attribute values, and the audience parameter values; selecting a generative artificial intelligence (GAI) tool to generate the item based on the type of item; and providing the created prompt to the selected GAI tool to obtain the item; causing presentation of the generated plurality of items in a user interface (UI); receiving on the UI a selection of one of the items from the generated plurality of items; and transmitting the selected item to one or more members of the audience.

In yet another general aspect, a tangible machine-readable storage medium (e.g., a non-transitory storage medium) includes instructions that, when executed by a machine, cause the machine to perform operations comprising: identifying audience parameter values, the audience parameter values indicating which users are members of an audience; determining attribute values for a plurality of attributes used to generate items based on the audience parameter values; generating a plurality of items for the audience based on the attribute values, wherein generating each item from the plurality of items comprises: creating a prompt based on a type of the item, the attribute values, and the audience parameter values; selecting a generative artificial intelligence (GAI) tool to generate the item based on the type of item; and providing the created prompt to the selected GAI tool to obtain the item; causing presentation of the generated plurality of items in a user interface (UI); receiving on the UI a selection of one of the items from the generated plurality of items; and transmitting the selected item to one or more members of the audience.

Figure 31:
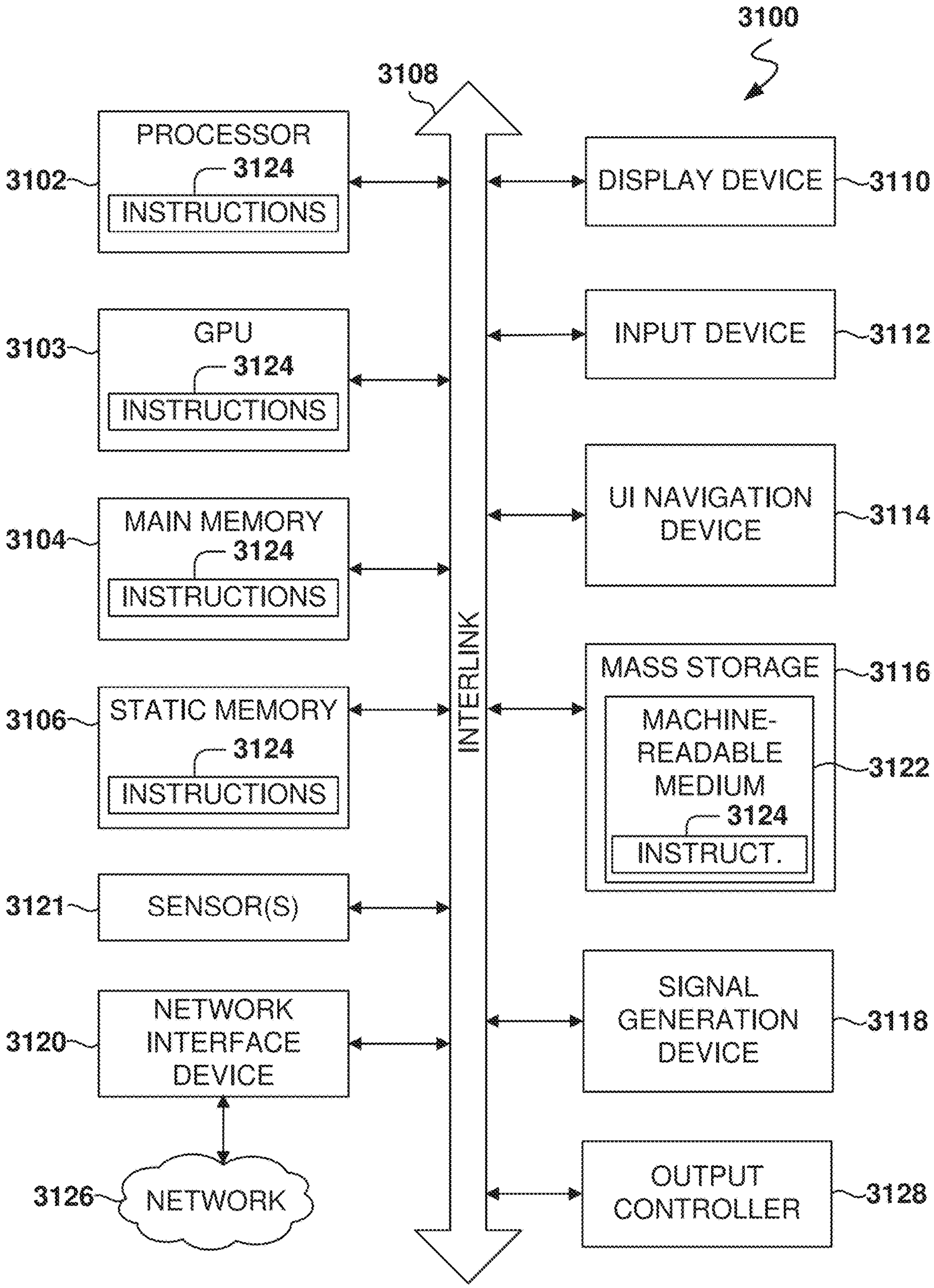
FIG. 31 is a block diagram illustrating an example of a machine upon or by which one or more example process embodiments described herein may be implemented or controlled.

FIG. 31 is a block diagram illustrating an example of a machine 3100 upon or by which one or more example process embodiments described herein may be implemented or controlled. In alternative embodiments, the machine 3100 may operate as a standalone device or be connected (e.g., networked) to other machines. In a networked deployment, the machine 3100 may operate in the capacity of a server machine, a client machine, or both in server-client network environments. For example, the machine 3100 may act as a peer machine in a peer-to-peer (P2P) (or other distributed) network environment. Further, while only a single machine 3100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 3100 (e.g., computer system) may include a hardware processor 3102 (e.g., a central processing unit (CPU), a hardware processor core, or any combination thereof), a graphics processing unit (GPU 3103), a main memory 3104, and a static memory 3106, some or all of which may communicate with each other via an interlink 3108 (e.g., bus). The machine 3100 may further include a display device 3110, an alphanumeric input device 3112 (e.g., a keyboard), and a user interface (UI) navigation device 3114 (e.g., a mouse). In an example, the display device 3110, alphanumeric input device 3112, and UI navigation device 3114 may be a touch screen display. The machine 3100 may additionally include a mass storage device 3116 (e.g., drive unit), a signal generation device 3118 (e.g., a speaker), a network interface device 3120, and one or more sensors 3121, such as a Global Positioning System (GPS) sensor, compass, accelerometer, or another sensor. The machine 3100 may include an output controller 3128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 3102 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 3102 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 3102 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 3102 may be emulated in software, running on a physical processor, as a virtual processor or virtual circuit. The virtual processor may behave like an independent processor but is implemented in software rather than hardware.

The mass storage device 3116 may include a machine-readable medium 3122 on which one or more sets of data structures or instructions 3124 (e.g., software) embodying or utilized by any of the techniques or functions described herein. The instructions 3124 may also reside, completely or at least partially, within the main memory 3104, within the static memory 3106, within the hardware processor 3102, or the GPU 3103 during execution thereof by the machine 3100. For example, one or any combination of the hardware processor 3102, the GPU 3103, the main memory 3104, the static memory 3106, or the mass storage device 3116 may constitute machine-readable media.

While the machine-readable medium 3122 is illustrated as a single medium, the term "machine-readable medium" may include a single medium or multiple media (e.g., a centralized or distributed database and associated caches and servers) configured to store one or more instructions 3124.

The term "machine-readable medium" may include any medium that is capable of storing, encoding, or carrying instructions 3124 for execution by the machine 3100 and that causes the machine 3100 to perform any one or more of the techniques of the present disclosure or that is capable of storing, encoding, or carrying data structures used by or associated with such instructions 3124. Non-limiting machine-readable medium examples may include solid-state memories and optical and magnetic media. For example, a massed machine-readable medium comprises a machine-readable medium 3122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 3124 may be transmitted or received over a communications network 3126 using a transmission medium via the network interface device 3120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various embodiments of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. Accordingly, the specification and drawings are to be regarded in an illustrative rather than a restrictive sense.

What is claimed is:

1. A computer-implemented method comprising:

identifying audience parameter values, the audience parameter values indicating which users are members of an audience;

determining attribute values for a plurality of attributes used to generate items based on the audience parameter values, the attribute values used to identify the members of the audience;

generating a plurality of items for the audience based on the attribute values, wherein generating each item from the plurality of items comprises:

creating a prompt based on a type of the item, the attribute values, and the audience parameter values, the prompt being a text description for generating new content;

selecting a generative artificial intelligence (GAI) tool to generate the item based on the type of item; and providing the created prompt to the selected GAI tool to obtain the item;

causing presentation of the generated plurality of items in a user interface (UI);

receiving on the UI a selection of one of the items from the generated plurality of items; and transmitting the selected item to one or more members of the audience.

2. The method as recited in claim 1, further comprising: providing a first user interface (UI) displaying information regarding different audiences, audience preferences, and content designed for each audience, the first UI providing an option to select and filter information by audience.

3. The method as recited in claim 2, wherein the first UI provides cards showing documents generated for each communication channel.

4. The method as recited in claim 1, further comprising: providing a second UI showing a performance of content presented to users and a feed of items available for future communications to the audience.

5. The method as recited in claim 4, wherein the performance is a measurement of a response of users to communications, and the performance is based on one or more of a number of views, a percentage of users that selected a link for additional information, a percentage of users that bought a product or service associated with a transmitted item.

6. The method as recited in claim 4, wherein generating each item further comprises utilizing past performance data to generate the item.

7. The method as recited in claim 1, wherein determining attribute values further comprises:

utilizing an image-recognition model to determine features of images sent to users;

determining a relevance score for the features based on tracked performance of the images sent to users; and selecting the attribute values based on the relevance score of the features.

8. The method as recited in claim 7, wherein the image-recognition model is trained using a dataset of images with known performance metrics, the image-recognition model learning correlations between visual elements and item performance, wherein the image-recognition model predicts a performance of new images based on visual features of the new images.

9. The method as recited in claim 1, further comprising: providing a second UI showing audience information on a feed, the second UI showing content organized by audience for a plurality of audiences, the second UI presenting the audience information in a table organized by calendar date, with each column for a different day and each row showing communications planned or delivered for each day for each audience.

10. The method as recited in claim 1, further comprising: generating a feed for the audience, wherein the items generated for the feed are deliverable via a plurality of channels that comprise publishing to social media, connecting to email automation systems, providing audience-level personalization on a webpage, and distributing through customer journey orchestrators.

11. A system comprising:

a memory comprising instructions; and one or more computer processors, wherein the instructions, when executed by the one or more computer processors, cause the system to perform operations comprising:

identifying audience parameter values, the audience parameter values indicating which users are members of an audience;

determining attribute values for a plurality of attributes used to generate items based on the audience parameter values, the attribute values used to identify the members of the audience;

generating a plurality of items for the audience based on the attribute values, wherein generating each item from the plurality of items comprises:

creating a prompt based on a type of the item, the attribute values, and the audience parameter values, the prompt being a text description for generating new content;

selecting a generative artificial intelligence (GAI) tool to generate the item based on the type of item; and providing the created prompt to the selected GAI tool to obtain the item;

causing presentation of the generated plurality of items in a user interface (UI);

receiving on the UI a selection of one of the items from the generated plurality of items; and transmitting the selected item to one or more members of the audience.

12. The system as recited in claim 11, wherein the instructions further cause the one or more computer processors to perform operations comprising:

providing a first user interface (UI) displaying information regarding different audiences, audience preferences, and content designed for each audience, the first UI providing an option to select and filter information by audience.

13. The system as recited in claim 12, wherein the first UI provides cards showing documents generated for each communication channel.

14. The system as recited in claim 11, wherein the instructions further cause the one or more computer processors to perform operations comprising:

providing a second UI showing a performance of content presented to users and a feed of items available for future communications to the audience.

15. The system as recited in claim 14, wherein the performance is a measurement of a response of users to communications, and the performance is based on one or more of a number of views, a percentage of users that selected a link for additional information, a percentage of users that bought a product or service associated with a transmitted item.

16. A non-transitory machine-readable storage medium including instructions that, when executed by a machine, cause the machine to perform operations comprising:

identifying audience parameter values, the audience parameter values indicating which users are members of an audience;

determining attribute values for a plurality of attributes used to generate items based on the audience parameter values, the attribute values used to identify the members of the audience;

generating a plurality of items for the audience based on the attribute values, wherein generating each item from the plurality of items comprises:

creating a prompt based on a type of the item, the attribute values, and the audience parameter values, the prompt being a text description for generating new content;

selecting a generative artificial intelligence (GAI) tool to generate the item based on the type of item; and providing the created prompt to the selected GAI tool to obtain the item;

causing presentation of the generated plurality of items in a user interface (UI);

receiving on the UI a selection of one of the items from the generated plurality of items; and transmitting the selected item to one or more members of the audience.

17. The non-transitory machine-readable storage medium as recited in claim 16, wherein the machine further performs operations comprising:

providing a first user interface (UI) displaying information regarding different audiences, audience preferences, and content designed for each audience, the first UI providing an option to select and filter information by audience.

18. The non-transitory machine-readable storage medium as recited in claim 17, wherein the first UI provides cards showing documents generated for each communication channel.

19. The non-transitory machine-readable storage medium as recited in claim 16, wherein the machine further performs operations comprising:

providing a second UI showing a performance of content presented to users and a feed of items available for future communications to the audience.

20. The non-transitory machine-readable storage medium as recited in claim 19, wherein the performance is a measurement of a response of users to communications, and the performance is based on one or more of a number of views, a percentage of users that selected a link for additional information, a percentage of users that bought a product or service associated with a transmitted item.

* * * * *